(12) United States Patent
Maeda et al.

(10) Patent No.: US 6,775,419 B2
(45) Date of Patent: *Aug. 10, 2004

(54) IMAGE PROCESSING METHOD, IMAGE PROCESSING APPARATUS, AND STORAGE MEDIUM FOR STORING CONTROL PROCESS

(75) Inventors: Eisaku Maeda, Sakura (JP); Nobuhiro Fujinawa, Yokohama (JP); Takuya Shirahata, Yokohama (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/533,041

(22) Filed: Mar. 22, 2000

(65) Prior Publication Data

US 2003/0128889 A1 Jul. 10, 2003

Related U.S. Application Data

(63) Continuation of application No. 09/024,124, filed on Feb. 17, 1998, now abandoned.

(30) Foreign Application Priority Data

Jul. 24, 1997 (JP) .............................................. 9-198635
Jan. 12, 1998 (JP) .......................................... 10-003563

(51) Int. Cl.[7] ................................................ G06K 9/40
(52) U.S. Cl. ..................... 382/275; 382/167; 250/341.7
(58) Field of Search ................................. 382/110, 112, 382/162–167, 284, 275; 250/338.01–339.15, 341.1–341.8

(56) References Cited

U.S. PATENT DOCUMENTS

| 4,680,638 | A | | 7/1987 | Childs ......................... 358/214 |
| 4,933,983 | A | | 6/1990 | Hiramatsu et al. .......... 382/112 |
| 5,036,405 | A | | 7/1991 | Kojima ....................... 358/448 |
| 5,266,805 | A | | 11/1993 | Edgar .......................... 250/330 |
| 5,309,108 | A | * | 5/1994 | Maeda et al. ................ 324/501 |
| 5,650,816 | A | | 7/1997 | Mead |
| 5,894,345 | A | * | 4/1999 | Takamoto et al. ........ 356/237.1 |
| 6,380,539 | B1 | * | 4/2002 | Edgar .................... 250/339.05 |

FOREIGN PATENT DOCUMENTS

| JP | 58-68651 | 4/1983 |
| JP | 62-188951 | 8/1987 |
| JP | 62-203460 | 9/1987 |
| JP | 62-203469 | 9/1987 |
| JP | 62-203477 | 9/1987 |
| JP | 6-28468 | 2/1994 |
| JP | 7-212792 | 8/1995 |
| JP | 62-188952 | 8/1997 |
| WO | WO 98/31142 | 7/1998 |

* cited by examiner

*Primary Examiner*—Jingge Wu

(57) ABSTRACT

An image processing method includes the steps of resolving the color of an image on a transparent original to extract an infrared component, detecting the level of the infrared component, detecting the defect infrared component level at the defect position on the transparent original where the infrared component level becomes lower than a first infrared level, obtaining a correction factor by calculating (first infrared component level)/(defect infrared component level) on the basis of the first infrared component level and defect infrared component level, resolving the color of the image on the transparent original to extract a visible component, detecting the visible component level of the visible component, and calculating the corrected visible component level by multiplying the defect visible component level at the defect position on the transparent original by the correction factor.

63 Claims, 36 Drawing Sheets

| 200 | 200 | 200 | 200 | 200 | 200 |
|-----|-----|-----|-----|-----|-----|
| -55 | -55 | 80  | 200 | 200 | 200 |
| 80  | 150 | 80  | 200 | 200 | 200 |
| -55 | -161| -235| 47  | 100 | 100 |
| 200 | 200 | 100 | 100 | 100 | 100 |
| 200 | 200 | 100 | 100 | 200 | 200 |

SUM OF ABSOLUTE VALUE

190

310

451

SUM TOTAL 951

A-2

| 200 | 200 | 200 | 200 | 200 | 200 |
|-----|-----|-----|-----|-----|-----|
| 200 | -55 | -55 | 80  | 200 | 200 |
| 200 | 80  | 150 | -26 | 200 | 200 |
| 200 | -161| -235| -208| 100 | 100 |
| 200 | 200 | 100 | 100 | 100 | 100 |
| 200 | 200 | 100 | 100 | 200 | 200 |

SUM OF ABSOLUTE VALUE

190

256

604

SUM TOTAL 1050

A-3

| 200 | 200 | 200 | 200 | 200 | 200 |
|-----|-----|-----|-----|-----|-----|
| 200 | 200 | -55 | -55 | 80  | 200 |
| 200 | 200 | 80  | 44  | 80  | 200 |
| 200 | 94  | -235| -208| -55 | 100 |
| 200 | 200 | 100 | 100 | 100 | 100 |
| 200 | 200 | 100 | 100 | 200 | 200 |

SUM OF ABSOLUTE VALUE

190

204

598

SUM TOTAL 992

| 200 | 200 | 200 | 200 | 200 | 200 |
|---|---|---|---|---|---|
| 200 | 200 | 200 | 200 | 200 | 200 |
| -55 | -55 | 80 | 200 | 200 | 200 |
| 80 | 44 | -100 | 47 | 100 | 100 |
| -55 | -55 | -155 | 100 | 100 | 100 |
| 200 | 200 | 100 | 100 | 200 | 200 |

SUM OF ABSOLUTE VALUE

190

224

265

SUM TOTAL 679

B-2

| 200 | 200 | 200 | 200 | 200 | 200 |
|---|---|---|---|---|---|
| 200 | 200 | 200 | 200 | 200 | 200 |
| 200 | -55 | -55 | -26 | 200 | 200 |
| 200 | -26 | -30 | -73 | 100 | 100 |
| 200 | -55 | -155 | -155 | 100 | 100 |
| 200 | 200 | 100 | 100 | 200 | 200 |

SUM OF ABSOLUTE VALUE

136

129

365

SUM TOTAL 630

B-3

| 200 | 200 | 200 | 200 | 200 | 200 |
|---|---|---|---|---|---|
| 200 | 200 | 200 | 200 | 200 | 200 |
| 200 | 200 | -55 | -161 | 80 | 200 |
| 200 | 94 | -100 | 3 | -20 | 100 |
| 200 | 200 | -155 | -155 | -155 | 100 |
| 200 | 200 | 100 | 100 | 200 | 200 |

SUM OF ABSOLUTE VALUE

296

123

465

SUM TOTAL 884

| 200 | 200 | 200 | 200 | 200 | 200 |
|---|---|---|---|---|---|
| 200 | 200 | 200 | 200 | 200 | 200 |
| 200 | 200 | 200 | 94 | 200 | 200 |
| -55 | -161 | -100 | 47 | 100 | 100 |
| 80 | 150 | -20 | 100 | 100 | 100 |
| -55 | -55 | -155 | 100 | 200 | 200 |

SUM OF ABSOLUTE VALUE

316

250

265

SUM TOTAL 831

C-2

| 200 | 200 | 200 | 200 | 200 | 200 |
|---|---|---|---|---|---|
| 200 | 200 | 200 | 200 | 200 | 200 |
| 200 | 200 | 200 | 94 | 200 | 200 |
| 200 | -161 | -235 | 73 | 100 | 100 |
| 200 | 80 | 50 | -20 | 100 | 100 |
| 200 | -55 | -155 | -155 | 200 | 200 |

SUM OF ABSOLUTE VALUE

469

150

365

SUM TOTAL 984

B-3

| 200 | 200 | 200 | 200 | 200 | 200 |
|---|---|---|---|---|---|
| 200 | 200 | 200 | 200 | 200 | 200 |
| 200 | 200 | 200 | 94 | 200 | 200 |
| 200 | 94 | -235 | -208 | -20 | 100 |
| 200 | 200 | -20 | 50 | -20 | 100 |
| 200 | 200 | -155 | -155 | -55 | 200 |

SUM OF ABSOLUTE VALUE

463

90

365

SUM TOTAL 918

IMAGE PROCESSING METHOD, IMAGE PROCESSING APPARATUS, AND STORAGE MEDIUM FOR STORING CONTROL PROCESS

This application is a Continuation of application Ser. No. 09/024,124, filed Feb. 17, 1998, now abandoned.

The entire disclosure of Japanese Patent Application No. 9-198635 including specification, claims, drawings and summary is incorporated herein by reference in its entirety.

BACKGROUND OF THE INVENTION

1. Field of the Invention

The present invention relates to an image processing method for correcting the influences of defects such as dust, scratches, fingerprints, and the like present on a transparent original upon reading image information of the transparent original, an image processing apparatus for executing the image processing method, and a storage medium for computer-readably storing a program for correcting the influences of defects.

2. Related Background Art

An image processing apparatus for reading image information of a transparent original is normally constituted by a host computer such as a so-called personal computer, or the like, and an image reader as an input device of the host computer. The image reader comprises an illumination means for illuminating a film original as a transparent original such as a negative film, reversal film, elongated film, or the like, a moving means for moving the film original, an image reading means for reading an image on the film original by receiving light transmitted through the film original, and outputting an image signal, and an image processing means for calculating data of the image read by the image reading means. The image reader reads an image on a film original on the basis of a command from the host computer, and outputs the read image data to the host computer.

Color image reading is normally done by switching three colors, i.e., red (R), green (G), and blue (B). However, when defects such as dust, scratches, fingerprints, and the like are present on a film original, these defects appear as black points (in case of a positive film) or white points (in case of a negative film) on the read image, thus lowering the image quality.

To solve such problem, a technique for detecting defects such as dust, scratches, fingerprints, and the like using the properties of infrared light and correcting the influences of defects has been proposed (e.g., U.S. Pat. No. 5,266,805). This patent discloses the following technique. That is, when the infrared ray energy intensity detected at a given timing is larger than a predetermined threshold value, the visible ray energy intensity is increased to a level that can cancel the infrared ray energy intensity, and when the detected infrared ray energy intensity is equal to or lower than the predetermined threshold value, the visible ray energy intensity is corrected by interpolation, thereby correcting the influences of defects.

However, the above patent discloses only the concept of the technique for correcting the influences of defects using infrared rays, and does not give any clear description about how to compute the acquired data associated with defects so as to acquire correction data. Hence, the disclosure of the above patent does not enable acquisition of an image free from the influences of defects.

SUMMARY OF THE INVENTION

It is an object of the present invention to provide an image processing method that can surely acquire an image free from the influences of defects on a transparent original, an image processing apparatus for executing the image processing method, and a storage medium for computer-readably storing a program for correcting the influences of defects.

An image processing method according to the basic mode of the present invention comprises the steps of resolving the color of an image on a transmissive substrate or original to extract an infrared component (i.e., providing an infrared light component transmitted by a transparent original), detecting the level of the infrared component, detecting a defect infrared component level at a defect position on the transparent original where the infrared component level becomes lower than a first infrared level, obtaining a correction factor by calculating (first infrared component level)/(defect infrared component level) on the basis of the first infrared component level and defect infrared component level, resolving the color of the image on the transparent original to extract a visible component, detecting a visible component level of the visible component, and calculating a corrected visible component level by multiplying a defect visible component level at the defect position on the transparent original by the correction factor.

Noting that the attenuation amount of the transmissive level of the infrared component accurately represents the degree of defects, this method calculates the correction factor as the ratio between the infrared component level (first infrared component level) obtained without any defects and the defect infrared component level at the defect position, and multiplies the visible component level at that defect position by the correction factor. Therefore, since correction can be attained in correspondence with the attenuation amount, an image can be reproduced more appropriately than the conventional method.

In order to make this image processing method properly function, the visible component at the defect position must include recoverable image information. Hence, in one mode of the present invention, a threshold value as a second infrared component level is used as a reference infrared component level, and when the degree of defects is not too serious and image information can be directly recovered, the correction factor is multiplied. In this way, an image can be reproduced more appropriately.

In the image processing method according to one mode of the present invention, when the degree of defects is serious and the infrared component level is smaller than the second infrared component level component, i.e., image information cannot be directly recovered, a visible component level at the defect position is generated using visible component levels around the detected defect position. Hence, even at a position where the attenuation amount due to defects is large, an image which suffers less influences of defects can be obtained.

In the image processing method of the present invention, the first infrared component level can use a maximum value of the detected infrared component levels. In this case, even when the infrared component level varies in each detection, the influences of such variations can be reduced, thus reducing the influences of defects with high reproducibility.

In the image processing method according to one mode of the present invention, the infrared component is extracted by optically resolving the color of the image on the transparent original to extract an infrared component, the infrared component level is detected by imaging infrared light corresponding to the extracted infrared component on photoelectric conversion means by an imaging optical system, and making the photoelectric conversion means output an infrared component signal, the visible component is extracted by optically resolving the color of the image on the transparent original to extract a visible component, the visible component level is detected by imaging visible light corresponding to the extracted visible component on the photoelectric conversion means by the imaging optical system, and making the photoelectric conversion means output a visible component signal, and the method further comprises the step of performing registrational error correction for correcting a registrational error between the infrared component signal and visible component signal due to different imaging positions of the infrared light coming from the transparent original and the visible light coming from the transparent original, that are caused by characteristics of the imaging optical system. With this method, any influences of the registrational error between the focused positions of infrared light and visible light caused by the characteristics of the imaging optical system can be corrected. As a consequence, the size of the infrared component signal region corresponding to defects becomes nearly equal to that of the visible component signal region corresponding to defects. Hence, regions that need not be corrected can be prevented from being corrected.

In this method, it is more preferable that the following arrangement be adopted. That is, the registrational error correction is attained by: setting at least one of the transparent original and the photoelectric conversion means at a position where an image of the transparent original corresponding to the extracted infrared component is to be imaged on the photoelectric conversion means by the imaging optical system when the infrared component is to be extracted; and setting at least one of the transparent original and the photoelectric conversion means at a position where an image of the transparent original corresponding to the extracted visible component is to be imaged on the photoelectric conversion means by the imaging optical system when the visible component is to be extracted. In this case, registrational error correction is done using a mechanical mechanism. Since the registrational error is optically corrected, registrational error correction that can minimize deterioration of image quality as compared to the one based on data processing such as mathematical operation can be realized.

In this method, it is more preferable that the following arrangement be adopted. That is, the method further comprises the steps of: relatively moving at least one of the transparent original and the photoelectric conversion means to a first sub-scan position; setting at least one of the transparent original and the photoelectric conversion means at a position where an image corresponding to one of the extracted infrared component and the extracted visible component is to be imaged on the photoelectric conversion means by the imaging optical system; extracting said one of the infrared component and the visible component; setting at least one of the transparent original and the photoelectric conversion means at a position where an image corresponding to the other of the extracted infrared component and the extracted visible component is to be imaged on the photoelectric conversion means by the imaging optical system; extracting said other of the infrared component and the visible component; relatively moving at least one of the transparent original and the photoelectric conversion means to a second sub-scan position; extracting said other of the infrared component and the visible component; setting at least one of the transparent original and the photoelectric conversion means at a position where an image corresponding to said one of the extracted infrared component and the extracted visible component is to be imaged on the photoelectric conversion means by the imaging optical system; and extracting said one of the infrared component and the visible component. In this case, since the number of times of movement of the transparent original or photoelectric conversion means can be reduced, image processing can be done within a short period of time.

Alternatively, it is more preferable that the following arrangement be adopted. That is, the method further comprises the steps of: relatively moving at least one of the transparent original and the photoelectric conversion means to a first sub-scan position; setting at least one of the transparent original and the photoelectric conversion means at a first imaging position where an image corresponding to one of the extracted infrared component and the extracted visible component is to be imaged on the photoelectric conversion means by the imaging optical system; extracting said one of the infrared component and the visible component; setting at least one of the transparent original and the photoelectric conversion means at a second imaging position where an image corresponding to the other of the extracted infrared component and the extracted visible component is to be imaged on the photoelectric conversion means by the imaging optical system; extracting said other of the infrared component and the visible component; relatively moving at least one of the transparent original and the photoelectric conversion means to a second sub-scan position; setting at least one of the transparent original and the photoelectric conversion means at the first imaging position; extracting said one of the infrared component and the visible component; setting at least one of the transparent original and the photoelectric conversion means at the second imaging position; and extracting said other of the infrared component and the visible component. In this case, at least one of the transparent original and photoelectric conversion means is moved in an identical direction to attain imaging. Therefore, high alignment precision can be assured independently of the characteristics of the mechanism for moving at least one of the transparent original and photoelectric conversion means in the imaging direction.

In this method, it is more preferable that the following arrangement be adopted. That is, the method further comprises, after the step of relatively moving at least one of the transparent original and the photoelectric conversion means to the second imaging position and before the step of setting at least one of the transparent original and the photoelectric conversion means at the first imaging position, the step of: setting at least one of the transparent original and the photoelectric conversion means at a position opposite to the second imaging position with respect to the first imaging position. In this case, irrespective of the first and second imaging positions, high alignment precision can be assured independently of the characteristics of the mechanism for moving at least one of the transparent original and photoelectric conversion means in the imaging direction.

Some examples of mechanical registrational error correction have been described but correction may also be attained by a calculation or mathematical operation. For example, the registrational error correction is attained by performing a correction calculation of one of the defect infrared component level and the defect visible component level so as to match a distribution size of the defect infrared component level with a distribution size of the defect visible component level.

In this case, the mechanical mechanism for registrational error correction can be omitted.

In the above-mentioned image processing method of the basic mode of the present invention, it is more preferable that the following arrangement be adopted. More specifically, the method further comprises the steps of: specifying a position in the visible component corresponding to the defect position on the basis of the defect infrared component level and the visible component level; and multiplying the defect visible component level corresponding to the specified position by the correction factor. According to this method, any positional registrational error between the infrared component signal region corresponding to defects and visible component signal region corresponding to defects can be corrected. Hence, regions that need not be corrected can be prevented from being corrected.

In the image processing method of the basic mode, it is more preferable that the following arrangement be adopted. More specifically, the method further comprises, after the step of multiplying the correction factor, the step of: modifying gradation of the corrected visible component level. That is, when gradation correction is executed first, the correction factor must be multiplied taking the gradation correction performed into consideration, thus complicating the processing. However, with this method, such problem can be avoided.

An image processing method according to one mode of the present invention comprises the steps of: optically resolving a color of an image on a transparent original to extract an infrared component; imaging infrared light corresponding to the extracted infrared component on photoelectric conversion means by an imaging optical system, and making the photoelectric conversion means output an infrared component signal; detecting defect position information of the transparent original where a level of the infrared component is lower than a first infrared level; optically resolving the color of the image on a transparent original to extract a visible component; imaging visible light corresponding to the extracted visible component on the photoelectric conversion means by the imaging optical system, and making the photoelectric conversion means output a visible component signal; detecting a visible component level of the visible component signal; performing registrational error correction for correcting a registrational error between the infrared component signal and visible component signal due to different imaging positions of the infrared light and the visible light, that are caused by characteristics of the imaging optical system; and correcting the visible component level on the basis of the registrational error correction. With this image processing method, any influences of the registrational error between the focal points of infrared light and visible light caused by the characteristics of the imaging optical system can be corrected. As a consequence, the size of the infrared component signal region corresponding to defects becomes nearly equal to that of the visible component signal region corresponding to defects. Hence, regions that need not be corrected can be prevented from being corrected.

An image processing method according to another mode of the present invention comprises the steps of: resolving a color of an image on a transparent original to extract an infrared component; detecting levels of the infrared component for a plurality of pixels; detecting a defect infrared component level at a defect position on the transparent original, where the infrared component level is lower than a first infrared level; resolving the color of the image on a transparent original to extract a visible component; detecting visible component levels of the visible component for a plurality of pixels; and specifying a pixel corresponding to the defect position associated with the visible component on the basis of the defect infrared component level and the visible component level.

An image processing apparatus according to one mode of the present invention comprises: infrared component extraction means for resolving a color of an image on a transparent original to extract an infrared component; infrared component detection means for detecting a level of the infrared component; defect infrared component detection means for detecting a defect infrared component level at a defect position on the transparent original where the infrared component level becomes lower than a first infrared level; correction factor calculation means for obtaining a correction factor by calculating (first infrared component level)/(defect infrared component level) on the basis of the first infrared component level and defect infrared component level; visible component extraction means for resolving the color of the image on the transparent original to extract a visible component; visible component detection means for detecting a visible component level of the visible component; and multiplication means for calculating a corrected visible component level by multiplying a defect visible component level at the defect position on the transparent original by the correction factor.

An image processing apparatus according to another mode of the present invention comprises: an infrared light pass filter for optically resolving a color of an image on a transparent original to extract an infrared component; first photoelectric conversion means for photoelectrically converting infrared light and outputting an infrared component signal; defect position detection means for detecting a position of the infrared component signal where an infrared component level is lower than a first infrared level, and outputting defect position information; a visible light pass filter for optically resolving the color of the image on a transparent original to extract a visible component; second photoelectric conversion means for photoelectrically converting visible light and outputting a visible component signal; an imaging optical system for imaging one of infrared light corresponding to the extracted infrared component and visible light component corresponding to the extracted visible light component on a corresponding one of the first and second photoelectric conversion means; and registrational error correction means for correcting a registrational error between the infrared component signal and visible component signal due to different imaging positions of the infrared light and the visible light, that are caused by characteristics of the imaging optical system. This image processing apparatus can correct any influences of the registrational error between the focal points of infrared light and visible light caused by the characteristics of the imaging optical system. As a consequence, the size of the infrared component signal region corresponding to defects becomes nearly equal to that of the visible component signal region corresponding to defects. Hence, regions that need not be corrected can be prevented from being corrected.

An image processing apparatus according to still another mode of the present invention comprises: an infrared light pass filter for optically resolving a color of an image on a transparent original to extract an infrared component; infrared component detection means for dividing the infrared component into a plurality of pixels, and detecting infrared component levels of the pixels; defect infrared component detection means for detecting a defect infrared component level of a pixel at a defect position on the transparent original, where the infrared component level is lower than a first infrared level; a visible light pass filter for optically resolving the color of the image on a transparent original to extract a visible component; visible component detection means for detecting visible component levels of the visible component from a plurality of pixels; and defect position specifying means for specifying a position of the visible component corresponding to the defect position on the basis of the defect infrared component level and the visible component level.

A storage medium which stores a control process of an image processing apparatus according to one mode of the present invention is a storage medium which computer-readably stores a control process of image generation by an image processing apparatus having infrared component extraction means for resolving a color of an image on a transparent original to extract an infrared component, defect infrared component detection means for detecting a defect infrared component level at a defect position on the transparent original where the infrared component level becomes lower than a first infrared level, visible component extraction means for resolving the color of the image on the transparent original to extract a visible component, and visible component detection means for detecting a visible component level of the extracted visible component, the control process comprising the steps of: detecting a level of the extracted infrared component; obtaining a correction factor by calculating (first infrared component level)/(defect infrared component level) on the basis of the first infrared component level and defect infrared component level; and calculating a corrected visible component level by multiplying a defect visible component level at the defect position on the transparent original by the correction factor.

A storage medium which stores a control process of an image processing apparatus according to another mode of the present invention is a storage medium which computer-readably stores a control process of image generation by an image processing apparatus having infrared component extraction means for resolving a color of an image on a transparent original to extract an infrared component, visible component extraction means for resolving the color of the image on the transparent original to extract a visible component, photoelectric conversion means for scanning the transparent original in a main scan direction, and converting light transmitted through the transparent original into an electrical signal, and moving means for relatively moving at least one of the transparent original and the photoelectric conversion means in a sub-scan direction as a direction perpendicular to the main scan direction, the control process comprising the steps of: controlling the moving means to relatively move at least one of the transparent original and the photoelectric conversion means to a first sub-scan position; controlling the moving means to set at least one of the transparent original and the photoelectric conversion means at a position where an image corresponding to one of the extracted infrared component and the extracted visible component is to be imaged on the photoelectric conversion means by an imaging optical system; controlling one of the infrared component extraction means and the visible component extraction means to perform component extraction; controlling, after one of the infrared component and the visible component is extracted, the moving means to set at least one of the transparent original and the photoelectric conversion means at a position where an image corresponding to the other of the extracted infrared component and the extracted visible component is to be imaged on the photoelectric conversion means by the imaging optical system; controlling the other of the infrared component extraction means and the visible component extraction means to perform component extraction; controlling the moving means to relatively move at least one of the transparent original and the photoelectric conversion means to a second sub-scan position; controlling, after the other of the infrared component and the visible component is extracted, the moving means to set at least one of the transparent original and the photoelectric conversion means at a position where an image corresponding to the one of the extracted infrared component and the extracted visible component is to be imaged on the photoelectric conversion means by the imaging optical system; and controlling the one of the infrared component extraction means and the visible component extraction means to perform component extraction.

A storage medium which stores a control process of an image processing apparatus according to still another mode of the present invention is a storage medium which computer-readably stores a control process of image generation by an image processing apparatus having infrared component extraction means for resolving a color of an image on a transparent original to extract an infrared component, visible component extraction means for resolving the color of the image on the transparent original to extract a visible component, photoelectric conversion means for scanning the transparent original in a main scan direction, and converting light transmitted through the transparent original into an electrical signal, and moving means for relatively moving at least one of the transparent original and the photoelectric conversion means in a sub-scan direction as a direction perpendicular to the main scan direction, the control process comprising the steps of: controlling the moving means to relatively move at least one of the transparent original and the photoelectric conversion means to a first sub-scan position; controlling the moving means to set at least one of the transparent original and the photoelectric conversion means at a first imaging position where an image corresponding to one of the extracted infrared component and the extracted visible component is to be imaged on the photoelectric conversion means by an imaging optical system; controlling one of the infrared component extraction means and the visible component extraction means to perform component extraction; controlling, after one of the infrared component and the visible component is extracted, the moving means to set at least one of the transparent original and the photoelectric conversion means at a second imaging position where an image corresponding to the other of the extracted infrared component and the extracted visible component is to be imaged on the photoelectric conversion means by the imaging optical system; controlling the other of the infrared component extraction means and the visible component extraction means to perform component extraction; controlling the moving means to relatively move at least one of the transparent original and the photoelectric conversion means to a second sub-scan position; controlling the moving means to set at least one of the transparent original and the photoelectric conversion means at the first imaging position; controlling the one of the infrared component extraction means and the visible component extraction means to perform component extraction; controlling, after the one of the infrared component and the visible component is extracted, the moving means to set at least one of the transparent original and the photoelectric conversion means at the second imaging position; and controlling the other of the infrared component extraction means and the visible component extraction means to perform component extraction.

A storage medium which stores a control process of an image processing apparatus according to still another mode of the present invention is a storage medium which computer-readably stores a control process of image generation by an image processing apparatus having an infrared light pass filter for optically resolving a color of an image on a transparent original to extract an infrared component, first photoelectric conversion means for photoelectrically converting infrared light and outputting an infrared component signal, defect position detection means for detecting a position of the infrared component signal where an infrared component level is lower than a first infrared level, and outputting defect position information, a visible light pass filter for optically resolving the color of the image on a transparent original to extract a visible component, second photoelectric conversion means for photoelectrically converting visible light and outputting a visible component signal, and an imaging optical system for imaging one of infrared light corresponding to the extracted infrared component and visible light component corresponding to the extracted visible light component on a corresponding one of the first and second photoelectric conversion means, the control process comprising: a registrational error correction step of correcting a registrational error between the infrared component signal and visible component signal due to different imaging positions of the infrared light and the visible light, that are caused by characteristics of the imaging optical system.

BRIEF DESCRIPTION OF THE DRAWINGS

FIG. 15 is a diagram for explaining an alignment process;

FIG. 16 is a diagram for explaining an alignment process;

FIG. 17 is a diagram for explaining an alignment process;

DETAILED DESCRIPTION OF THE PREFERRED EMBODIMENTS

The embodiments of the present invention will be described hereinafter with reference to the accompanying drawings.

Figure 1:
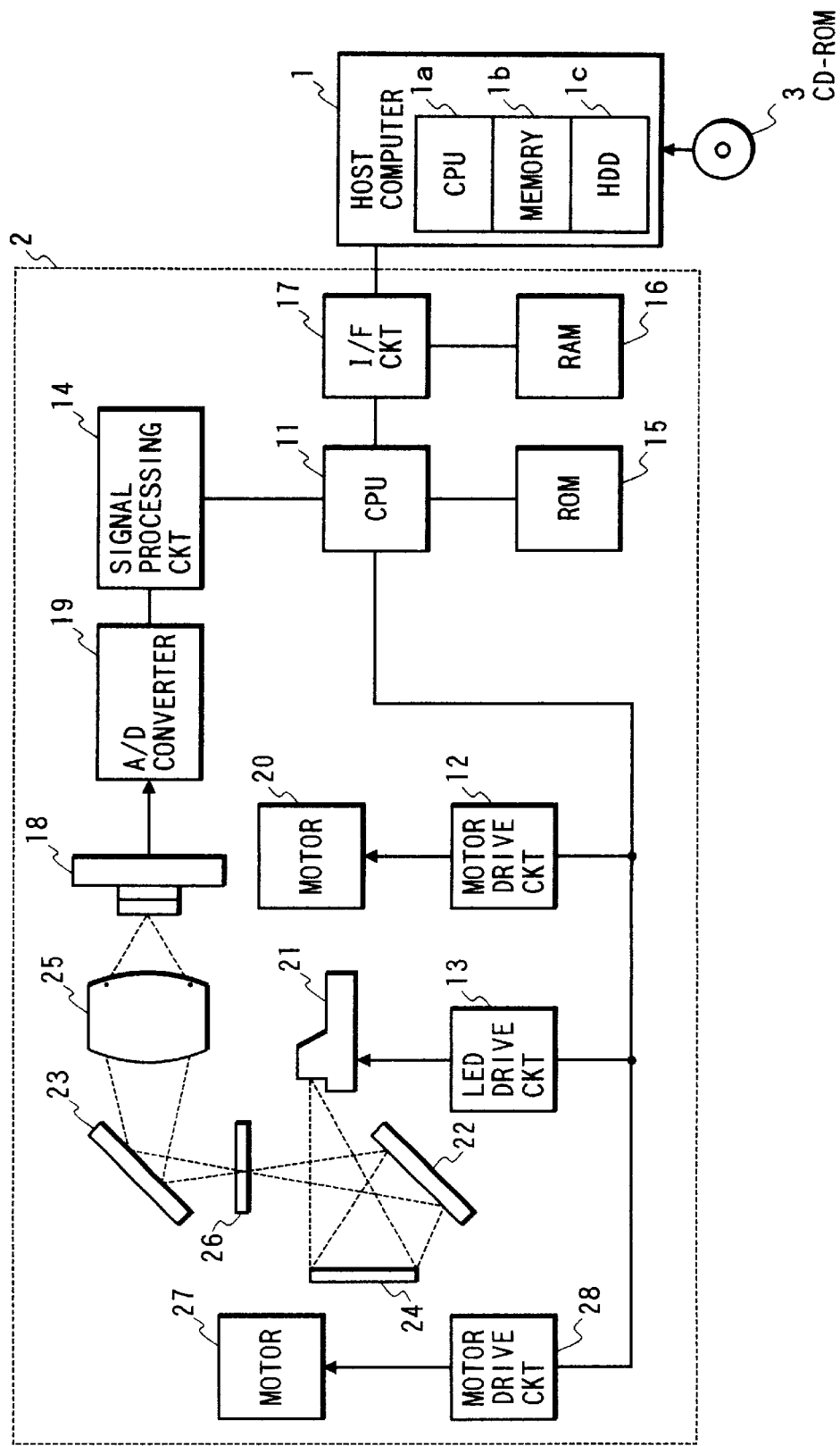
FIG. 1 is a block diagram showing the arrangement of an image processing apparatus according to an embodiment of the present invention.
Figure 2:
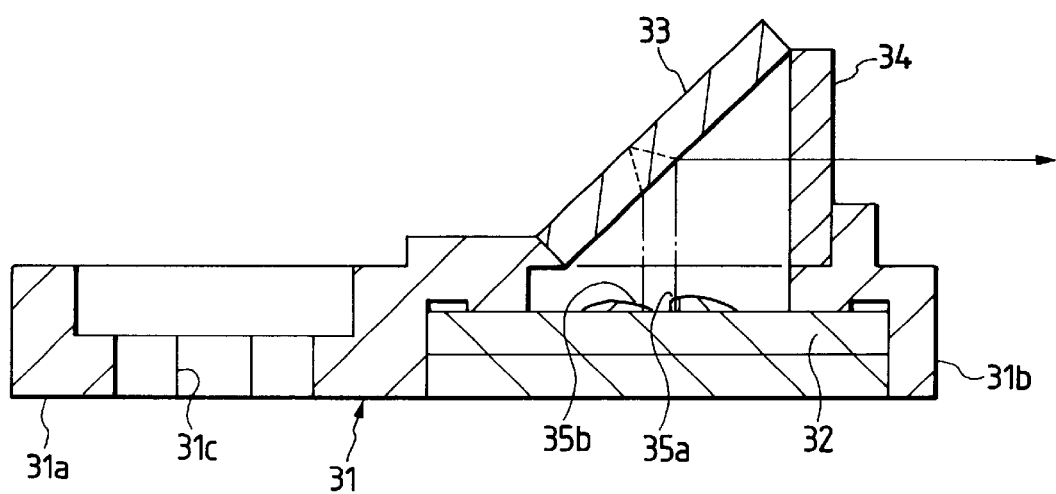
FIG. 2 is a side sectional view of an illuminator.
Figure 3:
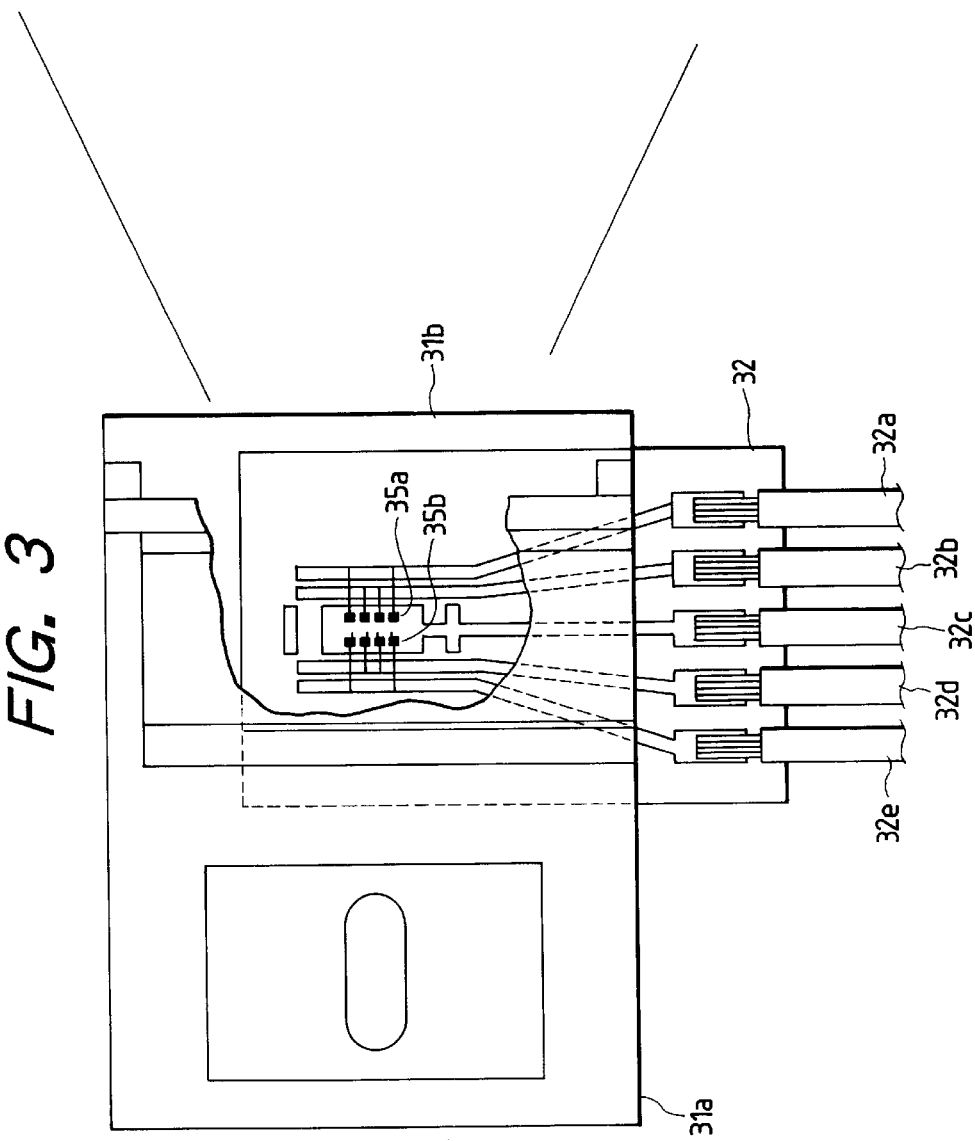
FIG. 3 is a partially cutaway enlarged view showing the layout state of an LED chip.

FIG. 1 is a block diagram showing the arrangement of an image processing apparatus according to an embodiment of the present invention. FIG. 2 is a side sectional view of an illuminator of this embodiment. FIG. 3 is a view showing the layout state of an LED chip in the illuminator.

Referring to FIG. 1, an image processing apparatus is constituted by a host computer 1 and an image reader 2 as an input device of the host computer 1. The host computer 1 comprises a central processing unit (to be referred to as a "CPU" hereinafter) 1a, memory 1b, and HDD (hard disk drive) 1c, and can be loaded with a CD-ROM 3 as a storage medium. The host computer 1 comprises an input device such as a keyboard, mouse, and the like, a display device, and the like (not shown).

The image reader 2 comprises a CPU 11, motor drive circuits 12 and 28, an LED drive circuit 13, signal processing circuit 14, ROM 15, RAM 16, interface circuit (to be referred to as an "I/F" circuit hereinafter) 17, line sensor 18, A/D converter 19, motors 20 and 27, illuminator 21, optical system (reflection mirrors 22 and 23, toric mirror 24, lens 25, and the like), a path for a film original 26, and the like, and is connected to the host computer 1 via the I/F circuit 17.

The motor 20 performs operations for moving the film original 26, setting it at a read position, and so on, by driving roller pairs arranged along the path for the film original 26 under the control of the motor drive circuit 12 which operates in accordance with an instruction from the CPU 11. The film original 26 may be a negative film, reversal film, elongated film, or the like.

The motor 27 moves a film holder for holding the film original and the like in the optical axis direction of the optical system under the control of the motor drive circuit 28 which operates in accordance with an instruction from the CPU 11. Note that the optical axis referred to here is that of the optical system at the intersection with the film original 26.

The illuminator 21 has, for example, an arrangement shown in FIGS. 2 and 3, and selectively emits light in four colors, i.e., red (R) light, green (G) light, blue (B) light, and infrared (IR) light under the control of the LED drive circuit 13 which operates in accordance with an instruction from the CPU 11. The detailed arrangement of the illuminator 21 will be explained below with reference to FIGS. 2 and 3.

Referring to FIG. 2, an attachment base 31 comprises an attachment portion 31a, and a light source forming portion 31b contiguous with one side of the attachment portion 31a. The attachment portion 31a has a screw hole 31c, and is fixed by a screw via the screw hole 31c to a support member (not shown). A board 32, dichroic mirror 33, and diffusion plate 34 that make up the illuminator are disposed on the light source forming portion 31b. On the board 32, arrays of a plurality of light emitting diode chips (to be referred to as "LED chips" hereinafter) 35a and 35b for emitting four color beams, i.e., red (R), green (G), blue (B), and infrared (IR) light beams, are disposed, as shown in FIG. 3. In this embodiment, all the three color visible light emitting elements, i.e., red (R), green (G), and blue (B) elements, are equipped, but any one of these elements may be used.

In FIG. 3, the board 32 comprises an aluminum substrate which has two different types of copper foil patterns formed on an insulating layer coat. These patterns include a central broad pattern, and two each thin patterns on the two sides of the former pattern. One end of each of these patterns is connected to a corresponding one of terminals (32a to 32e) formed on one end of the board 32. Since the right-and-left direction in FIG. 3 agrees with the optical axis direction, these patterns are elongated in the direction perpendicular to this optical axis. Note that the individual patterns are gold-plated.

On the central broad pattern, in case of the illustrated example, eight LED chips indicated by black rectangles are disposed in two arrays each including four chips in a direction perpendicular to the optical axis while one electrode of each of these chips is connected by die-bonding to the broad pattern. The other electrode of each of the eight LED chips is connected by wire-bonding to a corresponding one of the two thin patterns on the two sides of the central broad pattern. In the illustrated example, since the emitted light rays are output rightward in FIG. 3, the right array in FIG. 3 corresponds to a front array, and the left array in FIG. 3 corresponds to a rear array. That is, in FIG. 2, the LED chip 35a indicates one of the four LED chips in the front array, and the LED chip 35b indicates one of the four LED chips in the rear array.

Referring back to FIG. 3, in the right LED chip array, two LED chips at the two ends in the up-and-down (or vertical) direction in FIG. 3 are R(red)-LED chips. These chips are connected to the thin pattern connected to the terminal 32a. The two middle LED chips are IR(infrared)-LED chips. These chips are connected to the thin pattern connected to the terminal 32b. In the left LED chip array, two LED chips at the two ends are B(blue)-LED chips. These chips are connected to the thin pattern connected to the terminal 32e. Also, two middle LED chips are G(green)-LED chips. These chips are connected to the thin pattern connected to the terminal 32d. The terminal 32c is connected to the central broad pattern. More specifically, the terminal 32c serves as a common terminal.

The reason why the dual-array layout is used is as follows. That is, if these chips are disposed in a single array, their total width in the direction perpendicular to the optical axis becomes unwantedly large, and light beams coming from some LED chips largely deviate from the optical axis. When the light beams deviate from the optical axis, light hardly reaches a line sensor due to a decrease in amount of light that can reach the line sensor, illumination nonuniformity, and the like. In this embodiment, since a plurality of LED chips for four colors are disposed in two arrays, the above-mentioned problems are avoided, and beams coming from the two arrays of LED chips are joined by the dichroic mirror 33.

In the above-mentioned embodiment, the IR-LED chips are disposed at the inner side of the right array in FIG. 3, and the G-LED chips are disposed at the inner side of the left array in FIG. 3. Alternatively, IR-LED chips may be disposed on the outer side of the right array in FIG. 3, and the G-LED chips may be disposed on the outer side of the left array in FIG. 3.

Infrared light is used as illumination for detecting scratches and the like of a film. On the other hand, green is the color that the human eye can recognize best. More specifically, when the IR- and G-LED chips are disposed at nearly the same positions in the array direction, infrared light and green light can illuminate to have roughly equal distributions. For this reason, the color to which the human eye is most sensitive can be corrected more accurately.

In the above embodiment, four color beams, i.e., R, G, B, and IR beams are independently emitted by the LEDs. Alternatively, four color beams may be acquired via filters on the basis of light emitted by a white light source.

In FIG. 1, the optical system, made up of the reflection mirrors 22 and 23, toric mirror 24, lens 25, and the like, guides light transmitted through the film original 26 to the line sensor 18 to form an image on the film original 26 on the line sensor 18. The line sensor 18 outputs an electrical signal (image signal) proportional to the amount of light received within a set and controlled accumulation period. The output from the line sensor 18 is input to the signal processing circuit 14 via the A/D converter 19, and is subjected to various kinds of correction and the like. The processed signal is input to the CPU 11 as image data (line data).

Note that the line sensor 18 comprises image accumulation units as an array of a plurality of photoelectric conversion units, and a transfer unit for transferring charges accumulated on the image accumulation units. In the line sensor 18, transfer of charges accumulated on the image accumulation units to the transfer unit is done in turn from one end side toward the other end side of the plurality of photoelectric conversion units. This operation is called a main scan, and its direction is called a main scan direction.

A direction perpendicular to the main scan direction of the line sensor 18 is a sub-scan direction. In this embodiment, an image is read by moving the film original 26 in the sub-scan direction in units of lines (main scan direction) by controlling the motor 20. The optical system guides illumination light to illuminate a region having a width corresponding to one line on the film original 26. In this embodiment, the CPU 11 controls the motor 27 to move the film original 26 in the optical axis direction of the optical system to attain focusing. For example, if the film original 26 is a 35-mm film, the film holder can be entirely moved in the optical axis direction. If the film original 26 is an elongated film, a cartridge that stores the film, convey system, and the like can be moved together in the optical axis direction.

In summary, the CPU 11 fetches image data of the film original 26 from the signal processing circuit 14 by controlling the motor drive circuits 12 and 28, LED drive circuit 13, and the like in accordance with the program stored in the ROM 15. The CPU 11 performs mathematical operation on the fetched image data, and temporarily stores it in the RAM 16. The CPU 11 reads out the line data from the RAM 16 in response to a request from the host computer 1, and outputs it to the host computer 1 via the I/F circuit 17.

In this embodiment, upon executing mathematical operation on the fetched image data, the CPU 11 checks based on the data read using infrared light if the film original 26 has defects such as dust, scratches, fingerprints, and the like. Upon detecting defects, the CPU 11 corrects visible light data at each defect position using the infrared light data, and so on. Note that this correction may be done by the host computer 1 side.

Figure 4:
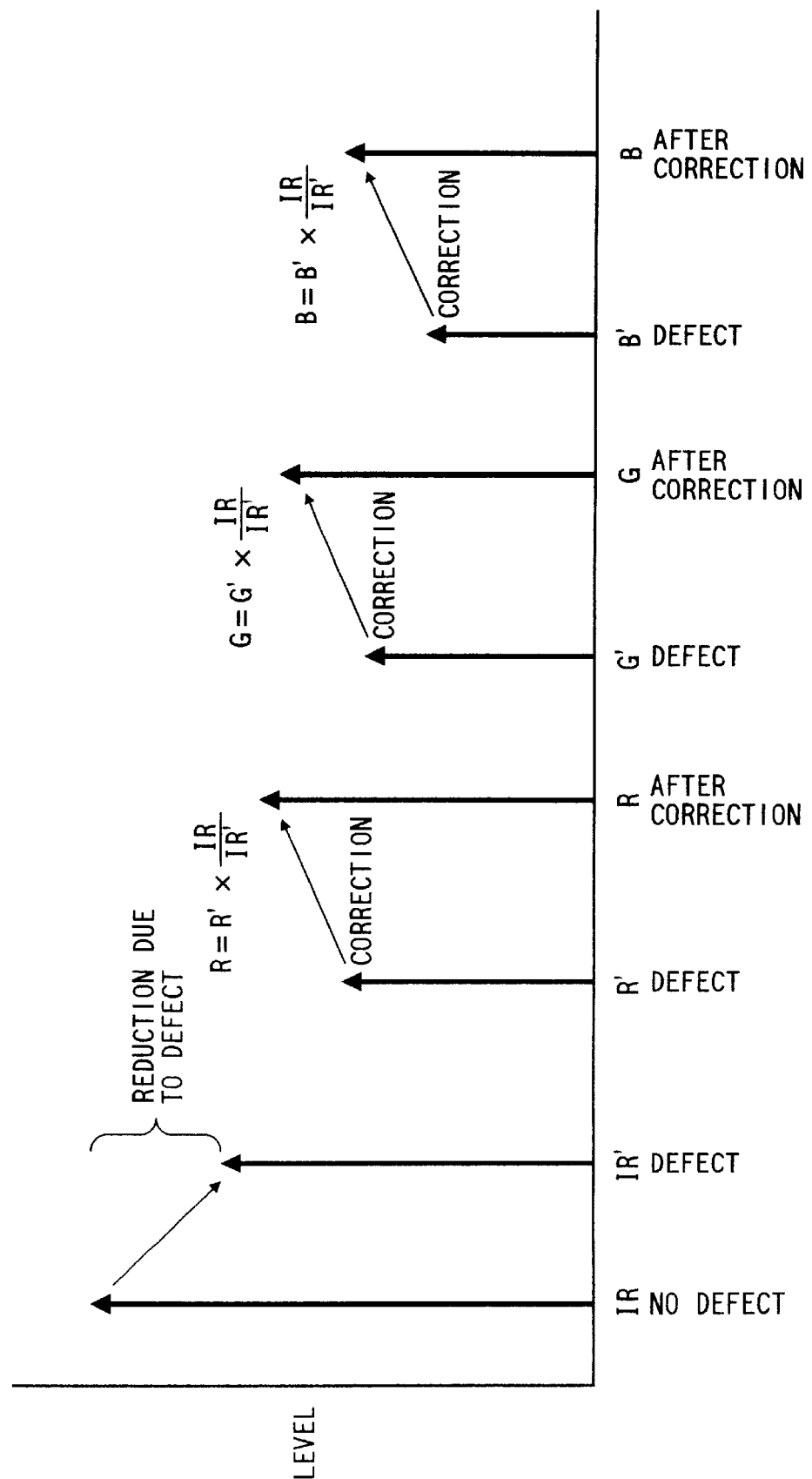
FIG. 4 is a diagram for explaining the principle of image processing.
Figure 5:
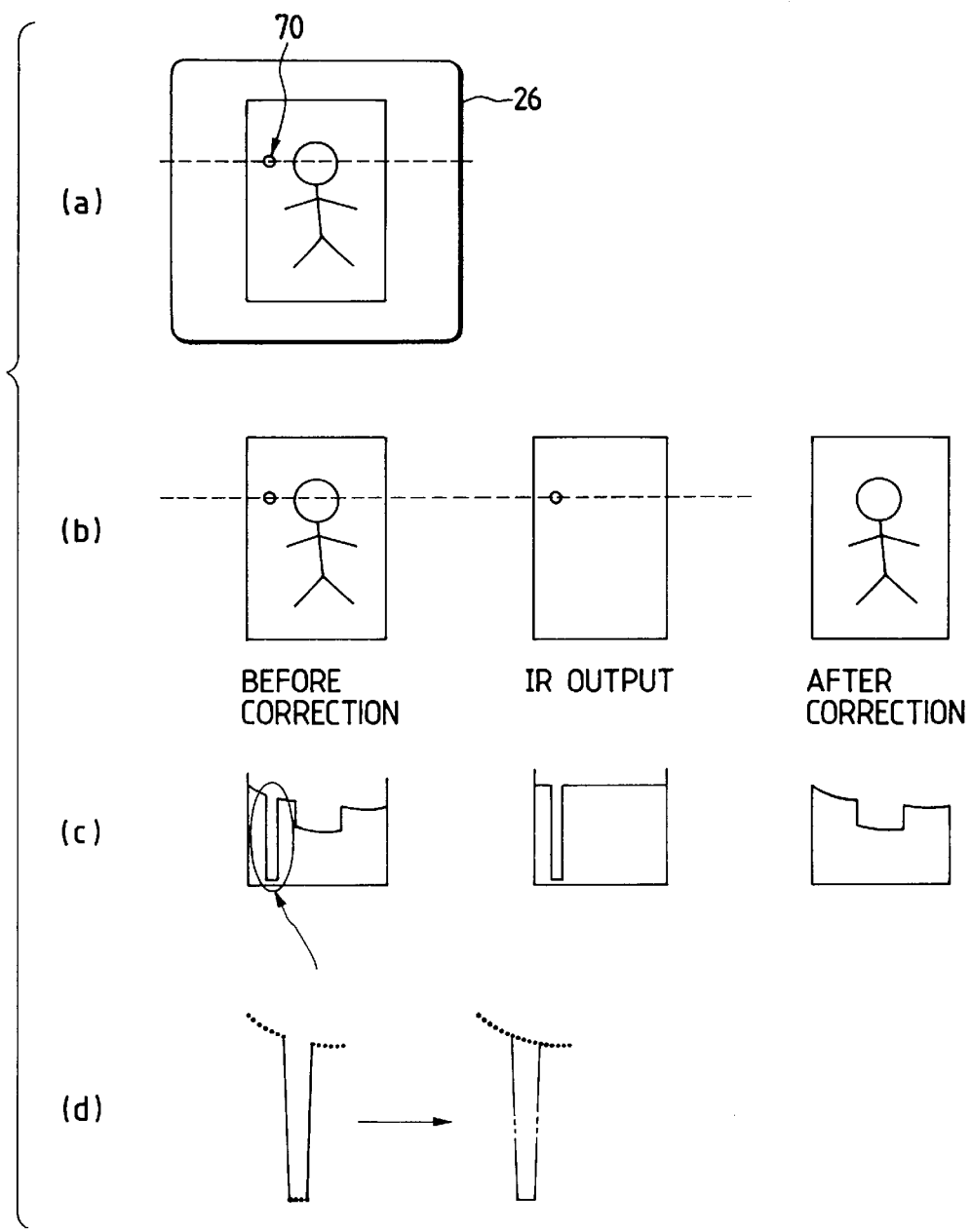
FIG. 5 includes schematic illustrations (a) to (d) for pictorially explaining correction of image data.
Figure 6:
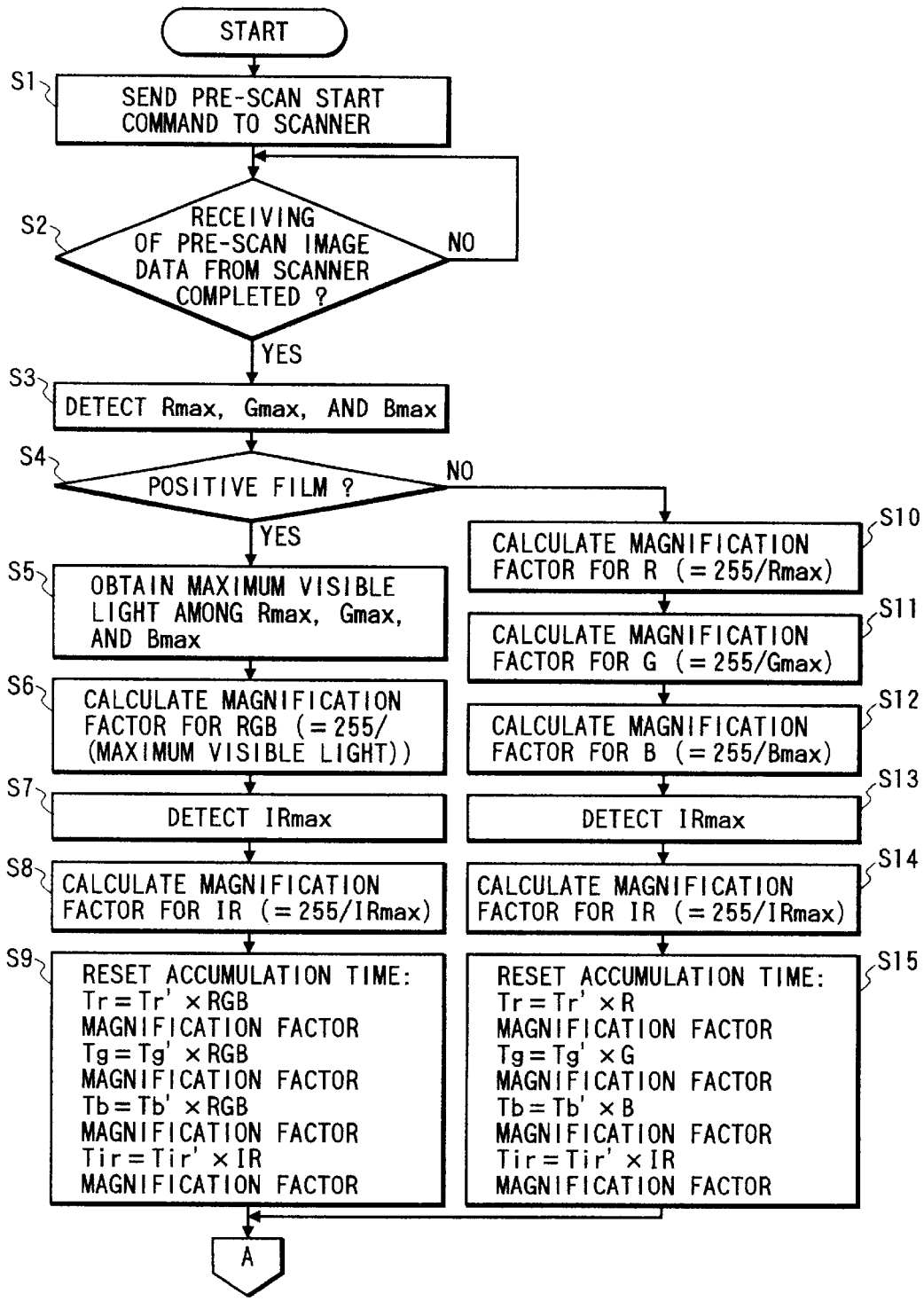
FIG. 6 is a flow chart showing the processing of a host computer.
Figure 7:
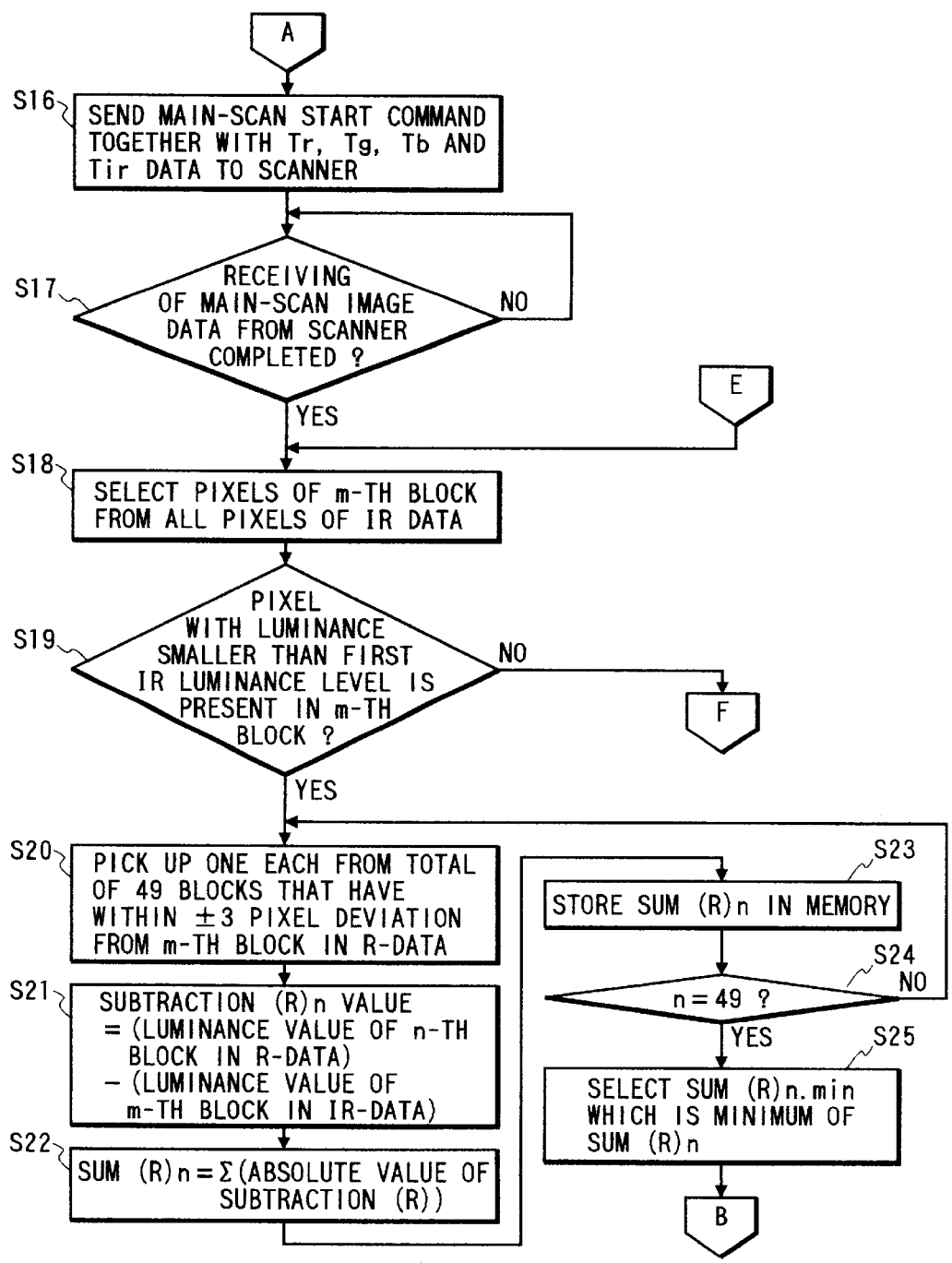
FIG. 7 is a flow chart showing the processing of the host computer and following FIG. 6.
Figure 8:
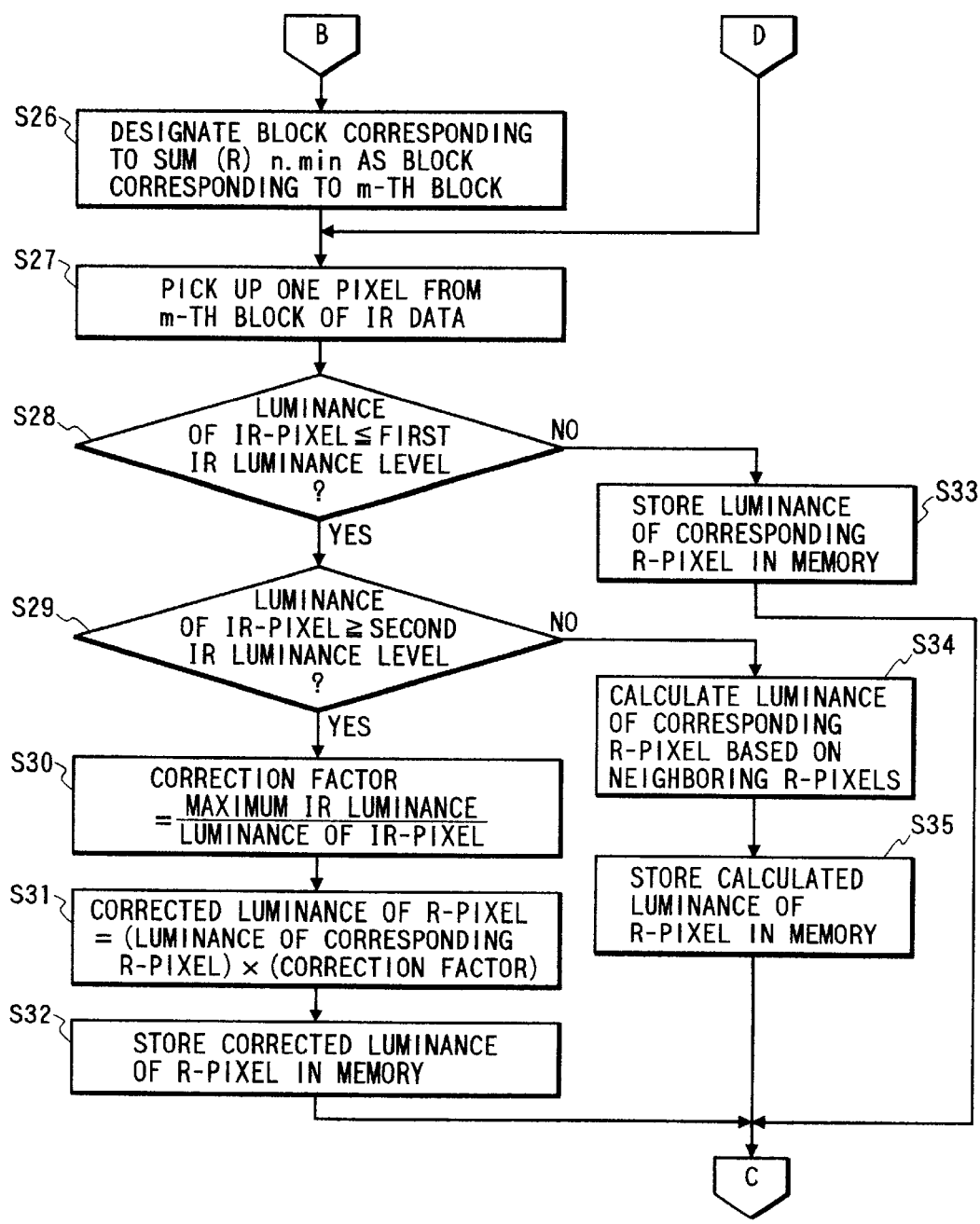
FIG. 8 is a flow chart showing the processing of the host computer and following FIG. 7.
Figure 9:
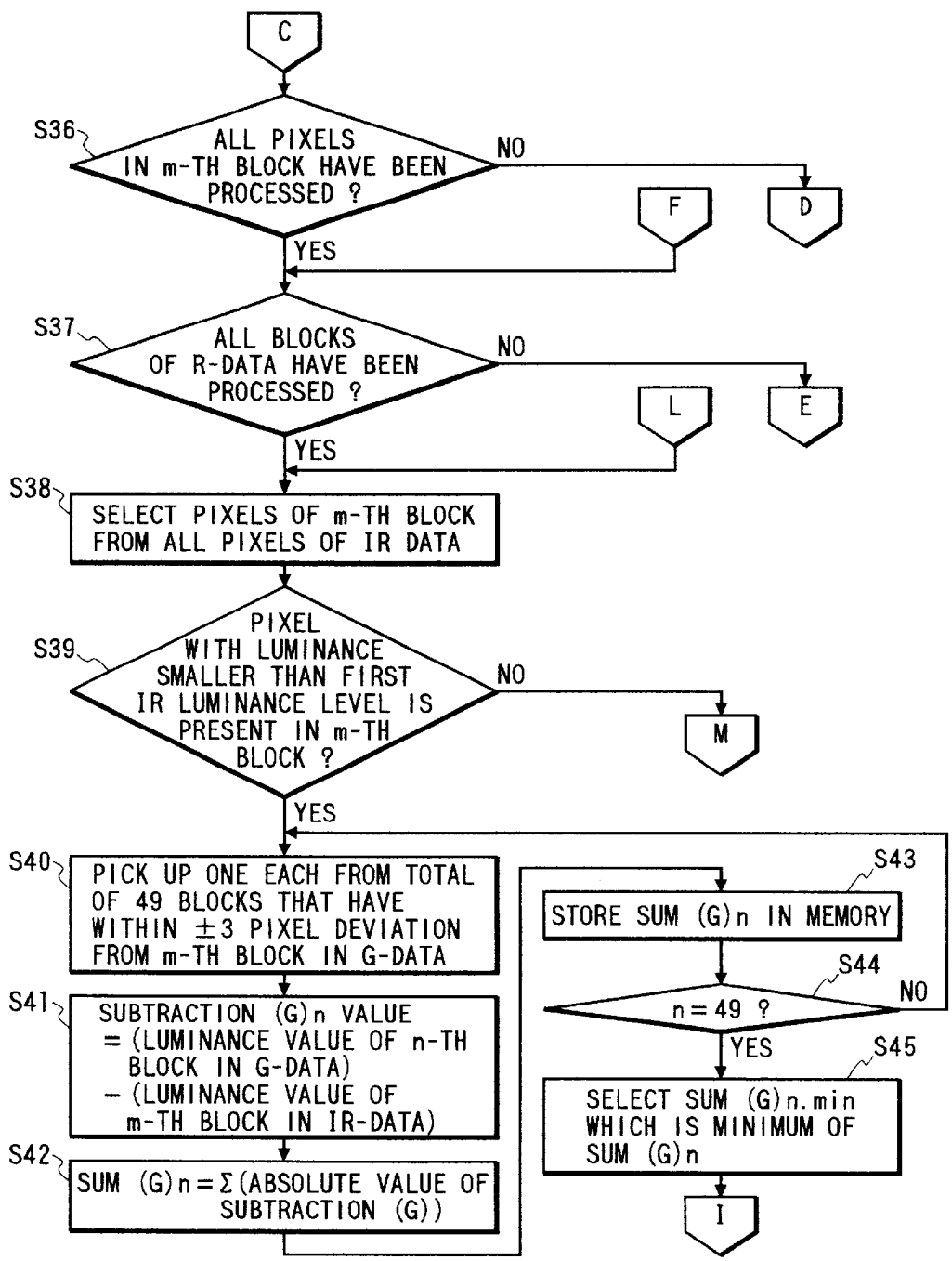
FIG. 9 is a flow chart showing the processing of the host computer and following FIG. 8.
Figure 10:
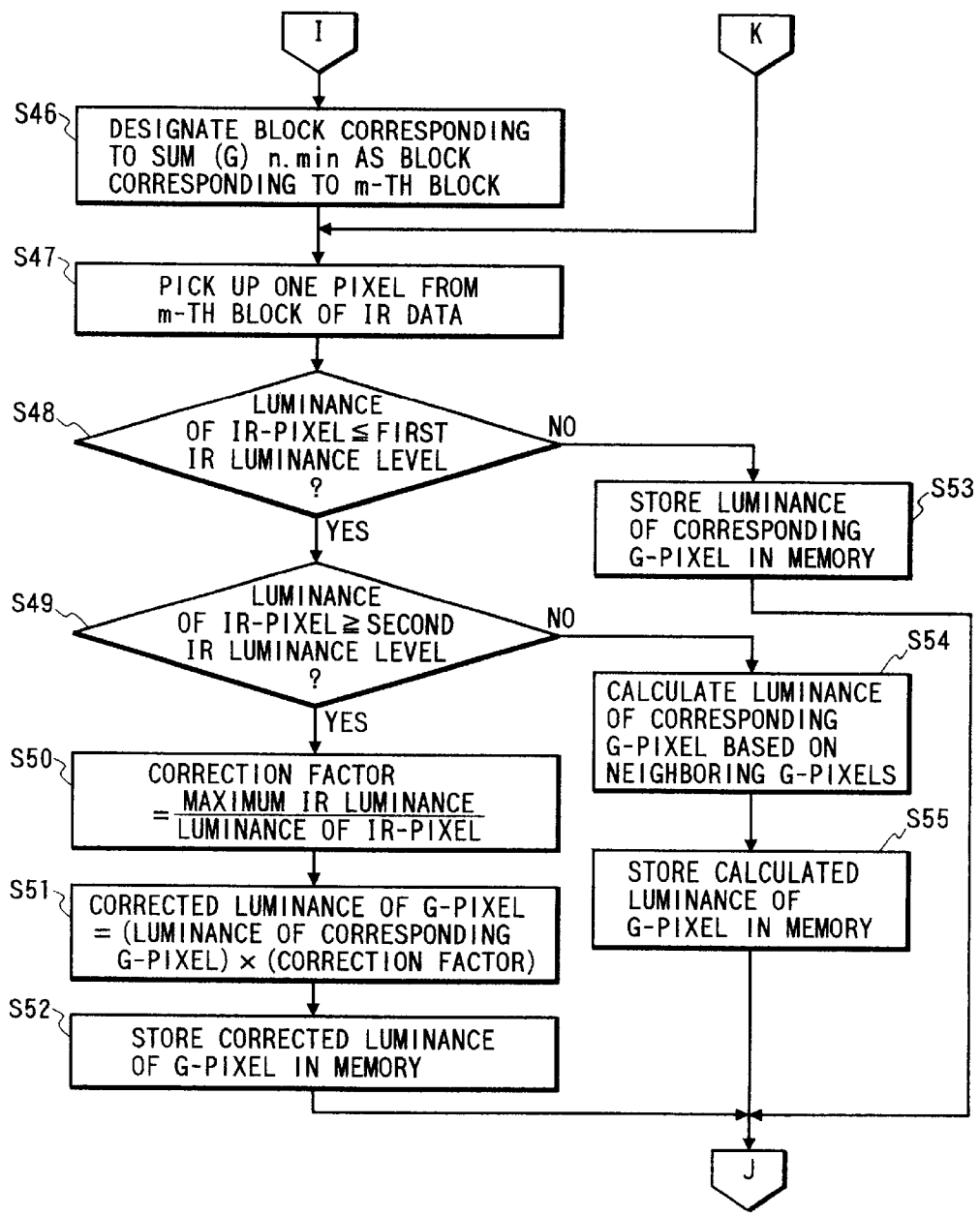
FIG. 10 is a flow chart showing the processing of the host computer and following FIG. 9.
Figure 11:
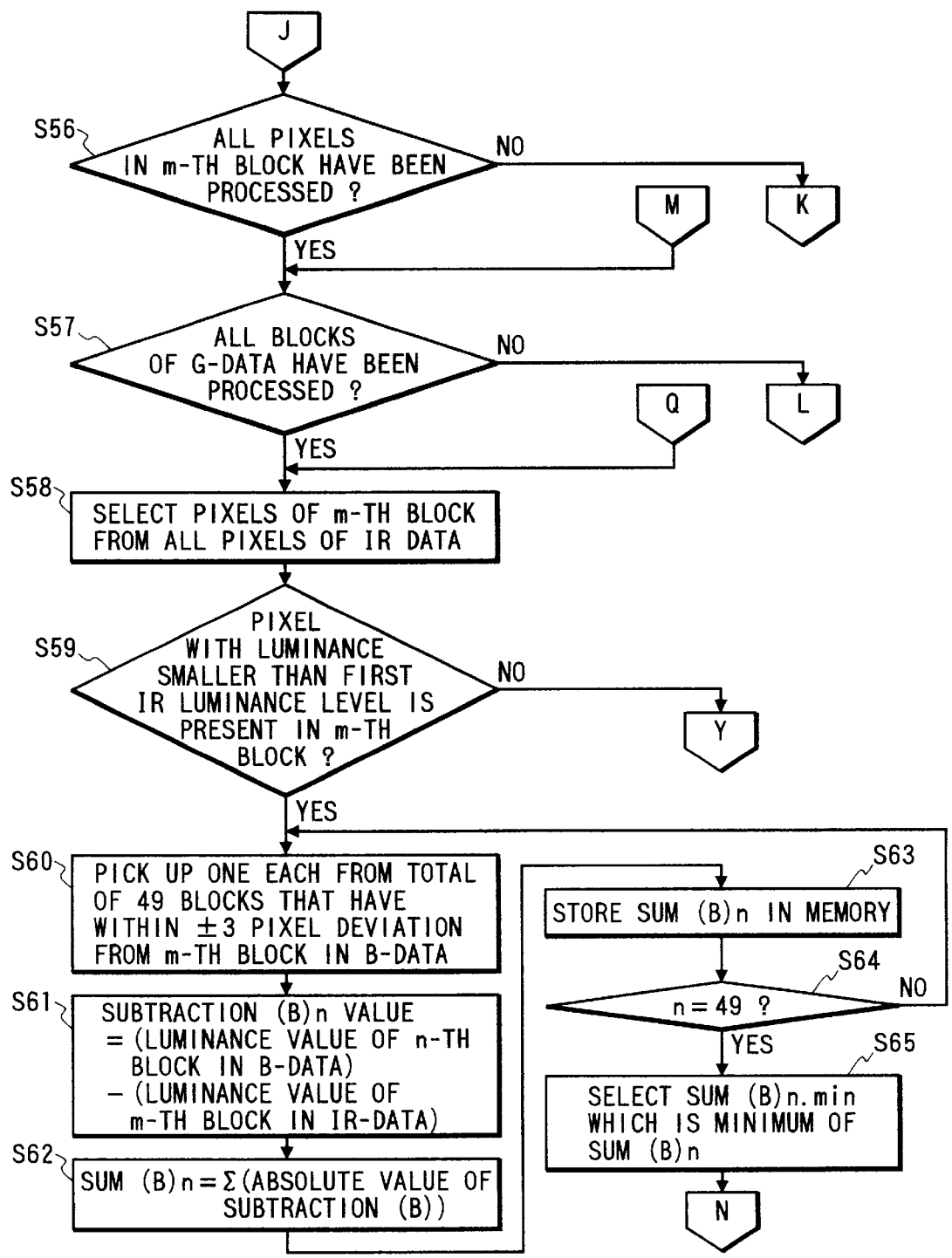
FIG. 11 is a flow chart showing the processing of the host computer and following FIG. 10.
Figure 12:
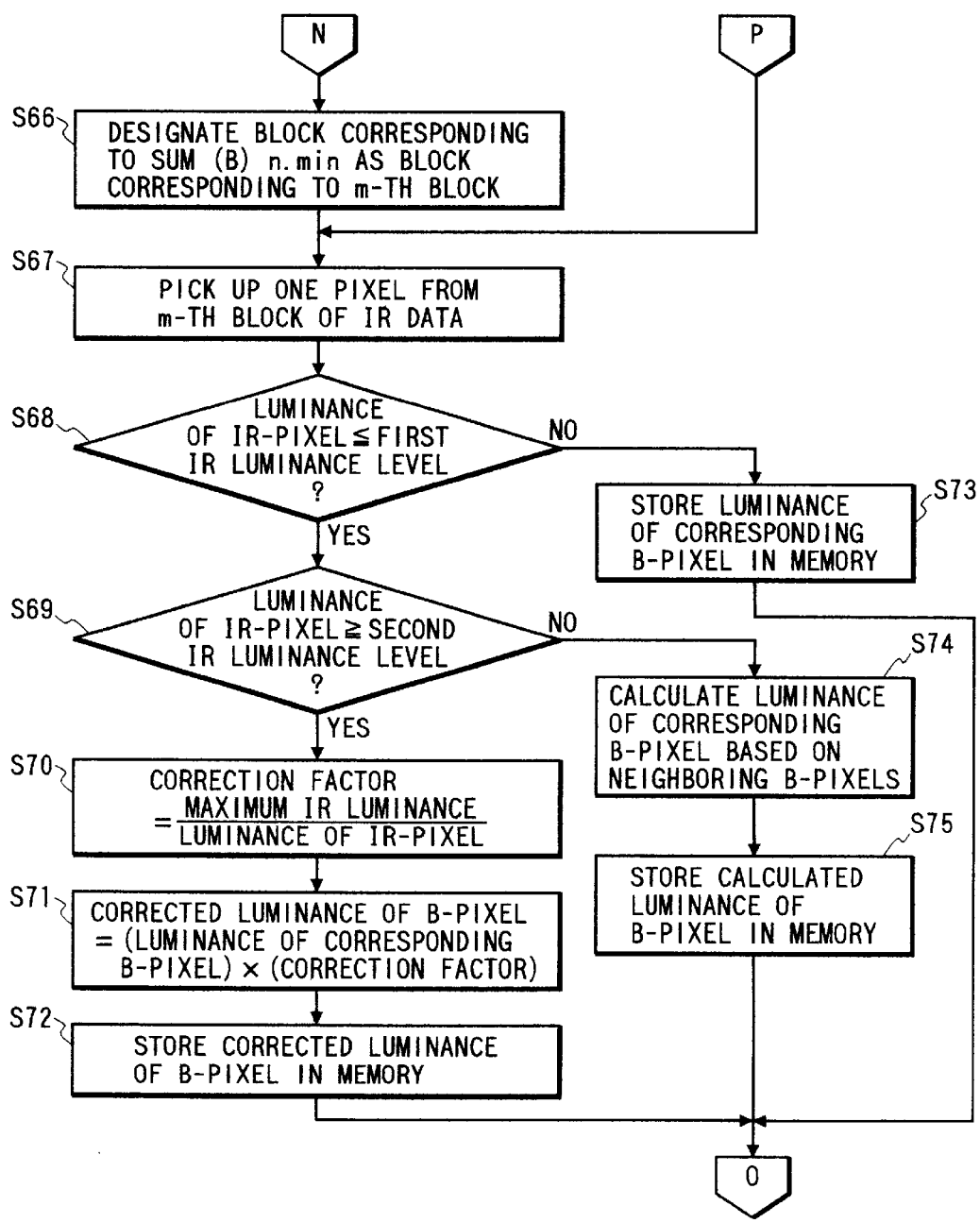
FIG. 12 is a flow chart showing the processing of the host computer and following FIG. 11.
Figure 13:
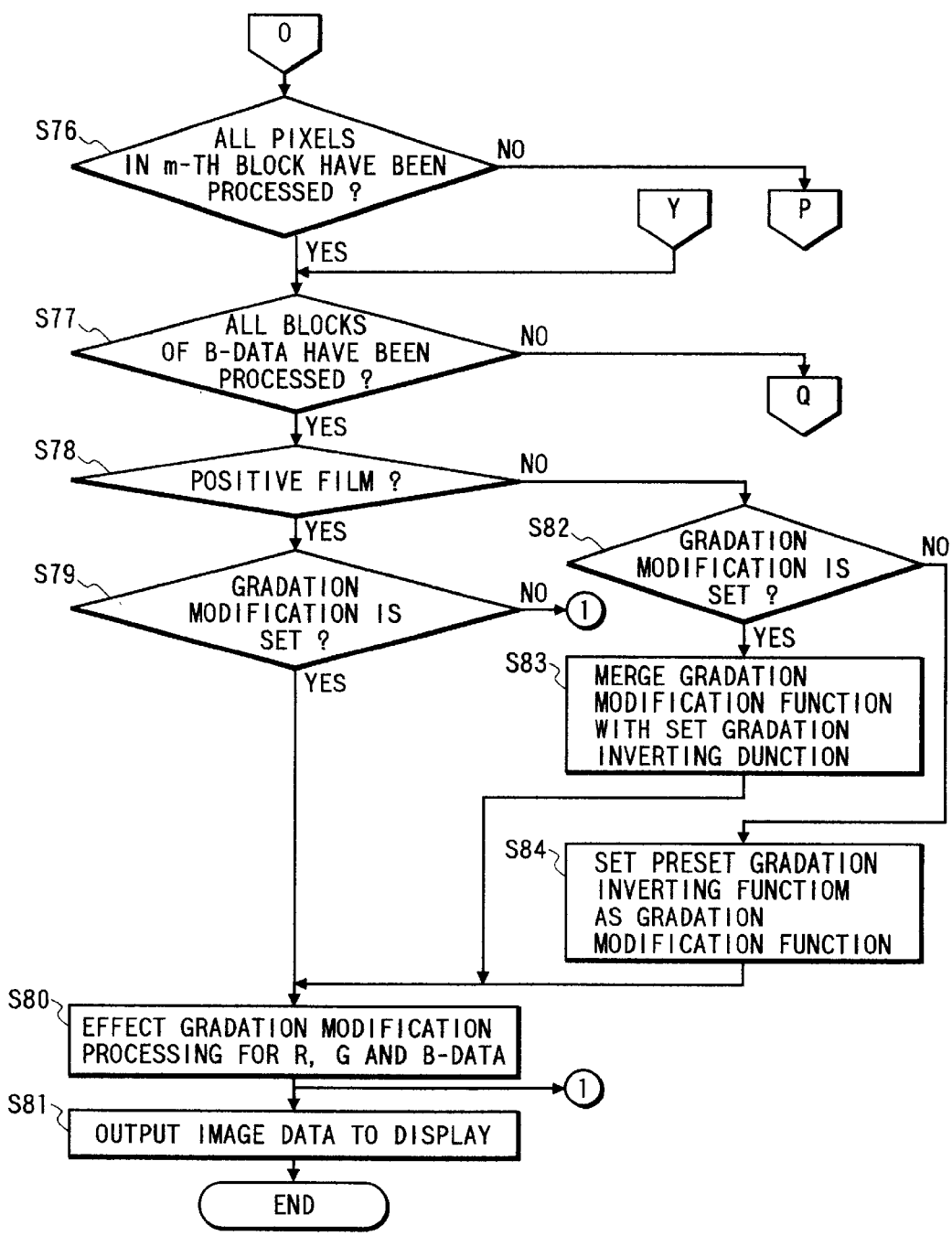
FIG. 13 is a flow chart showing the processing of the host computer and following FIG. 12.
Figure 30:
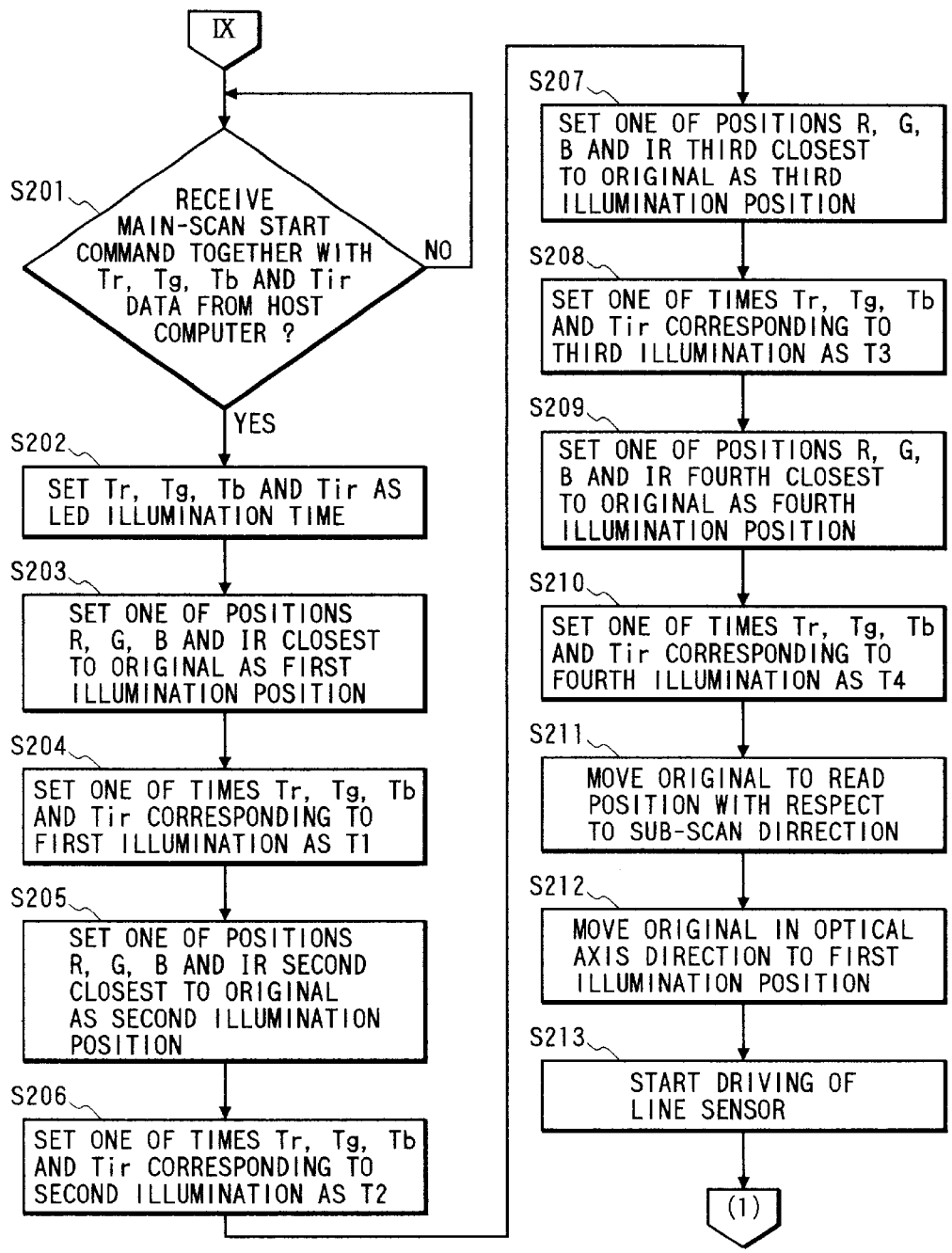
FIG. 30 is a flow chart showing scanner processing according to the second embodiment of the present invention.
Figure 31:
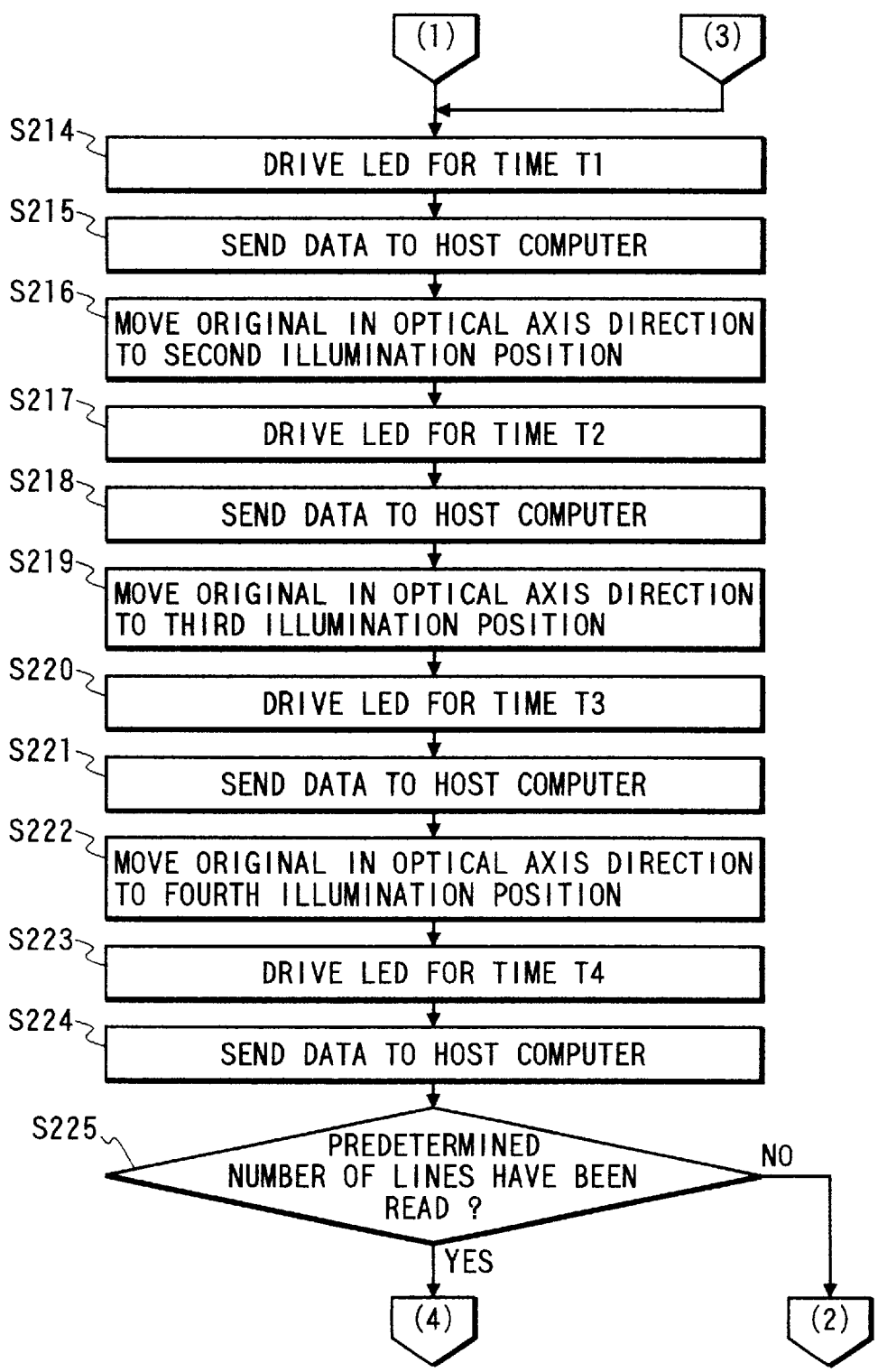
FIG. 31 is a flow chart showing the scanner processing according to the second embodiment of the present invention and continued from FIG. 30.
Figure 32:
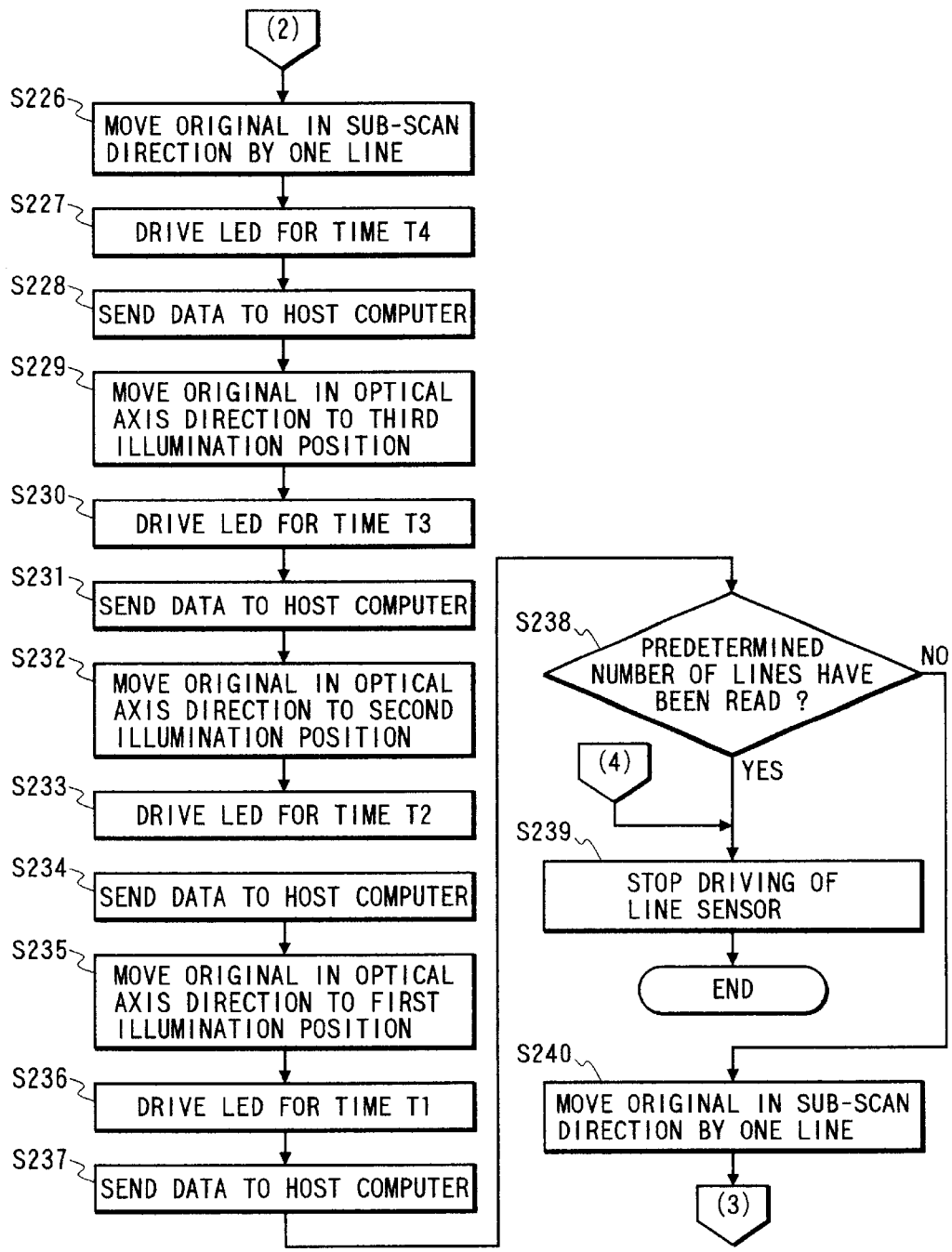
FIG. 32 is a flow chart showing the scanner processing according to the second embodiment of the present invention and continued from FIG. 31.
Figure 33:
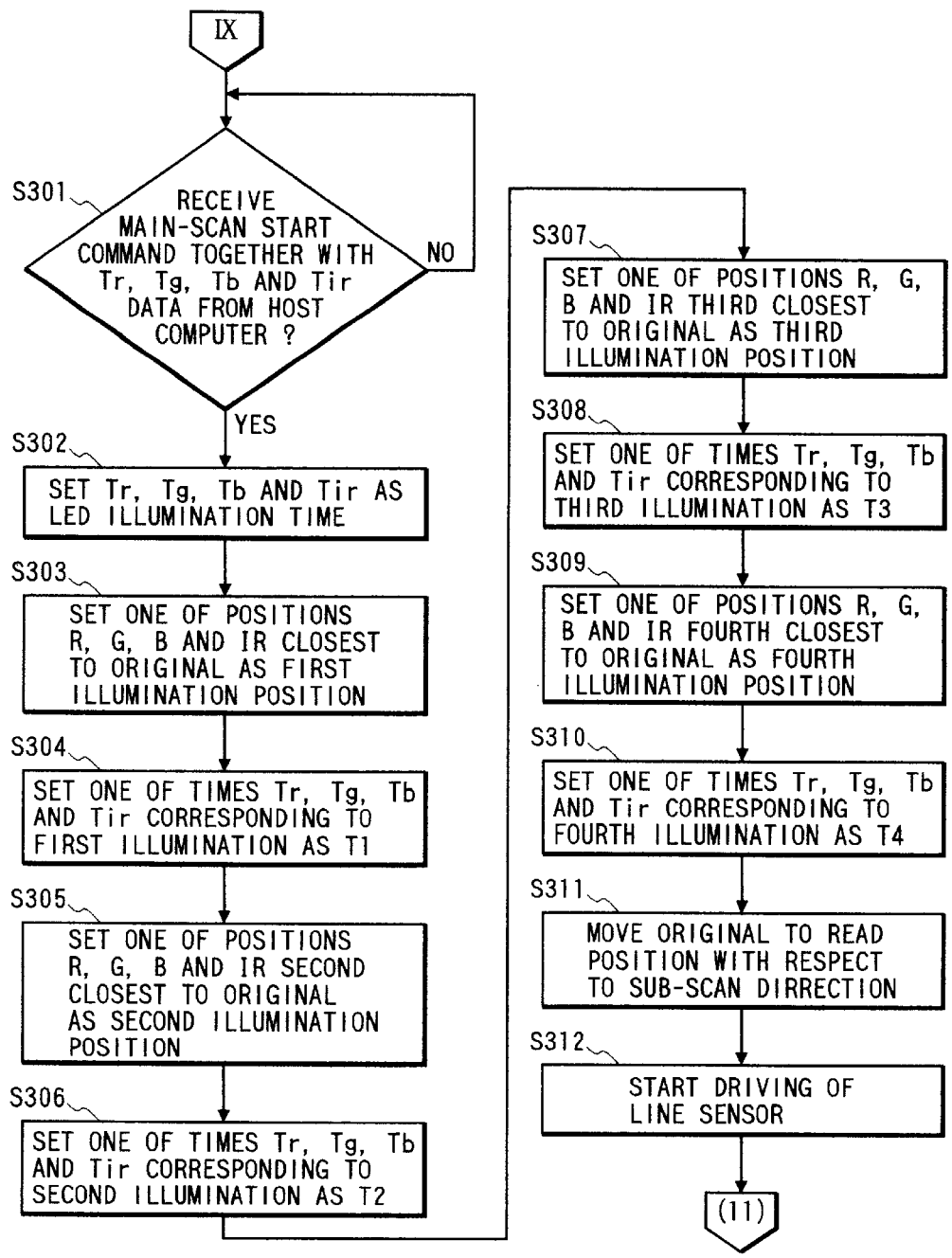
FIG. 33 is a flow chart showing the scanner processing according to the second embodiment of the present invention and continued from FIG. 32.
Figure 34:
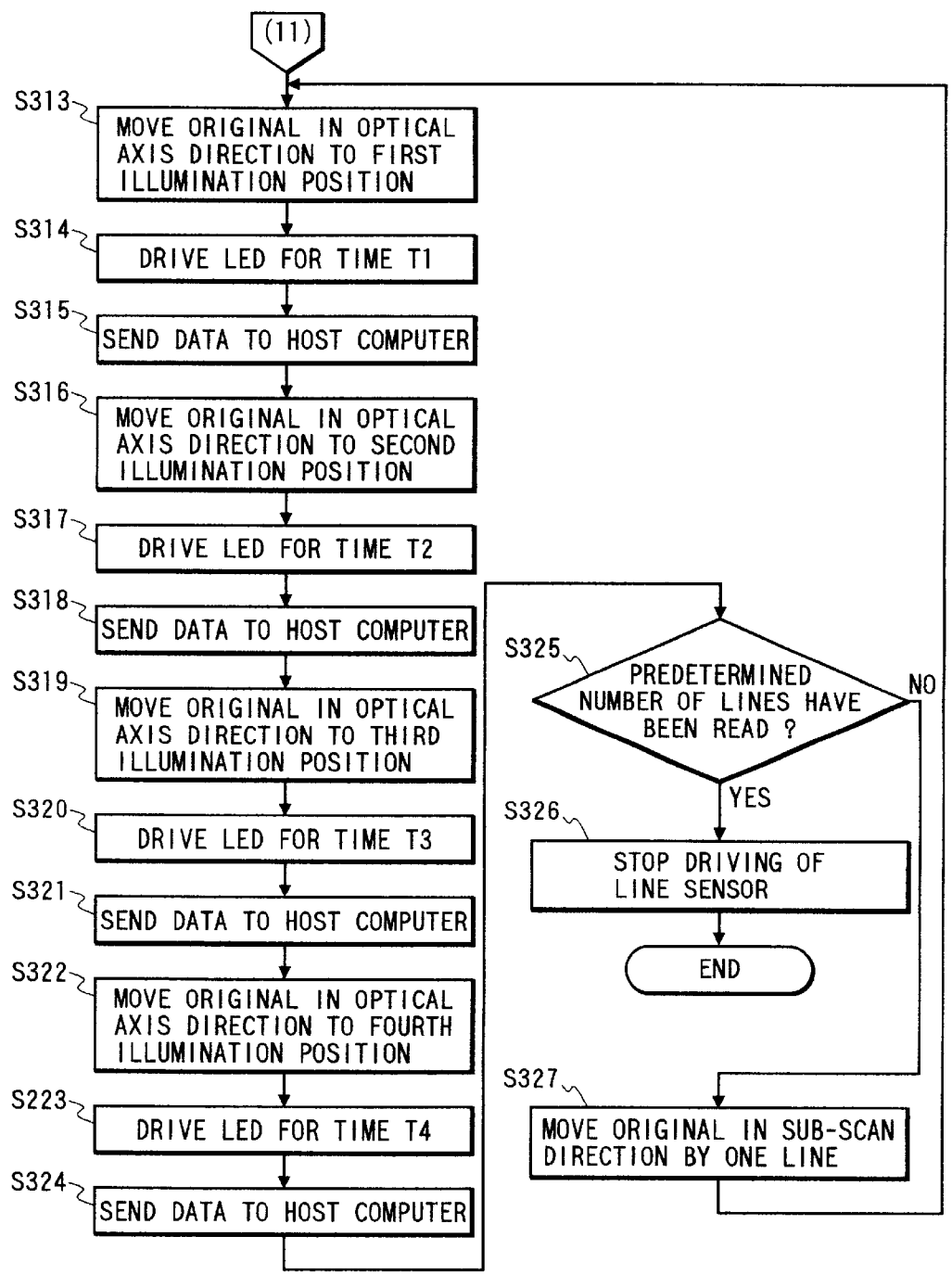
FIG. 34 is a flow chart showing the scanner processing according to the second embodiment of the present invention and continued from FIG. 33.
Figure 35:
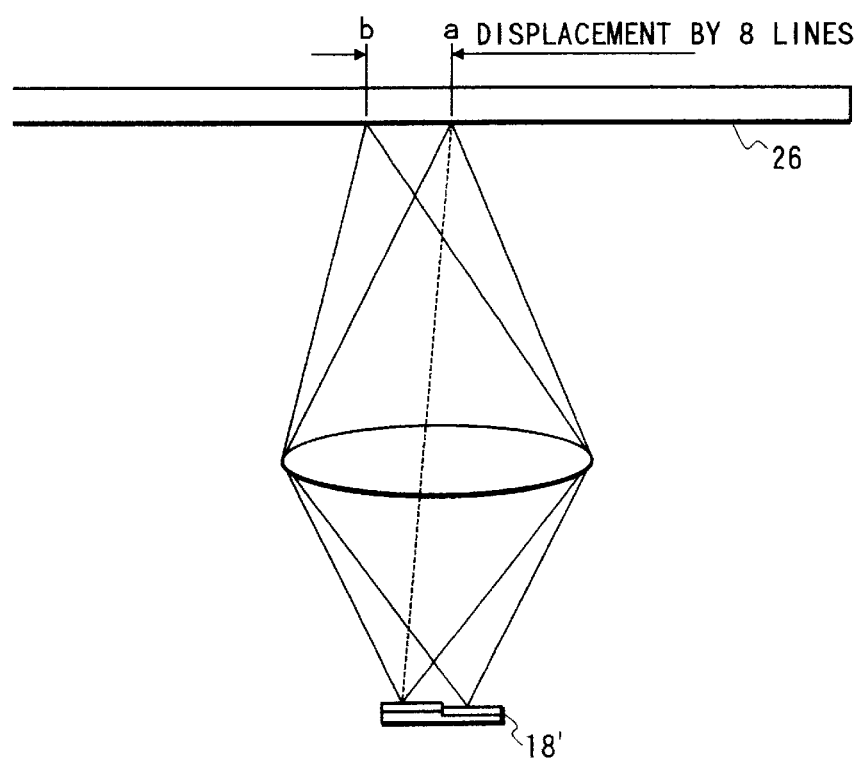
FIG. 35 is a view showing a structure in which two line sensors are disposed to have a step therebetween.
Figure 36:
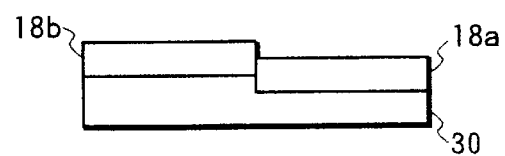
FIG. 36 is an enlarged view of the line sensor structure shown in FIG. 35.

Correction of this embodiment will be explained below with reference to FIGS. 4 through 36. Note that the image reader will also be called a "scanner" at times. FIG. 4 is a diagram for explaining the principle of image data correction. Sets of views (a) to (d) in FIG. 5 are views for explaining correction of image data. FIGS. 6 through 13 are flow charts showing the correction done by the host computer. FIGS. 14 through 17 are explanatory views of the alignment process. FIGS. 18 through 29 are flow charts of the operations of a scanner that reads an image by the plural pass color page sequence method (a method of reading the entire frame for one color, and then reading the frame for the next color) (first embodiment). FIGS. 30 through 32 are flow charts of the operations of a scanner that reads an image by the line interleaf method (a method of reading colors in units of lines) (second embodiment). FIGS. 33 and 34 are flow charts of the operation of a scanner that reads an image by the line interleaf method (third embodiment). FIG. 35 is a view showing the layout of the line sensor. FIG. 36 is an enlarged view of the line sensor shown in FIG. 35.

The principle of image data correction of this embodiment will be explained below with reference to FIGS. 4 and 5.

Upon reading an image on the film original 26, there are two methods, i.e., the line interleaf method of reading an image while switching colors in units of lines, and the plural pass color page sequence method for reading the entire frame for one color, and then reading the frame for the next color. In either method, the RAM 16 stores four color data, i.e., red (R), green (G), blue (B), and infrared (IR) data.

Note that these four color data have the following differences. The red (R), green (G), and blue (B) data as visible light data respectively correspond to the red (R), green (G), and blue (B) components of the film original 26. That is, the red (R), green (G), and blue (B) data represent density information of the film original 26. If dust, scratches, or the like are present on the film original 26, illumination light is shielded or scattered by such defects, and the amount of light that reaches the line sensor 18 decreases, and data of the portion where the dust, scratches, and the like are present indicate as if the corresponding portion of the film original 26 were dark (have high density). Hence, the red (R), green (G), and blue (B) data obtained are a superposition of "information of light shielded by dust, scratches, and the like" and "original density information of the film original".

On the other hand, since the film original 26 has no light-receiving sensitivity for infrared light (IR), no density differences are formed on the film original 26 with respect to infrared light (IR). Hence, when the illumination light is infrared light (IR), it is transmitted through the film original 26 with nearly no loss, and the obtained line data has nearly a constant value independently of film originals. However, if dust, scratches, and the like are present on the film original 26, since the illumination light is shielded or scattered by them, it does not reach the line sensor 18. That is, the line data obtained based on the infrared light (IR) is attenuated by dust, scratches, and the like.

To summarize, when four color illumination light beams, i.e., red (R), green (G), blue (R), and infrared (IR) light beams are used, "information based on light shielded by dust, scratches, and the like" is superposed on "original density information of the film original", which is also obtained by the conventional apparatus, in line data obtained by the red (R), green (G), and blue (R) illumination light beams. Of line data obtained by the infrared (IR) illumination light, "information based on light shielded by dust, scratches, and the like" is reflected in the data, the value of which is attenuated.

For this reason, in FIG. 4, when no defects are present on the film original 26, the transmission level of infrared light (IR) indicates a constant value (maximum value), while the transmission levels of red (R), green (G), and blue (B) light beams indicate those corresponding to the original density. When defects are present on the film original 26, these transmission levels are attenuated at each defect position. Especially, since the level of infrared light (IR') at each defect position is attenuated from the maximum value obtained from the original free from any defects, the ratio (IR/IR') between these levels represents the ratio of attenuation at that defect position.

Hence, the transmission level (IR) of the infrared light obtained from the original free from any defects may be determined by detecting transmitted light. If such value is known, the value may be pre-stored in a memory. However, the transmission level of the infrared light on the film original 26 may be monitored, and when the transmission level (IR') attenuated from the maximum value is detected, the ratio (IR/IR') between the two levels may be calculated, and attenuated red (R'), green (G'), and blue (B') levels may be multiplied by the calculated ratio, thus correcting these attenuated levels to the red (R), green (G), and blue (B) levels obtained from the original free from any defects.

For example, when dust 70 is attached to the film original 26, as shown in row (a) of FIG. 5, frame data obtained by three color illumination light beams, i.e., red (R), green (G), and blue (B) light beams includes an image of the dust 70 in addition to a person image, as indicated by the left image of row (b) of FIG. 5. The corresponding line data includes data corresponding to the person image, and data corresponding to the attached portion of the dust 70, as indicated by the arrow in the left graph of row (c) of FIG. 5. On the other hand, frame data obtained based on infrared (IR) illumination light includes a dark portion at the position corresponding to the dust 70, as indicated by the central image in row (b) of FIG. 5. In the corresponding line data, data corresponding to the attached portion of the dust 70 is attenuated, as indicated by the central graph in row (c) of FIG. 5.

In this way, the presence/absence of the dust 70 can be determined based on line data obtained by infrared (IR) illumination light, and when the presence of the dust 70 can be detected, the position of that dust 70 can be specified. Since data obtained from this specified position on the basis of red (R), green (G), and (B) illumination light beams also include information arising from the dust 70 (indicated by the arrow in the left graph in row (c) of FIG. 5), if the data obtained at the same position on the basis of red (R), green (G), and blue (B) illumination light beams are multiplied by the ratio (IR/IR'), the frame data can be corrected as if the dust 70 were not present (the right image in row (b) of FIG. 5, and the right graph in row (c) of FIG. 5).

Note that this correction is effective only when the red (R), green (G), and blue (B) data attenuated by the defect include information obtained when they are free from any defect. That is, upon calculating the ratio (IR/IR'), if the IR' level is too low, data obtained based on the R, G, and B illumination light beams cannot be corrected. When the IR' level is lower than a certain predetermined threshold value, correction cannot be done by merely multiplying the ratio (IR/IR').

In such case, correction can be attained by the following interpolation. In general, since the area occupied by dust, or the like is not so large, it is unlikely to include any density difference (i.e., a figure) on the film original 26 but is rather likely to include a uniform density. Hence, as for the data portion where presence of dust, or the like is specified, data of neighboring portions are used and concatenated smoothly (see row (d) of FIG. 5), thus realizing correction that can obtain a natural image with respect to the original image on the film original 26 (see the right image in row (b) of FIG. 5).

Since the above-mentioned correction is done by collaboration of the host computer 1 and scanner 2, it will be explained as the processing of the host computer 1 and that of the scanner 2 separately. The correction of the host computer 1 will be explained first (FIGS. 6 through 17), and after that, reading of the scanner 2 will be explained. As for the scanner 2, an operation example of the plural pass color page sequence method (FIGS. 18 through 29: first embodiment), and two operation examples of the line interleaf method (FIGS. 30 through 32: second embodiment, FIGS. 33 and 34: third embodiment) will be explained.

(A) Processing of Host Computer 1

In FIGS. 6 through 13, the host computer 1 transmits a pre-scan start command to the scanner 2 in response to clicking at a scan button on a menu screen by the user in step S1. The scanner 2 executes a pre-scan, as will be described later (FIGS. 18 through 25), and sends pre-scan image data to the host computer 1. The pre-scan image data include red (R), green (G), blue (B), and infrared (IR) data proportional to the transmission light intensities of the individual colors.

In step S2, the host computer 1 waits until all such pre-scan image data are received from the scanner 2. If all the pre-scan image data are received, the host computer 1 makes an affirmative decision (YES) in step S2, and the flow advances to step S3.

In step S3, the host computer 1 detects maximum values Rmax, Gmax, and Bmax of the red (R), green (G), and blue (B) data from the received pre-scan image data. The host computer 1 then checks in step S4 if the set film is a positive film. Note that the maximum values of the individual color data are those of the transmission light intensities, and correspond to the minimum values of the densities on the film.

If the set film is a positive film, the host computer 1 makes an affirmative decision (YES) in step S4, and the flow advances to the processing in steps S5 through S9. After that, the host computer 1 executes the processing in steps S16 through S84. On the other hand, if the set film is a negative film, the host computer 1 makes a negative decision (NO) in step S4, and the flow advances to the processing in steps S10 through S15. The host computer 1 then executes the processing in steps S16 through S84.

In the processing in steps S5 through S9, and that in steps S10 through S15, the accumulation time in a main scan is set.

1) When the set film is a positive film: In step S5, the host computer 1 sets the largest one of Rmax, Gmax, and Bmax detected in step S3 to be maximum visible light. In step S6, the host computer 1 calculates the magnification factor for RGB so as to set the maximum visible light near the full-scale level of the A/D converter 19. More specifically, if the A/D converter 19 has an 8-bit precision, since the full-scale level is 255, the host computer 1 calculates the magnification factor for RGB=255/maximum visible light.

In step S7, the host computer 1 detects a maximum value IRmax of the infrared (IR) data from the received pre-scan image data. In step S8, the host computer 1 calculates the magnification factor for IR so as to set IRmax near the full-scale level of the A/D converter 19. More specifically, if the A/D converter 19 has an 8-bit precision, the host computer 1 calculates the magnification factor for IR=255/IRmax.

In step S9, the host computer 1 multiplies accumulation times Tr', Tg', Tb', and Tir' in the pre-scan by the calculated magnification factors to set accumulation times Tr, Tg, Tb, and Tir for the main scan. More specifically, the host computer 1 calculates Tr=Tr'×magnification factor for RGB, Tg=Tg'×magnification factor for RGB, Tb=Tb'×magnification factor for RGB, and Tir=Tir'×magnification factor for IR in step S9, and the flow then advances to step S16.

2) When the set film is a negative film: In this case, the magnification factors for R, G, and B are calculated so as to respectively set Rmax, Gmax, and Bmax detected in step S3 near the full-scale level of the A/D converter 19.

More specifically, in step S10, the host computer 1 calculates the magnification factor for R=255/Rmax using Rmax detected in step S3. In step S11, the host computer 1 calculates the magnification factor for G=255/Gmax using Gmax detected in step S3. In step S12, the host computer 1 calculates the magnification factor for B=255/Bmax using Bmax detected in step S3.

In step S13, the host computer 1 detects a maximum value IRmax of the infrared (IR) data from the received pre-scan image data. In step S14, the host computer 1 calculates the magnification factor for IR so as to set IRmax near the full-scale level of the A/D converter 19. More specifically, the host computer 1 calculates the magnification factor for IR=255/IRmax, and the flow then advances to step S15.

In step S15, the host computer 1 multiplies accumulation times Tr', Tg', Tb', and Tir' in the pre-scan by the calculated magnification factors to set accumulation times Tr, Tg, Tb, and Tir for the main scan. More specifically, the host computer 1 calculates Tr=Tr'×(magnification factor for R), Tg=Tg'×(magnification factor for G), Tb=Tb'×(magnification factor for B), and Tir=Tir'×(magnification factor for IR) in step S15, and the flow advances to step S16.

In step S16, the host computer 1 transmits the calculated accumulation time data Tr, Tg, Tb, and Tir, and a main-scan start command to the scanner 2. Upon receiving these data and command, the scanner 2 reads main-scan image data by the plural pass color page sequence method (FIGS. 26 through 29) or the line interleaf method (FIGS. 30 through 32 or FIGS. 33 and 34). The host computer 1 waits in step S17 until reception of main-scan image data from the scanner 2 is complete.

Upon completion of reception of the main-scan image data from the scanner 2, the host computer 1 makes an affirmative decision (YES) in step S17, and selects one pixel block (m-th block) from a plurality of blocks each comprising a predetermined number of pixels, and obtained by breaking up all the pixels of the IR data in step S18. The host computer 1 checks in step S19 if the selected m-th block in the IR data includes a pixel with luminance lower than a first IR luminance level. That is, the host computer 1 checks in step S19 whether or not the selected m-th block includes a defect. The first IR luminance level corresponds to a transmission level obtained when the film original 26 is free from any defects. In case of a positive film, the first IR luminance level is obtained by multiplying IRmax detected in step S7 by the magnification factor for IR obtained in step S8. On the other hand, in case of a negative film, the first IR luminance level is obtained by multiplying IRmax detected in step S13 by the magnification factor for IR calculated in step S14.

If the decision result in step S19 is affirmative (YES), i.e., if the selected m-th block includes a defect, the host computer 1 performs alignment or identification between the m-th block as a defect block of the IR data, and a corresponding defect block in the R data in steps S20 through S37, as shown in, e.g., FIGS. 14 through 17. Since the IR data and each color data (e.g., R data) are independently read, the pixel read position of the IR data normally deviates from that of each color data. Therefore, such alignment between the defect block in the IR data and the corresponding block in each color data is required.

Figure 14:
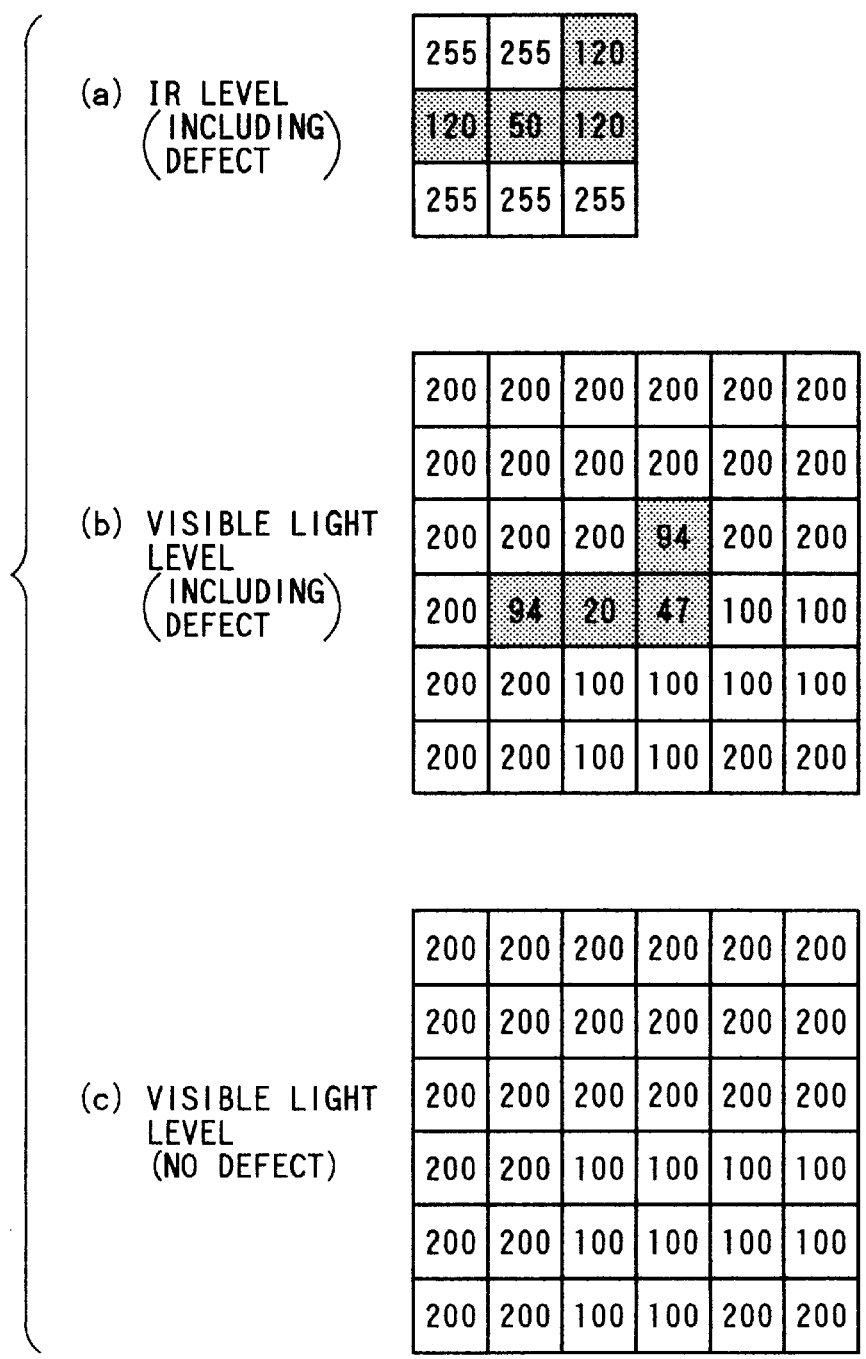
FIG. 14 is a diagram for explaining an alignment process.
Figure 18:
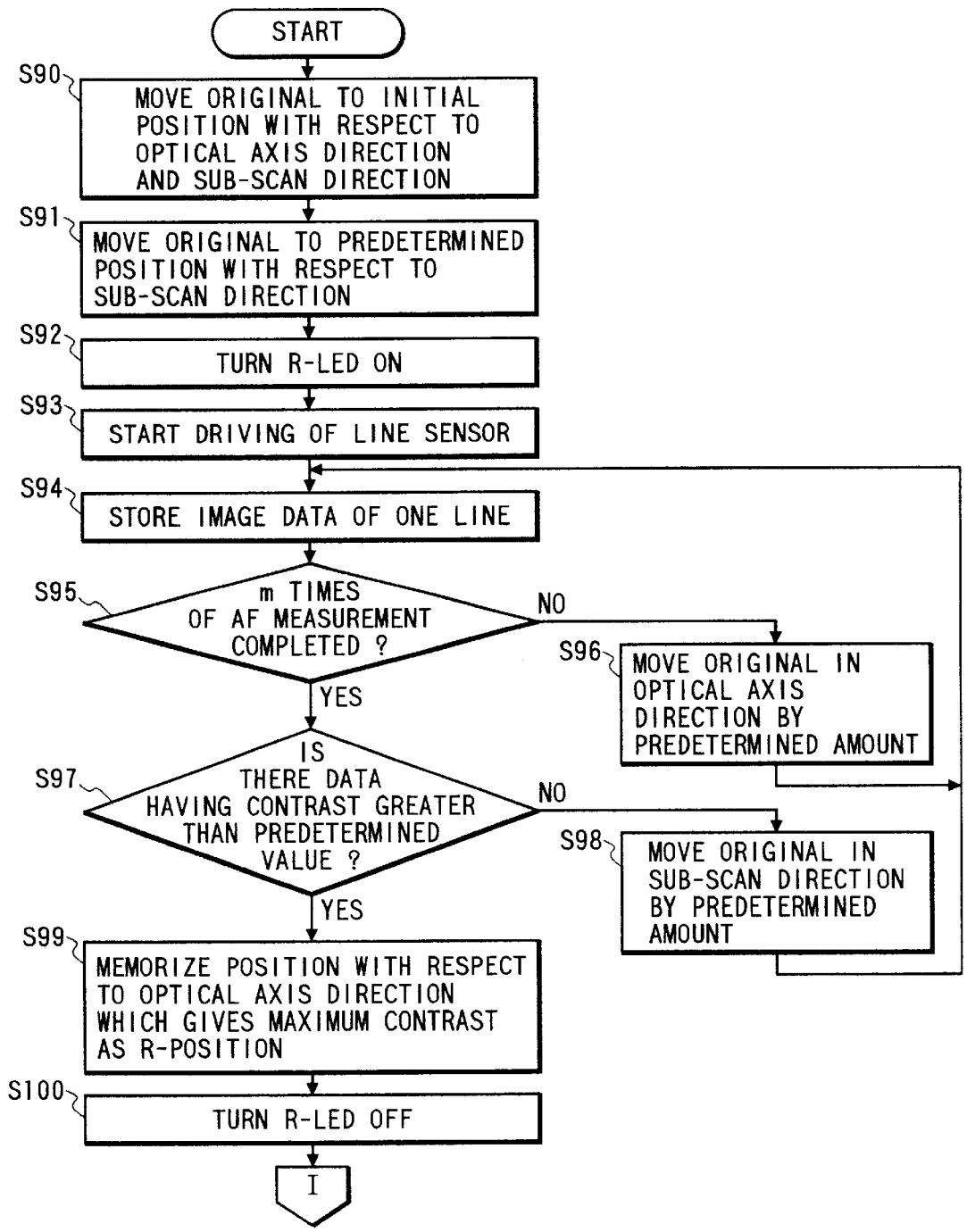
FIG. 18 is a flow chart showing scanner processing according to the first embodiment of the present invention.
Figure 19:
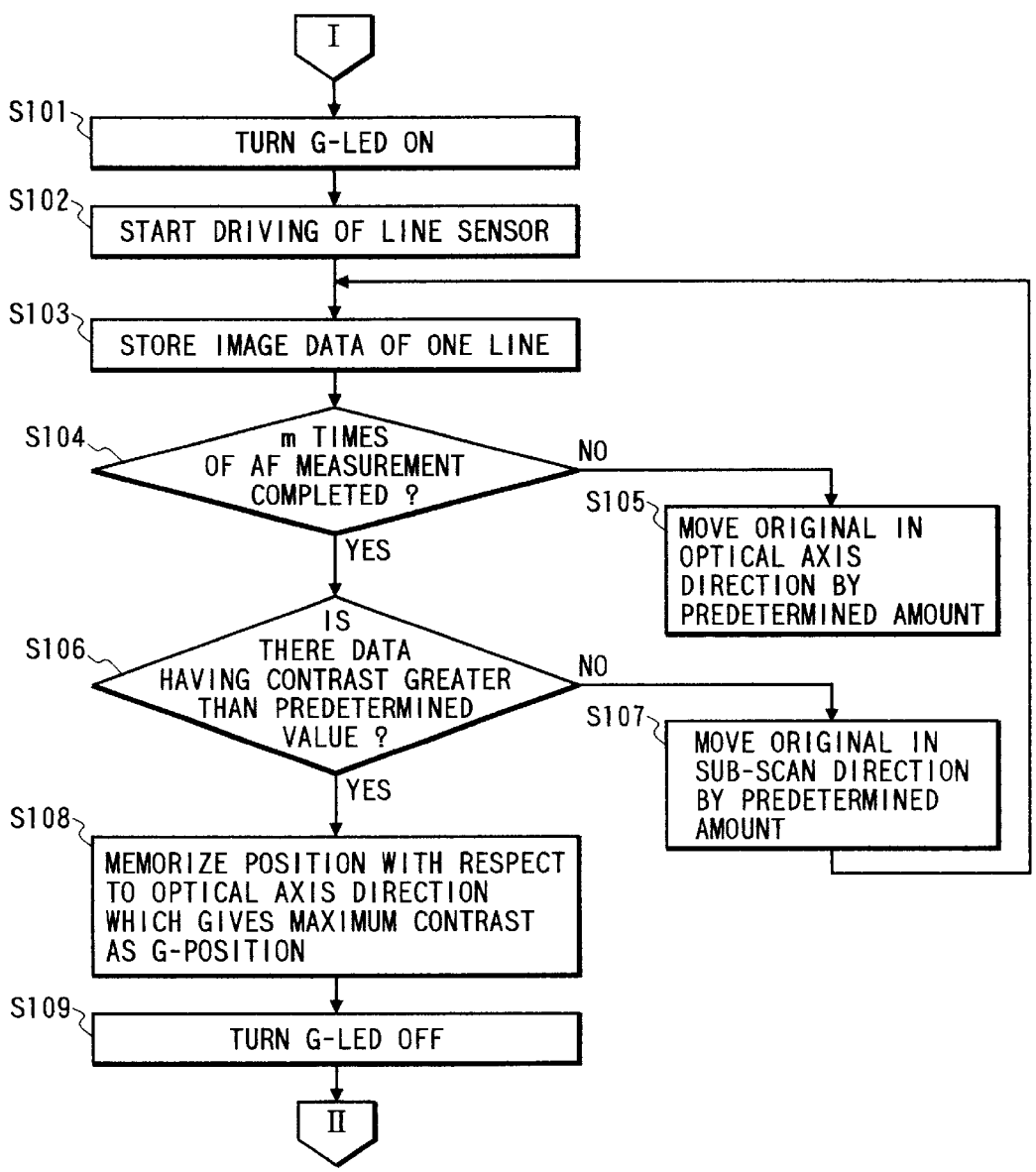
FIG. 19 is a flow chart showing the scanner processing according to the first embodiment of the present invention and continued from FIG. 18.
Figure 20:
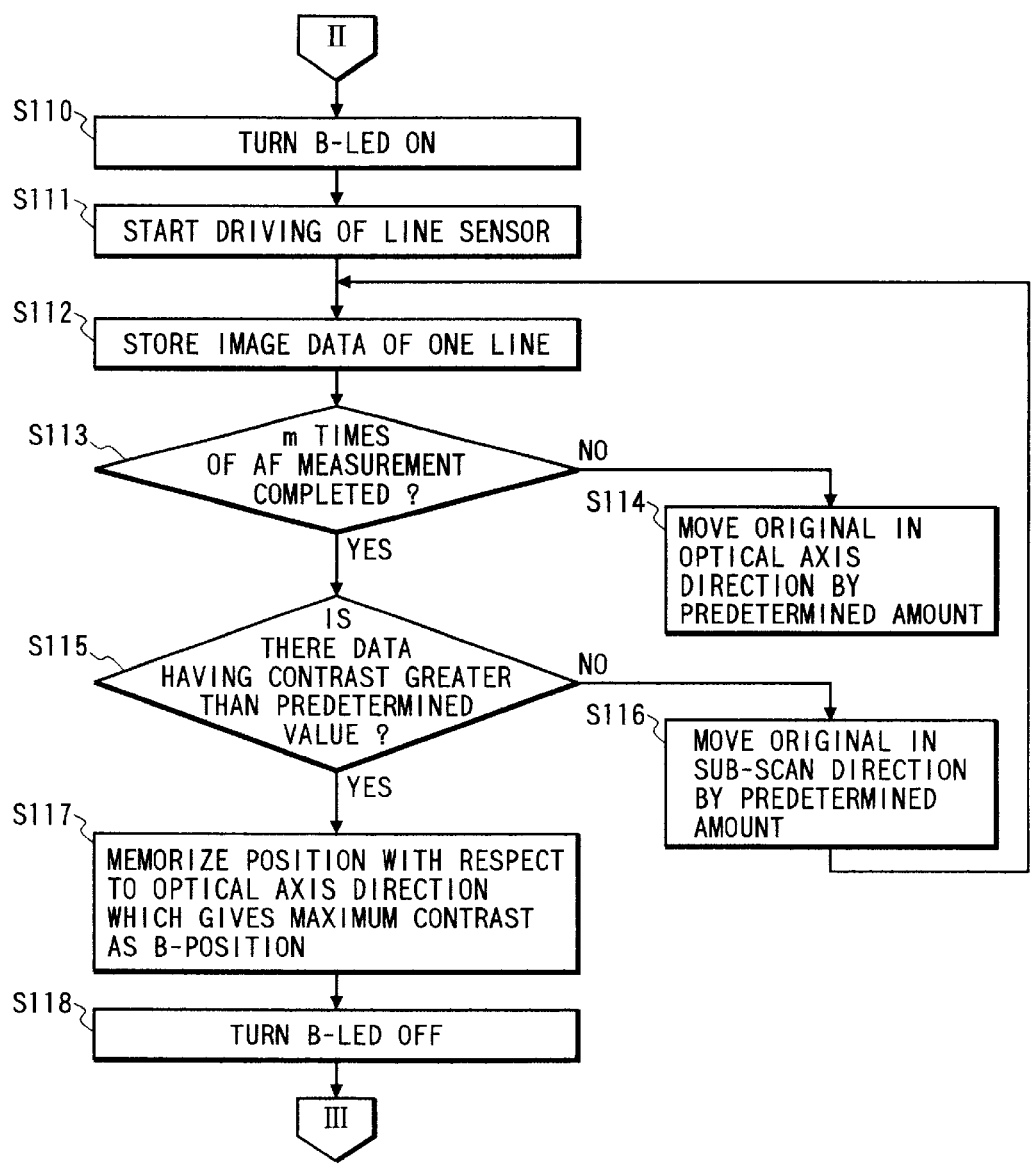
FIG. 20 is a flow chart showing the scanner processing according to the first embodiment of the present invention and continued from FIG. 19.
Figure 21:
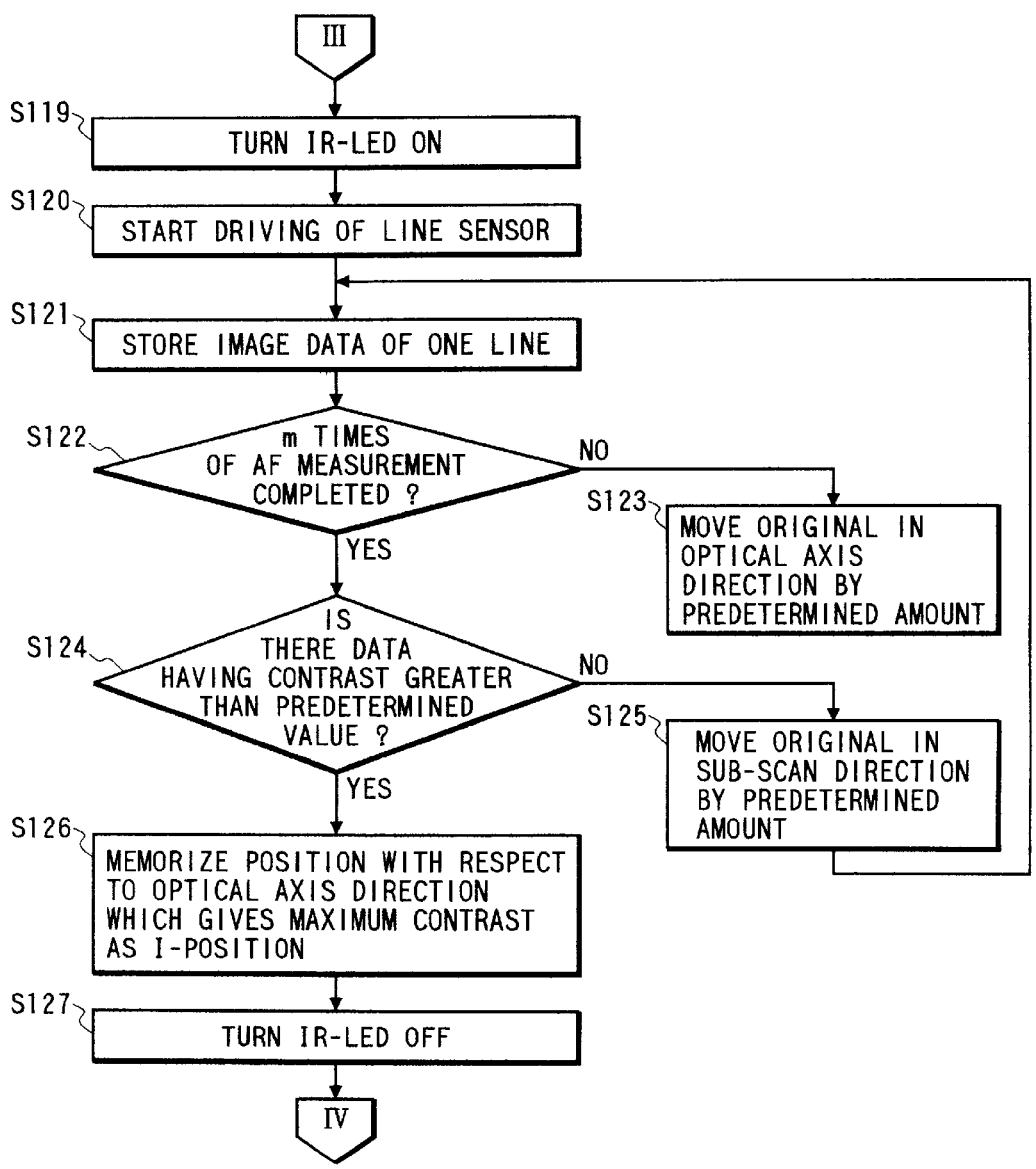
FIG. 21 is a flow chart showing the scanner processing according to the first embodiment of the present invention and continued from FIG. 20.
Figure 22:
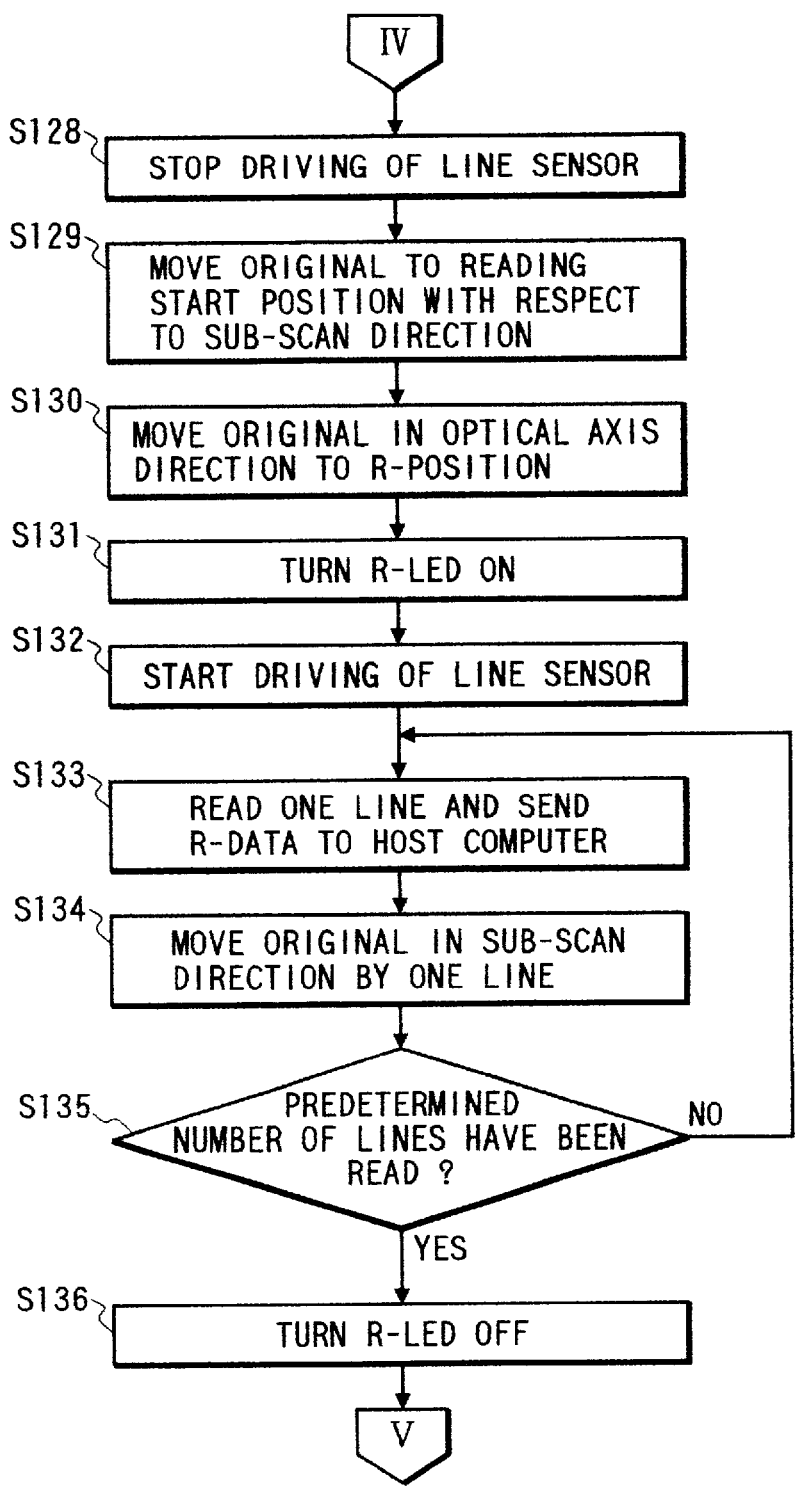
FIG. 22 is a flow chart showing the scanner processing according to the first embodiment of the present invention and continued from FIG. 21.
Figure 23:
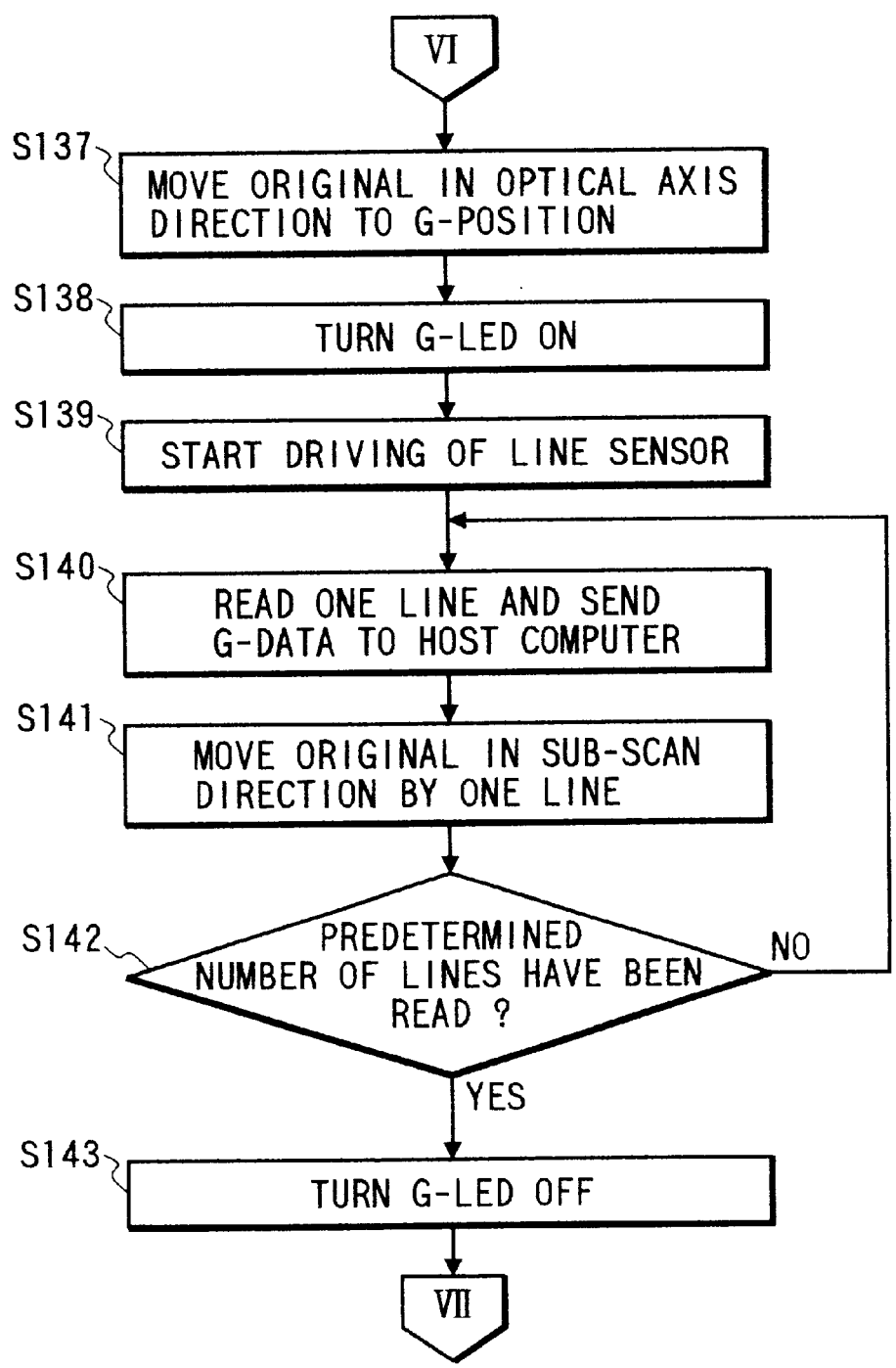
FIG. 23 is a flow chart showing the scanner processing according to the first embodiment of the present invention and continued from FIG. 22.
Figure 24:
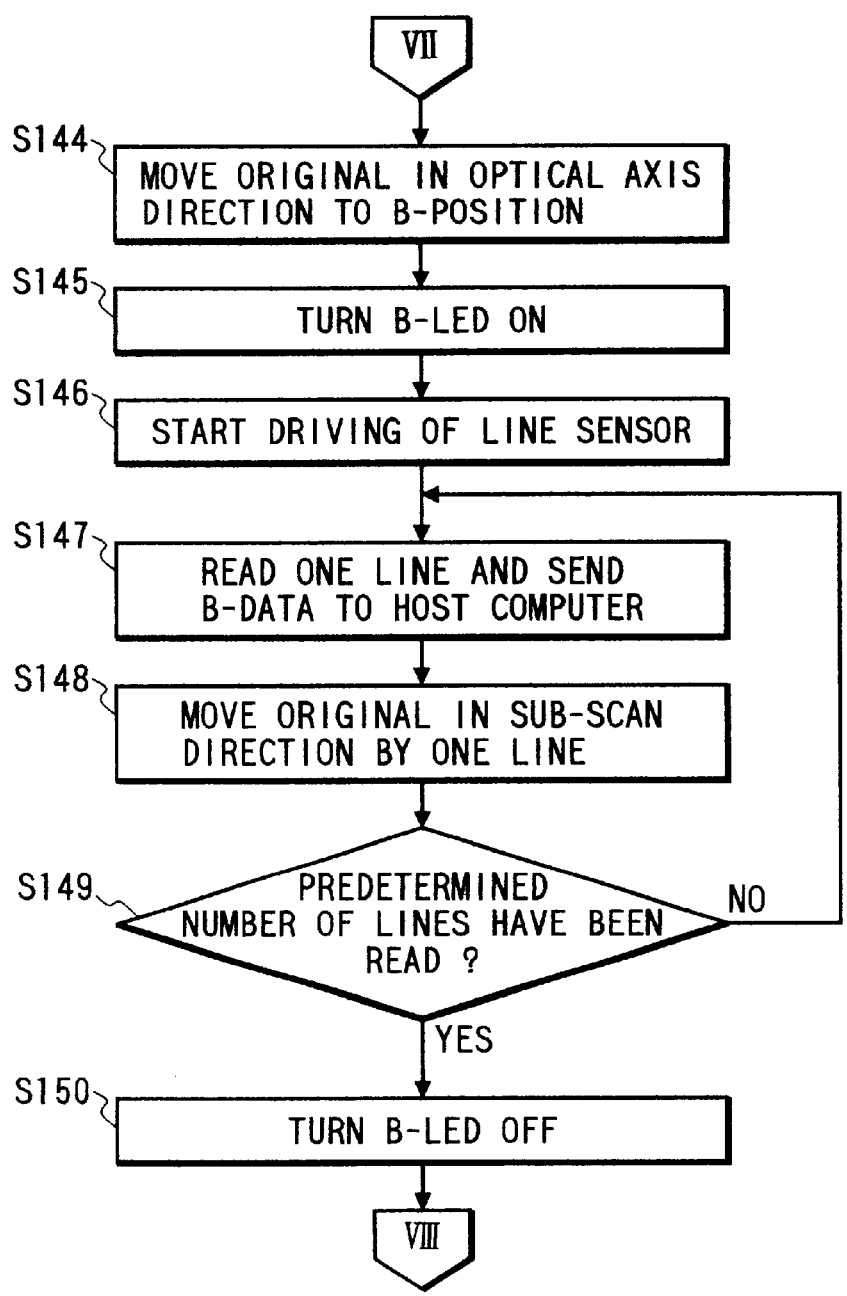
FIG. 24 is a flow chart showing the scanner processing according to the first embodiment of the present invention and continued from FIG. 23.
Figure 25:
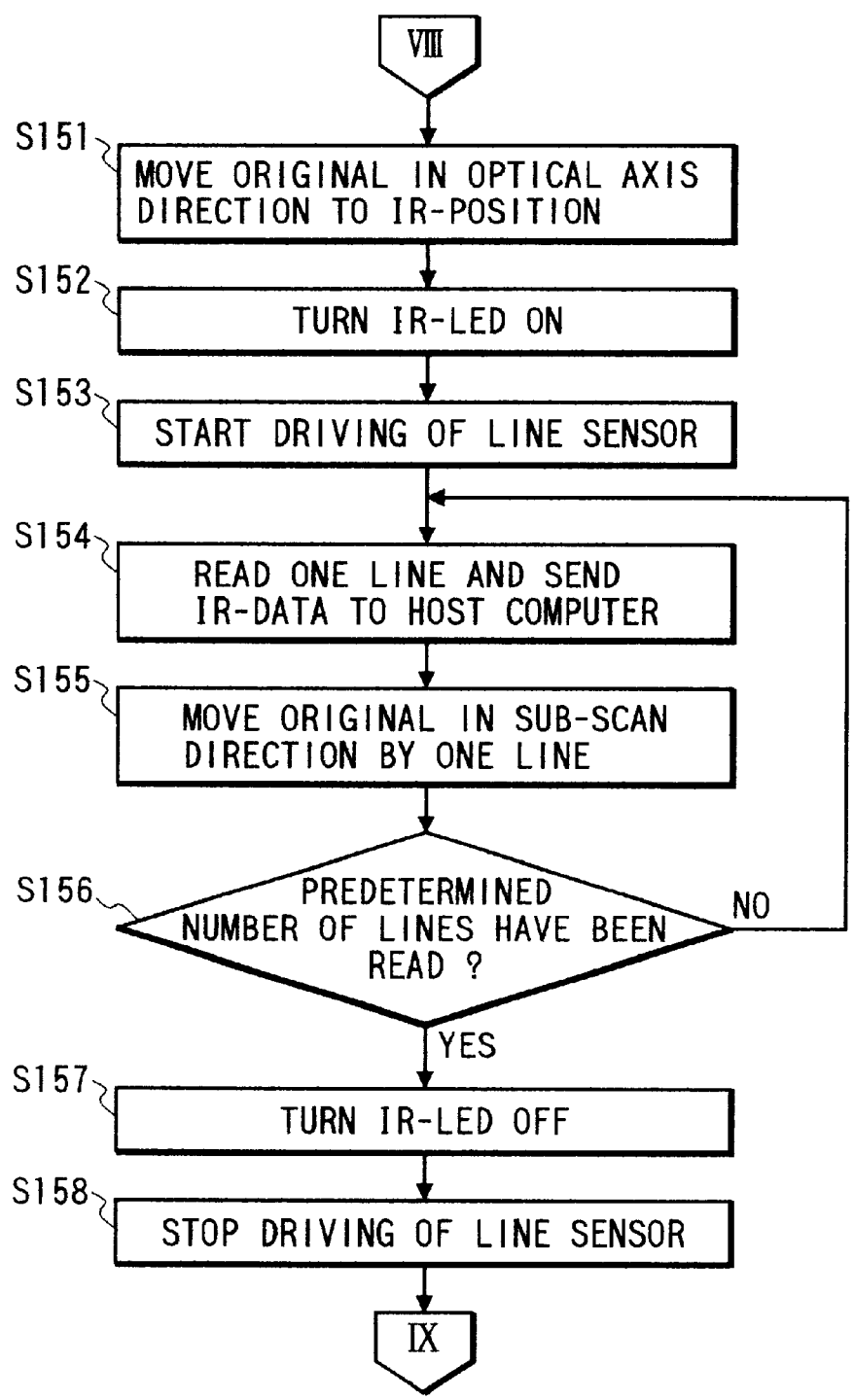
FIG. 25 is a flow chart showing the scanner processing according to the first embodiment of the present invention and continued from FIG. 24.

Square (a) in FIG. 14 shows a case wherein defects have been detected in the IR level in step S19. In this example, one block comprises 3×3 pixels. In square (a) in FIG. 14, the luminance level "255" corresponds to the first IR luminance level in step S19, and pixels with luminance levels lower than the first IR luminance level are indicated by halftone screen. Square (b) in FIG. 14 shows a block of visible light corresponding to that shown in square (a) in FIG. 14, and shows a case wherein defects have been detected in the visible light level. In contrast to this, square (c) in FIG. 14 shows the visible light level obtained when the corresponding block is free from any defects.

In step S20, the host computer 1 selects one each from a total of 49 blocks that have deviations within ±3 pixels in the vertical and horizontal directions with respect to the m-th block in the R data corresponding to the selected m-th block in the IR data. In FIGS. 15 through 17, the portions bounded by the bold frames indicate blocks obtained by shifting the 3×3 pixels of interest by one pixel in the vertical and horizontal directions.

In step S21, the host computer calculates {"luminance value of selected n-th block in R data"–"luminance value of m-th block in IR data"} to obtain a subtraction value (R)n between the corresponding pixels in the blocks. In FIGS. 15 through 17, the blocks bounded by the bold frames indicate such subtraction values. For example, the position in square (b) in FIG. 14 corresponding to that of the 3×3 pixels indicated by the bold frame in square A-1 in FIG. 15 corresponds to the n-th block. Hence, the subtraction values "–55", "–55", and "80" in the first row of the 3×3 pixels indicated by the bold frame in square A-1 in FIG. 15 are respectively obtained by "–55=200–255", "–55=200–255", and "80=200–120".

In step S22, the host computer 1 calculates the sum of the calculated subtraction values. For example, as for the subtraction values of the 3×3 pixels indicated by the bold frame in square A-1 in FIG. 15, the sum in the first row is "190", the sum of the second row is "310", the sum in the third row is "451", and the sum total of these values is "951". The same applies to squares A-2 and A-3 in FIG. 15, squares B-1, B-2, and B-3 in FIG. 16, and squares C-1, C-2, and C-3 in FIG. 17.

In step S23, the host computer 1 stores the sum (R)n of the subtraction values calculated at one position in the memory 1b. In step S24, the host computer 1 checks if the operations for shifting the 3×3 pixels of interest by one pixel in the vertical and horizontal directions and calculating the sum of subtraction values have been repeated 49 times. If the host computer makes a negative decision (NO), the flow returns to step S20. More specifically, the host computer 1 repeats the operations in steps S24→S20→S21→S22→S23→S24 until an affirmative decision (YES) is made in step S24. If the host computer 1 makes an affirmative decision (YES) in step S24, the flow advances to step S25, and the host computer 1 selects a sum (R)n.min as the minimum value of the sums (R)n. In the example shown in FIGS. 14 through 17, square B-2 in FIG. 16 having the sum="630" is selected.

In step S26, the host computer 1 designates the block (B-2 in FIG. 16) that gives the sum (R)n.min as the block in the R data corresponding to the m-th block ((a) in FIG. 14) in the IR data. In step S27, the host computer 1 selects one pixel from the m-th block ((a) in FIG. 14) in the IR data. In step S28, the host computer 1 checks if the luminance level of the selected IR-pixel is smaller than the first IR luminance level.

If a negative decision (NO) is made in step S28, the flow advances to step S33, and the host computer 1 stores the luminance level of the corresponding R-pixel in the memory 1b. Then, the flow advances to step S36. On the other hand, if an affirmative decision (YES) is made in step S28, the flow advances to step S29, and the host computer 1 checks if the luminance level of the selected IR-pixel is equal to or larger than a second IR luminance level.

If an affirmative decision (YES) is made in step S29, i.e., if the luminance level of the selected IR-pixel is an intermediate level between the first and second IR luminance levels, the flow advances to step S30, and the host computer 1 obtains a correction factor by calculating (IR maximum luminance)/(IR-pixel luminance). After that, the flow advances to step S36 via steps S31 and 32. In step S31, the host computer 1 calculates the corrected luminance level of R data=(the luminance level of the corresponding R-pixel)× (correction factor). In step S32, the host computer 1 stores the corrected luminance level of the R data calculated in step S31 in the memory 1b.

On the other hand, if a negative decision (NO) is made in step S29, i.e., if the luminance level of the selected IR-pixel is smaller than the second IR luminance level, the flow advances to step S34. In step S34, the host computer 1 calculates the luminance level of the corresponding R-pixel on the basis of the luminance levels of R-pixels around that pixel. The host computer 1 stores the calculated luminance level of the R-pixel in the memory 1b in step S35, and the flow advances to step S36.

The host computer 1 checks in step S36 if the processing is complete for all the pixels in the m-th block. If a negative decision (NO) is made in step S36, the flow returns to step S27 to repeat the same processing for the next pixel. On the other hand, if an affirmative decision (YES) is made in step S36, the flow advances to step S37, and the host computer 1 checks if the processing for all the blocks in the R data is complete.

If a negative decision (NO) is made in step S37, the flow returns to step S18 and the host computer 1 selects a new block to repeat the same processing. On the other hand, if an affirmative decision (YES) is made in step S37, the host computer 1 repeats the same processing for G and B data in turn. Steps S38 through S57 show the processing for the G data, and steps S58 through S77 show the processing for the B data. Such processing is the same as that for the R data shown in steps S18 through S37 described above, and a detailed description thereof will be omitted.

If a negative decision (NO) is made in step S77, the flow returns to step S58, and the host computer 1 selects another block to repeat the same processing. On the other hand, if an affirmative decision (YES) is made in step S77, the flow advances to step S78, and the host computer 1 checks if the set film is a positive film.

If an affirmative decision (YES) is made in step S78, the flow advances to step S79 and the host computer 1 checks if the user has selected modification of the gradation. If an affirmative decision (YES) is made in step S79, the host computer 1 effects gradation modification processing for R, G, and B data in step S80. The host computer 1 outputs the corrected image data to the display to display it in step S81.

On the other hand, if a negative decision (NO) is made in step S78, the flow advances to step S82, and the host computer 1 checks if the user has selected modification of the gradation. If an affirmative decision (YES) is made in step S82, the host computer 1 merges a set gradation modification function with a gradation inverting function in step S83, and the flow advances to step S80. On the other hand, if a negative decision (NO) is made in step S82, the host computer 1 sets the gradation inverting function set in advance as the gradation modification function in step S84, and the flow advances to step S80.

In this embodiment, the host computer 1 performs alignment immediately after it has detected defects in step S19. However, the imaging position of IR light does not always match that of visible light, and their focal points deviate from each other. In many cases, the IR image is larger than the visible light image. Hence, in correction, size adjustment is preferably done before the alignment. The size adjustment includes a method of adjusting the imaging positions upon reading by the scanner 2, and a method using Fourier analysis.

The method using Fourier analysis is substantially based on the following principle. For example, assume a graph in which the ordinate plots the infrared component level, and the abscissa plots pixels in the main scan direction of the CCD. On this graph, the level of a defect pixel alone drops. Hence, when defects continuously appear, the graph forms a downward convex, moderate curve. In other words, at this position, the frequency is low. On the other hand, when defects occur sporadically, a sharp bottom peak appears at only the position of each defect. That is, at that position, the frequency is high.

Since the level of visible light changes depending on the density of an image unlike infrared light, the frequency distribution of visible light does not become equal to that of the infrared component. However, for the defect component alone, roughly the same frequency distributions are expected to occur for visible light and infrared light. Hence, the deviation of optical axis chromatic aberration may be corrected by executing processing for adjusting the frequency distributions of the infrared component and visible light.

The method using Fourier analysis attains size adjustment in the following processes (1) through (6). (1) The defect infrared component level is Fourier-transformed to obtain its frequency distribution. (2) The Fourier transform of the defect visible component level is calculated to obtain its frequency distribution. (3) The defect infrared frequency as the frequency of the defect infrared component level is detected from the frequency distribution of the defect infrared component level.

(4) The defect visible frequency near the frequency of the defect infrared component level is detected from the frequency distribution of the defect visible component level. (5) The defect infrared frequency is shifted to approach the defect visible frequency. (6) The inverse Fourier transform of the shifted defect infrared frequency is calculated.

In this embodiment, modification of the gradation is done after defect correction. Such order is preferable for the following reason. That is, if modification of the gradation is done first, defect correction must be done in consideration of the gradation modification processing, resulting in complicated processing. In other words, according to the method of this embodiment, the processing can be simplified.

The processes shown in FIGS. 6 through 13 are stored in the memory 1b and are also stored in the CD-ROM 3 to allow setups.

(B) Image Reading by Scanner (First Embodiment•Plural Pass Color Page Sequence)

FIGS. 18 through 29 are flow charts showing image reading by the scanner according to the first embodiment of the present invention. Upon receiving a pre-scan command from the host computer 1, the CPU 11 controls the motor drive circuits 12 and 28 to move the film original 26 to the initial position with respect to the optical axis direction and the sub-scan direction in step S90. In step S91, the CPU 11 controls the motor drive circuit 12 to move the film original 26 to a predetermined position in the sub-scan direction. In step S92, the CPU 11 controls the LED drive circuit 13 to turn on the R-LED.

In step S93, the CPU 11 drives the line sensor 18 to acquire image data. In step S94, the CPU 11 stores the read image data for one line in the RAM 16. In step S95, the CPU 11 checks if m times of AF measurement (image reading for auto-focusing) are complete. If the decision result in step S95 is negative (NO), the CPU 11 controls the motor drive circuit 28 to move the film original 26 in the optical axis direction by a predetermined amount in step S96. The CPU 11 stores the read image data for one line in the RAM 16 again in step S94, and the flow advances to step S95. In summary, the CPU 11 acquires m image data for one line as a result of m times of AF measurement.

On the other hand, if the decision result in step S95 is affirmative (YES), the CPU 11 checks in step S97 if the stored m image data for one line include data having contrast equal to or larger than a predetermined value. That is, the CPU 11 obtains the image data for one line at which proper focus adjustment was done.

If the decision result in step S97 is negative (NO), the CPU 11 moves the film original 26 in the sub-scan direction by a predetermined amount in step S98, and the flow returns to step S94. After that, the CPU 11 similarly acquires image data for one line in the next line to be read.

However, if the decision result in step S97 is affirmative (YES), since the image data for one line at which proper focus adjustment was done is found, the CPU 11 memorizes the position with respect to the optical axis which gives maximum contrast as the R position in the RAM 16 in step S99. Finally, the CPU 11 turns off the R-LED in step S100. The CPU 11 then repeats the same processing to obtain the G, B, and IR positions with respect to the optical axis. Steps S101 through S109 correspond to processing associated with the G data, and steps S110 through S118 correspond to processing associated with the B data. Also, steps S119 through S127 correspond to processing associated with the IR data.

The processing associated with the G data will be explained below. In step S101, the CPU 11 controls the LED drive circuit 13 to turn on the G-LED. In step S102, the CPU 11 drives the line sensor 18. In step S103, the CPU 11 stores the read image data for one line in the RAM 16. In step S104, the CPU 11 checks if m times of AF measurement are complete.

If the decision result in step S104 is negative (No), the CPU 11 controls the motor drive circuit 28 to move the film original 26 in the optical axis direction by a predetermined amount in step S105. The CPU 11 stores the read image data for one line in the RAM 16 again in step S103, and the flow advances to step S104. In summary, the CPU 11 acquires m image data for one line as a result of m times of AF measurement.

If the decision result in step S104 is affirmative (YES), the CPU 11 checks in step S106 if the stored m image data for one line include data having contrast equal to or larger than a predetermined value. That is, the CPU 11 obtains the image data for one line at which proper focus adjustment was done.

If the decision result in step S106 is negative (NO), the CPU 11 controls the motor drive circuit 12 to move the film original 26 in the sub-scan direction by a predetermined amount in step S107, and the flow returns to step S103. After that, the CPU 11 similarly acquires image data for one line m times in the next line to be read.

If the decision result in step S106 is affirmative (YES), since the image data for one line at which proper focus adjustment was done is found, the CPU 11 memorizes the position with respect to the optical axis which gives maximum contrast as the G position in the RAM 16 in step S108. Finally, the CPU 11 turns off the G-LED in step S109.

The processing associated with the B data will be explained below. In step S110, the CPU 11 controls the LED drive circuit 13 to turn on the B-LED. In step S111, the CPU 11 drives the line sensor 18. In step S112, the CPU 11 stores the read image data for one line in the RAM 16. In step S113, the CPU 11 checks if m times of AF measurement are complete.

If the decision result in step S113 is negative (NO), the CPU 11 controls the motor drive circuit 28 to move the film original 26 in the optical axis direction by a predetermined amount in step S114. The CPU 11 stores the read image data for one line in the RAM 16 again in step S112, and the flow advances to step S113. In summary, the CPU 11 acquires m image data for one line as a result of m times of AF measurement.

If the decision result in step S113 is affirmative (YES), the CPU 11 checks in step S115 if the stored m image data for one line include data having contrast equal to or larger than a predetermined value. That is, the CPU 11 obtains the image data for one line at which proper focus adjustment was done.

If the decision result in step S115 is negative (NO), the CPU 11 controls the motor drive circuit 12 to move the film original 26 in the sub-scan direction by a predetermined amount in step S116, and the flow returns to step S112. After that, the CPU 11 similarly acquires image data for one line m times in the next line to be read.

On the other hand, if the decision result in step S115 is affirmative (YES), since the image data for one line at which proper focus adjustment was done is found, the CPU 11 memorizes the position with respect to the optical axis which gives maximum contrast as the B position in the RAM 16 in step S117. Finally, the CPU 11 turns off the B-LED in step S118.

The processing associated with the IR data will be explained below. In step S119, the CPU 11 controls the LED drive circuit 13 to turn on the IR-LED. In step S120, the CPU 11 drives the line sensor 18. In step S121, the CPU 11 stores the read image data for one line in the RAM 16. In step S122, the CPU 11 checks if m times of AF measurement (auto-focusing) are complete.

If the decision result in step S122 is negative (NO), the CPU 11 controls the motor drive circuit 28 to move the film original 26 in the optical axis direction by a predetermined amount in step S123. The CPU 11 stores the read image data for one line in the RAM 16 again in step S121, and the flow advances to step S122. In summary, the CPU 11 acquires m image data for one line as a result of m times of AF measurement.

If the decision result in step S122 is affirmative (YES), the CPU 11 checks in step S124 if the stored m image data for one line include data having contrast equal to or larger than a predetermined value. That is, the CPU 11 obtains the image data for one line at which proper focus adjustment was done.

If the decision result in step S124 is negative (NO), the CPU 11 controls the motor drive circuit 12 to move the film original 26 in the sub-scan direction by a predetermined amount in step S125, and the flow returns to step S121. After that, the CPU 11 similarly acquires image data for one line m times in the next line to be read.

However, if the decision result in step S124 is affirmative (YES), since the image data for one line at which proper focus adjustment was done is found, the CPU 11 memorizes the position with respect to the optical axis which gives maximum contrast as the IR position in the RAM 16 in step S126. Finally, the CPU 11 turns off the IR-LED in step S127.

After the R, G, B, and IR positions with respect to the optical axis are obtained, the CPU 11 stops driving of the line sensor 18 in step S128. The CPU 11 then executes image reading based on the plural pass color page sequence under the predetermined accumulation times so as to acquire R, G, B, and IR pre-scan image data, as will be described below.

Steps S129 through S136 correspond to processing associated with the R data. Steps S137 through S143 correspond to processing associated with the G data. Steps S144 through S150 correspond to processing associated with the B data. Steps S151 through S157 correspond to processing associated with the IR data.

The processing associated with the R data will be explained below. In step S129, the CPU 11 controls the motor drive circuit 12 to move the film original 26 to the reading start position in the sub-scan direction. In step S130, the CPU 11 controls the motor drive circuit 28 to move the film original 26 to the R position in the optical axis direction stored in step S99. In step S131, the CPU 11 turns on the R-LED. In step S132, the CPU 11 drives the line sensor 18. In step S133, the CPU 11 controls the line sensor to read image data for one line, and sends the read R data for one line to the host computer 1.

Subsequently, the CPU 11 controls the motor drive circuit 12 to move the film original 26 in the sub-scan direction by one line in step S134. The CPU 11 checks in step S135 if reading for the predetermined number of lines is complete. If the decision result in step S135 is negative (NO), the CPU 11 repeats the processing in steps S133 and S134. On the other hand, if the decision result in step S135 becomes affirmative (YES), since acquisition of the R data is finished, the CPU 11 turns off the R-LED in step S136. Then, the CPU 11 executes the processing for the G data.

The processing associated with the G data will be explained below. In step S137, the CPU 11 controls the motor drive circuit 28 to move the film original 26 to the G position in the optical axis direction stored in step S108. In step S138, the CPU 11 turns on the G-LED. In step S139, the CPU 11 drives the line sensor 18. In step S140, the CPU 11 controls the line sensor to read image data for one line, and sends the read G data for one line to the host computer 1.

Next, the CPU 11 controls the motor drive circuit 12 to move the film original 26 in the sub-scan direction by one line in step S141. The CPU 11 checks in step S142 if reading for the predetermined number of lines is complete. If the decision result in step S142 is negative (NO), the CPU 11 repeats the processing in steps S140 and S141. On the other hand, if the decision result in step S142 becomes affirmative (YES), since acquisition of the G data is complete, the CPU 11 turns off the G-LED in step S143. Then, the CPU 11 executes the processing for the B data.

The processing associated with the B data will be explained below. In step S144, the CPU 11 controls the motor drive circuit 28 to move the film original 26 to the B position in the optical axis direction stored in step S117. In step S145, the CPU 11 turns on the B-LED. In step S146, the CPU 11 drives the line sensor 18. In step S147, the CPU 11 controls the line sensor to read image data for one line, and sends the read B data for one line to the host computer 1.

Subsequently, the CPU 11 controls the motor drive circuit 12 to move the film original 26 in the sub-scan direction by one line in step S148. The CPU 11 checks in step S149 if reading for the predetermined number of lines is complete. If the decision result in step S149 is negative (NO), the CPU 11 repeats the processing in steps S147 and S148. On the other hand, if the decision result in step S149 becomes affirmative (YES), since acquisition of the B data is complete, the CPU 11 turns off the B-LED in step S150. The CPU 11 proceeds to execute the processing for the IR data.

The processing associated with the IR data will be explained below. In step S151, the CPU 11 controls the motor drive circuit 28 to move the film original 26 to the IR position in the optical axis direction stored in step S126. In step S152, the CPU 11 turns on the IR-LED. In step S153, the CPU 11 drives the line sensor 18. In step S154, the CPU 11 controls the line sensor 18 to read image data for one line, and sends the read IR data for one line to the host computer 1.

Next, the CPU 11 controls the motor drive circuit 12 to move the film original 26 in the sub-scan direction by one line in step S155. The CPU 11 checks in step S156 if reading for the predetermined number of lines is complete. If the decision result in step S156 is negative (NO), the CPU 11 repeats the processing in steps S154 and S155. On the other hand, if the decision result in step S156 becomes affirmative (YES), since acquisition of the IR data is complete, the CPU 11 turns off the IR-LED in step S157. The CPU 11 then stops driving of the line sensor 18 in step S158.

In the above-mentioned plural pass color page sequence, since data for the entire frame (page) is continuously acquired in units of colors, the CPU 11 controls to acquire G data in the forward pass, B data in the backward pass, B data in the forward pass, and IR data in the backward pass.

After the above process, the CPU 11 waits for a command input from the host computer 1 in step S159. Upon receiving the accumulation time data Tr, Tg, Tb, and Tir and the main-scan start command from the host computer 1, the CPU 11 makes an affirmative decision (YES) in step S159, and the flow advances to step S160. In step S160, the CPU 11 sets accumulation times Tr, Tg, Tb, and Tir. The CPU 11 then controls the motor drive circuit 12 to move the film original 26 to the reading position in the sub-scan direction in step S161. The CPU 11 acquires R, G, B, and IR data as follows.

The processing associated with the R data will be explained below. The CPU 11 controls the motor drive circuit 28 to move the film original 26 to the R position in the optical axis direction in step S162. In step S163, the CPU 11 turns on the R-LED. In step S164, the CPU 11 drives the line sensor 18 with the accumulation time Tr to start reading of R data.

In step S165, the CPU 11 controls the line sensor 18 to read image data for one line, and sends the read R data for one line to the host computer 1. The CPU 11 controls the motor drive circuit 12 to move the film original 26 by one line in step S166. The CPU 11 checks in step S167 if reading for the predetermined number of lines is complete. That is, the CPU 11 repeats the processing in steps S165 and S166 until the decision result in step S167 becomes affirmative (YES). If the decision result in step S167 becomes affirmative (YES), the CPU 11 turns off the R-LED in step S168. The CPU 11 then stops driving of the line sensor 18 in step S169. The CPU 11 then performs acquisition of G data.

The processing associated with the G data will be explained below. The CPU 11 controls the motor drive circuit 28 to move the film original 26 to the G position in the optical axis direction in step S170. In step S171, the CPU 11 turns on the G-LED. In step S172, the CPU 11 drives the line sensor 18 with the accumulation time Tg to start reading of G data.

In step S173, the CPU 11 controls the line sensor 18 to read image data for one line, and sends the read G data for one line to the host computer 1. The CPU 11 moves the film original 26 by one line in step S174. The CPU 11 checks in step S175 if reading for the predetermined number of lines is complete. That is, the CPU 11 repeats the processing in steps S173 and S174 until the decision result in step S175 becomes affirmative (YES). If the decision result in step S175 becomes affirmative (YES), the CPU 11 turns off the G-LED in step S176. After the CPU 11 stops driving of the line sensor 18 in step S177, it proceeds to acquisition of B data.

The processing associated with the B data will be explained below. The CPU 11 controls the motor drive circuit 28 to move the film original 26 to the B position in the optical axis direction in step S178. In step S179, the CPU 11 turns on the B-LED. In step S180, the CPU 11 drives the line sensor 18 with the accumulation time Tb to start reading of B data.

In step S181, the CPU 11 controls the line sensor 18 to read image data for one line, and sends the read B data for one line to the host computer 1. The CPU 11 moves the film original 26 by one line in step S182. The CPU 11 checks in step S183 if reading for the predetermined number of lines is complete. That is, the CPU 11 repeats the processing in steps S181 and S182 until the decision result in step S183 becomes affirmative (YES). If the decision result in step S183 becomes affirmative (YES), the CPU 11 turns off the B-LED in step S184. After the CPU 11 stops driving of the line sensor 18 in step S185, it proceeds to acquisition of IR data.

The processing associated with the IR data will be explained below. The CPU 11 controls the motor drive circuit 28 to move the film original 26 to the IR position in the optical axis direction in step S186. In step S187, the CPU 11 turns on the IR-LED. In step S188, the CPU 11 drives the line sensor 18 with the accumulation time Tir to start reading of IR data.

In step S189, the CPU 11 controls the line sensor 18 to read image data for one line, and sends the read IR data for one line to the host computer 1. The CPU 11 moves the film original 26 by one line in step S190. The CPU 11 checks in step S191 if reading for the predetermined number of lines is complete. That is, the CPU 11 repeats the processing in steps S189 and S190 until the decision result in step S191 becomes affirmative (YES). If the decision result in step S191 becomes affirmative (YES), the CPU 11 turns off the IR-LED in step S192. The CPU 11 then stops driving of the line sensor 18 in step S193.

In summary, the CPU 11 acquires R data in the forward pass, G data in the backward pass, B data in the forward pass, and IR data in the backward pass by utilizing the feature of the plural pass color page sequence.

(C) Image Reading by Scanner (Second Embodiment•Line Interleaf Sequence)

FIGS. 30 through 32 show the image reading in the main scan. Since the operations until the pre-scan are the same as those shown in FIGS. 18 through 25, a detailed description thereof will be omitted.

Figure 26:
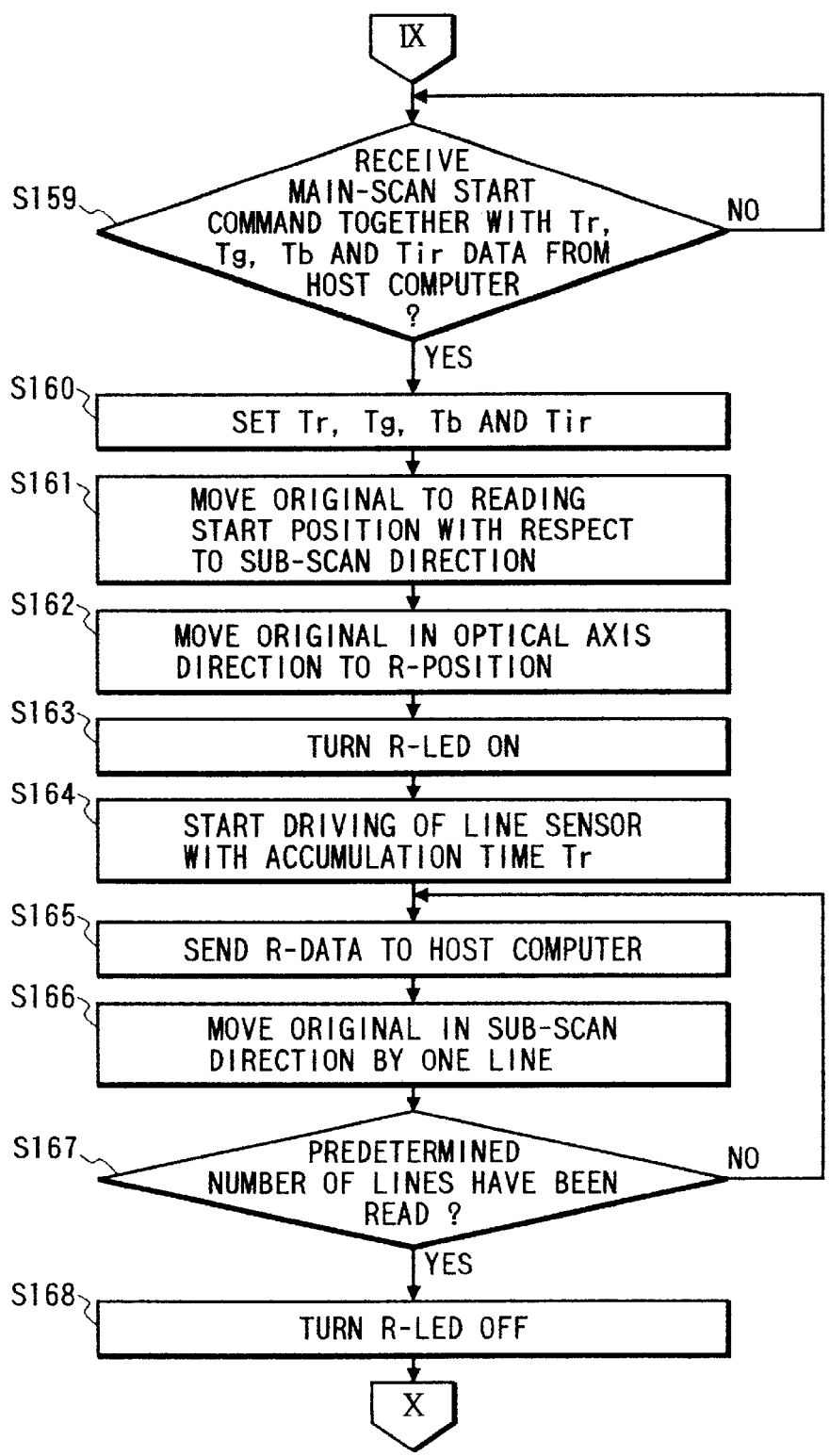
FIG. 26 is a flow chart showing the scanner processing according to the first embodiment of the present invention and continued from FIG. 25.
Figure 27:
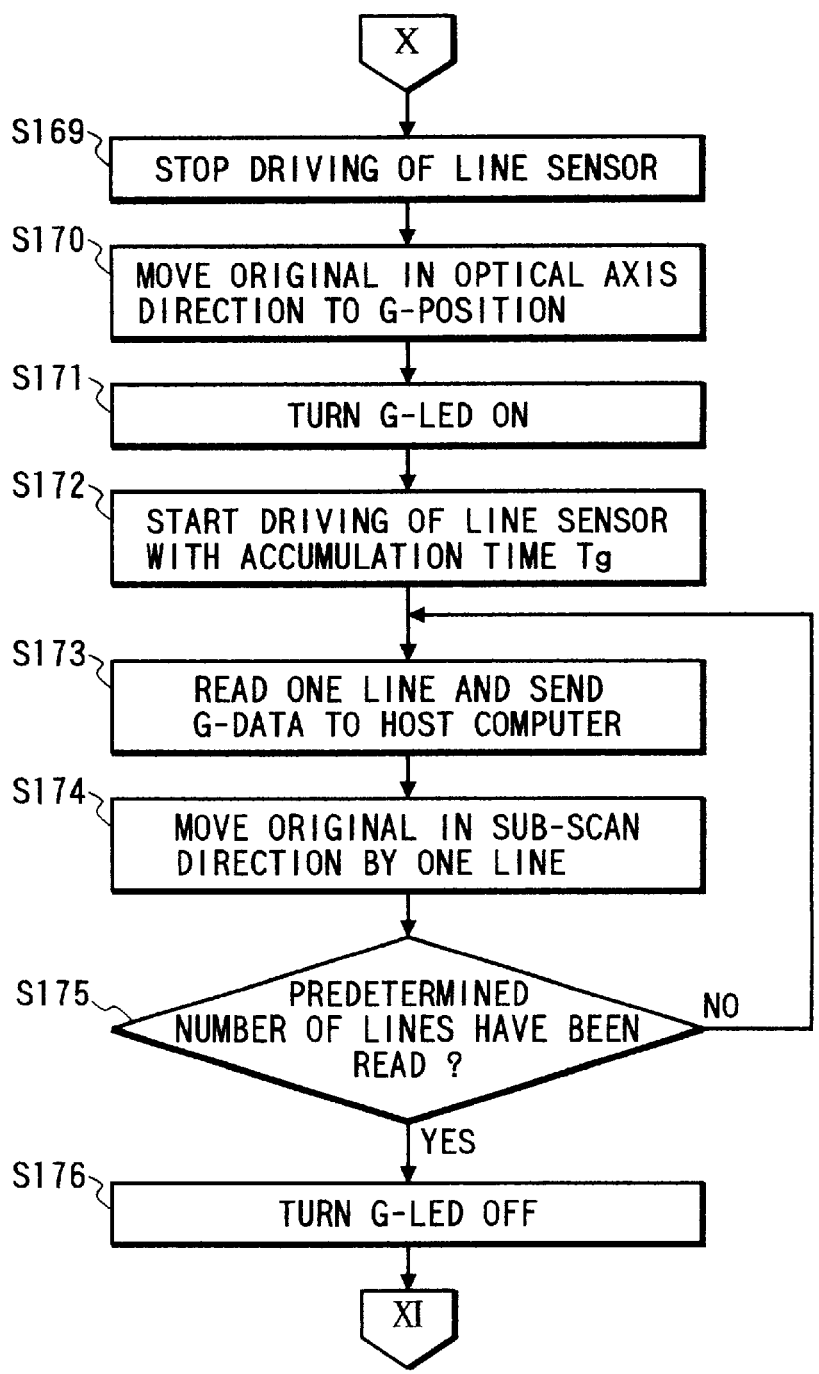
FIG. 27 is a flow chart showing the scanner processing according to the first embodiment of the present invention and continued from FIG. 26.
Figure 28:
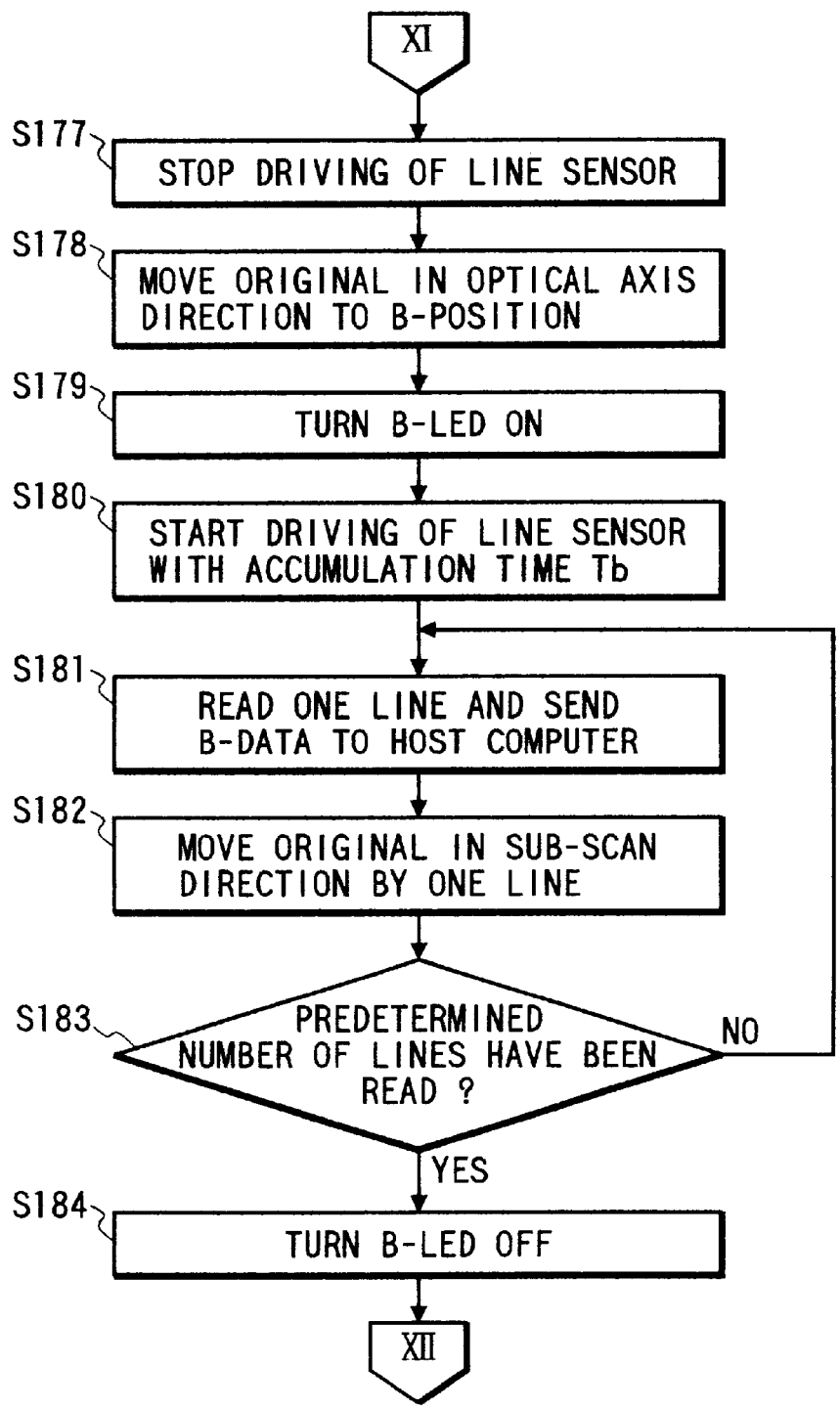
FIG. 28 is a flow chart showing the scanner processing according to the first embodiment of the present invention and continued from FIG. 27.
Figure 29:
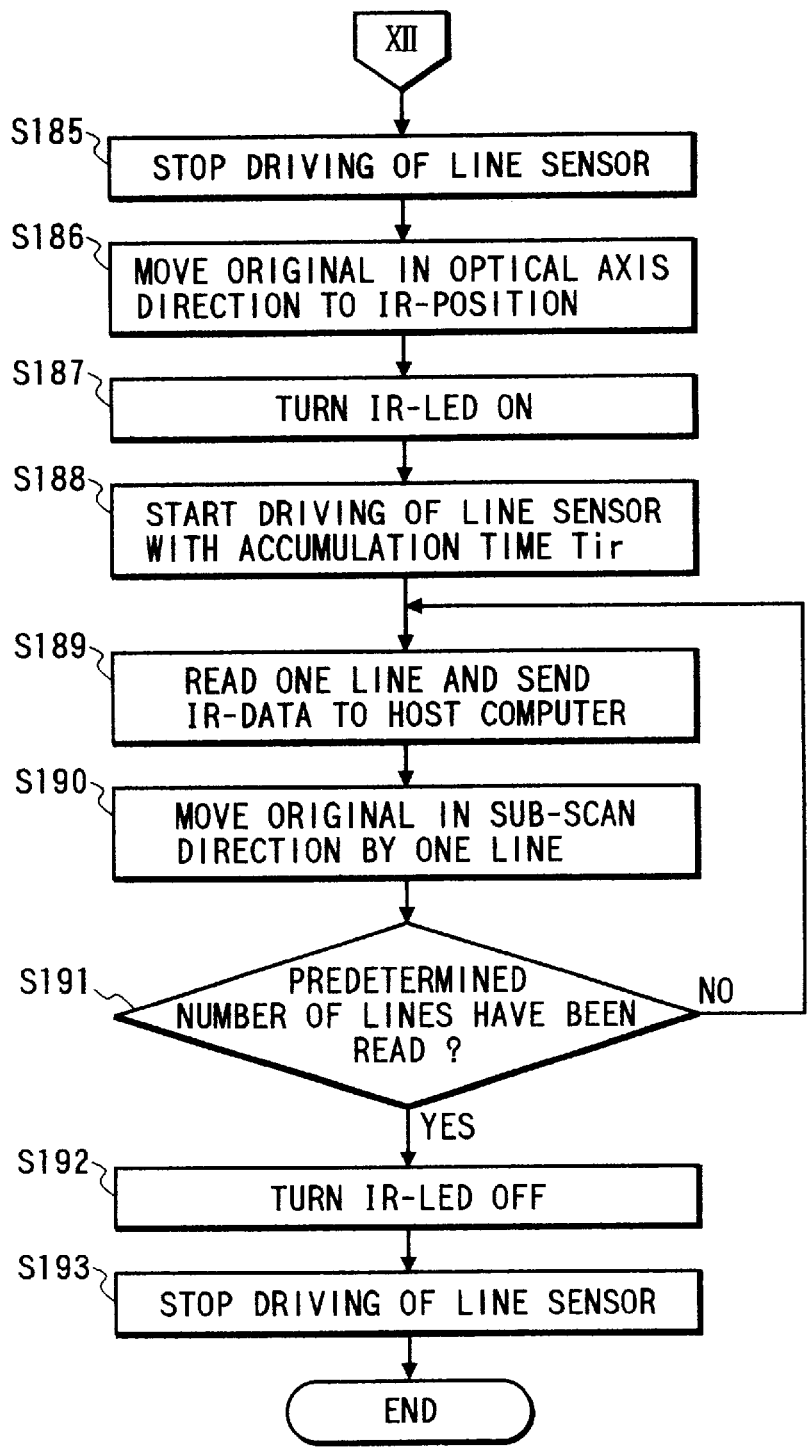
FIG. 29 is a flow chart showing the scanner processing according to the first embodiment of the present invention and continued from FIG. 28.

Also, in FIG. 30, step S201 corresponds to step S159 in FIG. 26, and step S202 corresponds to step S160 in FIG. 26. However, since the line interleaf sequence is to be done in this case, and the individual color LEDs must be repetitively turned on/off in each line, the host computer 1 sets the LED illumination times in place of the accumulation times. Therefore, Tr, Tg, Tb, and Tir in step S201 are not accumulation times but LED illumination times. In step S202, the host computer 1 sets the LED illumination times Tr, Tg, Tb, and Tir. Since each LED has good ON/OFF response characteristics (high response speed), the illuminator 21 can control the times.

In steps S203 through S210, processing for giving an order to the illumination positions is done as the order of distances from the film original to the imaging positions of the optical system with respect to R, G, B, and IR light beams may be unknown.

In step S203, the CPU 11 sets the position closest to the film original 26 among the R, G, B, and IR positions as a first illumination position. In step S204, the CPU 11 sets the illumination time of illumination light (color) corresponding to the first illumination position among Tr, Tg, Tb, and Tir as T1. In step S205, the CPU 11 sets the position second closest to the film original 26 among the R, G, B, and IR positions as a second illumination position. In step S206, the CPU 11 sets the illumination time of light corresponding to the second illumination position among Tr, Tg, Tb, and Tir as T2.

In step S207, the CPU 11 sets the position third closest to the film original 26 among the R, G, B, and IR positions as a third illumination position. In step S208, the CPU 11 sets the illumination time of light corresponding to the third illumination position among Tr, Tg, Tb, and Tir as T3. In step S209, the CPU 11 sets the position fourth closest to the film original 26 among the R, G, B, and IR positions as a fourth illumination position. In step S210, the CPU 11 sets the illumination time of light corresponding to the fourth illumination position among Tr, Tg, Tb, and Tir as T4.

The CPU 11 then controls the motor drive circuit 12 to move the film original 26 to the reading position in the sub-scan direction in step S211. The CPU 11 controls the motor drive circuit 28 to move the film original 26 to the first illumination position in the optical axis direction in step S212. The CPU 11 starts driving of the line sensor 18 in step S213. The CPU 11 drives the first illumination LED to turn it on during only the time T1 in step S214. The CPU 11 controls the line sensor 18 to read image data for one line, and sends the read image data for one line to the host computer 1 in step S215. The CPU 11 controls the motor drive circuit 28 to move the film original 26 to the second illumination position in the optical axis direction in step S216. The CPU 11 drives the second illumination LED to turn it on during only the time T2 in step S217. The CPU 11 controls the line sensor 18 to read image data for one line, and sends the read image data for one line to the host computer 1 in step S218.

The CPU 11 controls the motor drive circuit 28 to move the film original 26 to the third illumination position in the optical axis direction in step S219. The CPU 11 drives the third illumination LED to turn it on during only the time T3 in step S220. The CPU 11 controls the line sensor 18 to read image data for one line, and sends the read image data for one line to the host computer 1 in step S221. The CPU 11 controls the motor drive circuit 28 to move the film original 26 to the fourth illumination position in the optical axis direction in step S222. The CPU 11 drives the fourth illumination LED to turn it on during only the time T4 in step S223. The CPU 11 controls the line sensor 18 to read image data for one line, and sends the read image data for one line to the host computer 1 in step S224.

The CPU 11 then checks in step S225 if reading for the predetermined number of lines is complete. If the decision result in step S225 is negative (NO), the CPU 11 reads data for the next line by executing the processing in steps S226 through S238.

More specifically, the CPU 11 controls the motor drive circuit 12 to move the film original 26 by one line in the sub-scan direction in step S226. The CPU 11 drives the fourth illumination LED to turn it on during only the time T4 in step S227. The CPU 11 controls the line sensor 18 to read image data for one line, and sends the read image data for one line to the host computer 1 in step S228. The CPU 11 controls the motor drive circuit 28 to move the film original 26 to the third illumination position in the optical axis direction in step S229. The CPU 11 drives the third illumination LED to turn it on during only the time T3 in step S230. The CPU 11 controls the line sensor 18 to read image data for one line, and sends the read image data for one line to the host computer 1 in step S231.

The CPU 11 controls the motor drive circuit 28 to move the film original 26 to the second illumination position in the optical axis direction in step S232. The CPU 11 drives the second illumination LED to turn it on during only the time T2 in step S233. The CPU 11 controls the line sensor 18 to read image data for one line, and sends the read image data for one line to the host computer 1 in step S234. The CPU 11 controls the motor drive circuit 28 to move the film original 26 to the first illumination position in the optical axis direction in step S235. The CPU 11 drives the first illumination LED to turn it on during only the time T1 in step S236. The CPU 11 controls the line sensor 18 to read image data for one line, and sends the read image data for one line to the host computer 1 in step S237.

The CPU 11 checks again in step S238 if reading for the predetermined number of lines is complete. If the decision result in step S238 is negative (NO), the CPU 11 controls the motor drive circuit 12 to move the film original 26 by one line in the sub-scan direction in step S240. Subsequently, the CPU 11 executes the processing in steps S214 through S224 to read data for the next line.

If the decision result in step S225 or S238 becomes affirmative (YES), the CPU 11 ends driving of the line sensor 18 in step S239.

In the second embodiment, since reading is done in the order of the first position→second position→third position→fourth position→fourth position→third position→second position→first position→first position→ . . . , the original moving time in the optical axis direction can be shortened and, hence, the reading time can be shortened.

(D) Image Reading by Scanner (Third Embodiment•Line Interleaf Sequence)

FIGS. 33 and 34 show the image reading in the main scan. Since the operations until the pre-scan are the same as those shown in FIGS. 18 through 25, a detailed description thereof will be omitted. Also, in FIG. 33, step S301 corresponds to step S159 in FIG. 26, and step S302 corresponds to step S160 in FIG. 26. However, since the line interleaf sequence is to be done in this case, and the individual color LEDs must be repetitively turned on/off in each line, the host computer 1 sets the LED illumination times in place of the accumulation times. Therefore, Tr, Tg, Tb, and Tir in step S301 are not accumulation times but LED illumination times, and the host computer 1 sets the LED illumination times Tr, Tg, Tb, and Tir in step S302. The fact that the control on the illuminator 21 side can be made due to good ON/OFF response characteristics (high response speed) of each LED, and the method of setting illumination positions are the same as those in the second embodiment.

That is, in step S303, the CPU 11 sets the position closest to the film original 26 among the R, G, B, and IR positions as a first illumination position. In step S304, the CPU 11 sets the illumination time of illumination light (color) corresponding to the first illumination position among Tr, Tg, Tb, and Tir as T1.

In step S305, the CPU 11 sets the position second closest to the film original 26 among the R, G, B, and IR positions as a second illumination position. In step S306, the CPU 11 sets the illumination time of light corresponding to the second illumination position among Tr, Tg, Tb, and Tir as T2. In step S307, the CPU 11 sets the position third closest to the film original 26 among the R, G, B, and IR positions as a third illumination position. In step S308, the CPU 11 sets the illumination time of light corresponding to the third illumination position among Tr, Tg, Tb, and Tir as T3.

In step S309, the CPU 11 sets the position fourth closest to the film original 26 among the R, G, B, and IR positions as a fourth illumination position. In step S310, the CPU 11 sets the illumination time of light corresponding to the fourth illumination position among Tr, Tg, Tb, and Tir as T4.

The CPU 11 then controls the motor drive circuit 12 to move the film original 26 to the reading position in the sub-scan direction in step S311. The CPU 11 starts driving of the line sensor 18 in step S312. The CPU 11 controls the motor drive circuit 28 to move the film original 26 to the first illumination position in the optical axis direction in step S313. The CPU 11 drives the first illumination LED to turn it on during the time T1 in step S314. The CPU 11 controls the line sensor 18 to read image data for one line, and sends the read image data for one line to the host computer 1 in step S315. The CPU 11 controls the motor drive circuit 28 to move the film original 26 to the second illumination position in the optical axis direction in step S316. The CPU 11 drives the second illumination LED to turn it on during the time T2 in step S317. The CPU 11 controls the line sensor 18 to read image data for one line, and sends the read image data for one line to the host computer 1 in step S318.

The CPU 11 controls the motor drive circuit 28 to move the film original 26 to the third illumination position in the optical axis direction in step S319. The CPU 11 drives the third illumination LED to turn it on during the time T3 in step S320. The CPU 11 controls the line sensor 18 to read image data for one line, and sends the read image data for one line to the host computer 1 in step S321. The CPU 11 controls the motor drive circuit 28 to move the film original 26 to the fourth illumination position in the optical axis direction in step S322. The CPU 11 drives the fourth illumination LED to turn it on during the time T4 in step S323. The CPU 11 controls the line sensor 18 to read image data for one line, and sends the read image data for one line to the host computer 1 in step S324.

The CPU 11 then checks in step S325 if reading for the predetermined number of lines is complete. If the decision result in step S325 is negative (NO), the CPU 11 controls the motor drive circuit 12 to move the film original 26 by one line in the sub-scan direction in step S327. The CPU 11 then executes the processing in steps S313 through S324 to read data for the next line. The CPU 11 repeats the above-mentioned operations until the decision result in step S325 becomes affirmative (YES). If the decision result in step S325 becomes affirmative (YES), the CPU 11 ends driving of the line sensor 18 in step S326.

In the third embodiment, since reading for the next line is done after the film original 26 is moved to the first illumination position in the optical axis direction in step S313, any positional deviation due to the influences of backlash can be reduced. That is, since the film original 26 can be set at the reading position more accurately, color misregistration can be reduced.

FIGS. 35 and 36 show an embodiment using a line sensor having another arrangement. FIG. 35 shows the layout of the line sensor. FIG. 36 is an enlarged view of a line sensor 18' shown in FIG. 35.

The line sensor 18' shown in FIG. 35 comprises an IR line sensor 18a and an RGB line sensor 18b, as shown in FIG.

36. Both these sensors are monochrome line sensors. The IR line sensor 18a is set at a first position on a mount member 30, and the RGB line sensor 18b at a second position on the mount member 30. The first and second positions on the mount member 30 are formed to have a step therebetween.

Hence, the light-receiving surface of the IR line sensor 18a, and that of the RGB line sensor 18b have different optical distances from the film original 26, as shown in FIG. 35. More specifically, the light-receiving surface of the RGB line sensor 18b is set at the imaging position of light coming from the film original illuminated by visible light. For example, when the imaging distance of G light is between those of R and B light beams, the light-receiving surface of the RGB line sensor 18b is set at the imaging position of the G light. With this arrangement, the imaging performances of R, G, and B light beams can be well balanced. The light-receiving surface of the IR line sensor 18a is set at the imaging position of light coming from the film original 26 illuminated by IR light.

Light coming from the film original 26 illuminated by visible light, and that coming from the film original 26 illuminated by IR light have different imaging positions of an original image by the optical system. Such imaging position difference is produced depending on the characteristics of the optical system.

When the IR and RGB line sensors 18a and 18b are set to have a step therebetween, the difference can be corrected. No complicated moving mechanism need be used, and an image can be prevented from being blurred by different focal point positions by a simple arrangement. Therefore, an IR image and visible light image projected onto the line sensor 18' can have nearly equal sizes, and satisfactory defect correction can be realized by a simple arrangement.

The imaging optical system is set to image a point a of the film original 26 on the RGB line sensor 18b, and to image a point b of the film original 26, which point is shifted from the point a by 8 lines in the sub-scan direction, on the IR line sensor 18a.

Note that the imaging positions of R, G, and B light beams have nearly no difference. Hence, in the embodiment shown in FIG. 35, a single line sensor is used for the R, G, and B light beams. Instead, line sensors for the R, G, and B light beams may be independently arranged, and may be set while adjusting their imaging positions.

The scanner operation using the line sensor 18' shown in FIG. 35 will be briefly described below. (1) AF measurement of visible light is done. When the imaging position of G light is between those of R and B light beams, AF measurement is done for the G light. (2) AF measurement of IR light is done. (3) Pre-scans are done by the line interleaf sequence. More specifically, a pre-scan for reading an image while switching the R, G, B, and IR illumination light beams in units of lines and moving the film original 26 by one line in the sub-scan direction is repeated. (4) Main scans are done in the line interleaf sequence in accordance with the main-scan command from the host computer 1. (5) The host computer 1 corrects the difference of eight lines between the visible light and IR light. An embodiment using still another arrangement will be explained below.

(1) Arrangement in Which Switchable Filter is Inserted Between Film Original and Monochrome Line Sensor In the above embodiment, color extraction from the film original 26 is realized by illuminating the film original 26 by different color light beams. Instead, color extraction may be realized by passing light coming from the film original through a color extraction filter.

Figure 37:
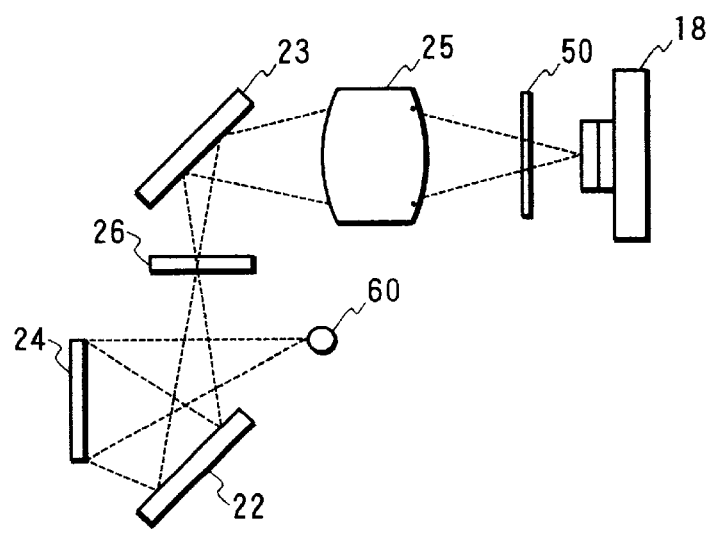
FIG. 37 is a partial view of an image processing apparatus using a filter.

FIG. 37 shows an example using a filter. The arrangement shown in FIG. 37 is obtained by partially modifying the optical system portion shown in FIG. 1.

Figure 38A:
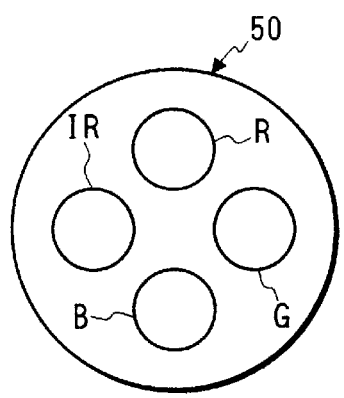
FIG. 38A is a view showing an example of a turret filter.

In FIG. 37, a turret color extraction filter 50 is inserted between the film original 26 and a monochrome line sensor 18. The same reference numerals in FIG. 37 denote the same parts as those in FIG. 1. In the example shown in FIG. 37, a white light source 60 is used as a light source in place of LEDs. The turret color extraction filter 50 has R, G, B, and IR filters set on a circular filter layout board, as shown in FIG. 38A.

The R filter transmits only a red component. The G filter transmits only a green component. The B filter transmits only a blue component. The IR filter transmits only an infrared component. In, e.g., the scanner, the filter used is switched every time reading for a certain color is completed.

Figure 38B:
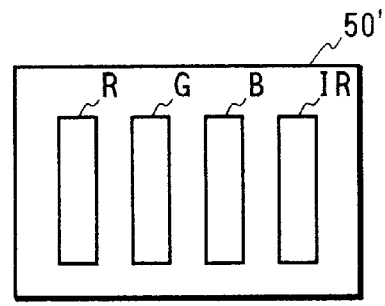
FIG. 38B is a view showing an example of a strip-shaped filter.

Note that a strip-shaped filter 50' shown in FIG. 38B may be used in place of the turret filter. The strip-shaped filter has R, G, B, and IR filter which are arranged in line. When the strip-shaped filter moves in the filter arrangement direction, color switching can be done.

(2) When Four Line Sensors Are Used

Color extraction may be realized using four line sensors. An R filter is set on one line light-receiving unit. A G filter is set on another line light-receiving unit. A B filter is set on still another line light-receiving unit. An IR filter is set on yet another line light-receiving unit.

Hence, the individual line light-receiving units output image signals of color components corresponding to the filters set thereon. These line light-receiving units are set to be shifted from each other by 8 lines in the sub-scan direction. The host computer 1 corrects the positional deviation of eight lines of each color component.

Note that the processes shown in FIGS. 18 through 34 are stored in the ROM 15.

What is claimed is:

1. An image processing method comprising the steps of:
   resolving a color of an image on a transparent original to extract an infrared component;
   detecting a level of the infrared component;
   detecting a defect infrared component level at a defect position on the transparent original where the infrared component level becomes lower than a first infrared level;
   obtaining a correction factor by calculating (first infrared component level)/(defect infrared component level) on the basis of the first infrared component level and defect infrared component level;
   resolving the color of the image on the transparent original to extract a visible component;
   detecting a visible component level of the visible component; and
   calculating a corrected visible component level by multiplying a defect visible component level at the defect position on the transparent original by the correction factor.

2. A method according to claim 1, further comprising the steps of:
   detecting a defect infrared component level at a second defect position on the transparent original where the infrared component level is not less than a second infrared component level, among defect positions where the infrared component level is lower than the first infrared component level; and multiplying the visible component level at the second defect position on the transparent original by the correction factor.

3. A method according to claim 2, further comprising the steps of:
   detecting a third defect position on the transparent original where the infrared component level is less than the second infrared component level, among defect positions where the infrared component level is lower than the first infrared component level;
   detecting neighboring visible component levels as visible component levels near the third defect position on the transparent original; and
   generating a visible component level at the third defect position on the basis of the neighboring visible component levels.

4. A method according to claim 1, wherein the first infrared component level is a maximum value of the detected infrared component levels.

5. A method according to claim 1, wherein the infrared component is extracted by irradiating infrared light onto the transparent original, and
   the visible component is extracted by irradiating visible light onto the transparent original.

6. A method according to claim 1, wherein the infrared component is extracted by passing light coming from the transparent original through an infrared light pass filter, and
   the visible component is extracted by passing light coming from the transparent original through a visible light pass filter.

7. A method according to claim 1, wherein the infrared component is extracted by optically resolving the color of the image on the transparent original to extract an infrared component,
   the infrared component level is detected by imaging infrared light corresponding to the extracted infrared component on photoelectric conversion means by an imaging optical system, and making said photoelectric conversion means output an infrared component signal,
   the visible component is extracted by optically resolving the color of the image on the transparent original to extract a visible component,
   the visible component level is detected by imaging visible light corresponding to the extracted visible component on said photoelectric conversion means by said imaging optical system, and making said photoelectric conversion means output a visible component signal, and
   said method further comprises the step of performing registrational error correction for correcting a registrational error between the infrared component signal and visible component signal due to different imaging positions of the infrared light coming from the transparent original and the visible light coming from the transparent original, that are caused by characteristics of said imaging optical system.

8. A method according to claim 7, wherein the registrational error correction is attained by:
   setting at least one of the transparent original and said photoelectric conversion means at a position where an image of the transparent original corresponding to the extracted infrared component is to be imaged on said photoelectric conversion means by said imaging optical system when the infrared component is to be extracted; and
   setting at least one of the transparent original and said photoelectric conversion means at a position where an image of the transparent original corresponding to the extracted visible component is to be imaged on said photoelectric conversion means by said imaging optical system when the visible component is to be extracted.

9. A method according to claim 8, further comprising the steps of:
   relatively moving at least one of the transparent original and said photoelectric conversion means to a first sub-scan position;
   setting at least one of the transparent original and said photoelectric conversion means at a position where an image corresponding to one of the extracted infrared component and the extracted visible component is to be imaged on said photoelectric conversion means by said imaging optical system;
   extracting the one of the infrared component and the visible component;
   setting at least one of the transparent original and said photoelectric conversion means at a position where an image corresponding to the other of the extracted infrared component and the extracted visible component is to be imaged on said photoelectric conversion means by said imaging optical system;
   extracting the other of the infrared component and the visible component; relatively moving at least one of the transparent original and said photoelectric conversion means to a second sub-scan position; extracting the other of the infrared component and the visible component;
   setting at least one of the transparent original and said photoelectric conversion means at a position where an image corresponding to the one of the extracted infrared component and the extracted visible component is to be imaged on said photoelectric conversion means by said imaging optical system; and
   extracting the one of the infrared component and the visible component.

10. A method according to claim 8, further comprising the steps of:
    relatively moving at least one of the transparent original and said photoelectric conversion means to a first sub-scan position;
    setting at least one of the transparent original and said photoelectric conversion means at a first imaging position where an image corresponding to one of the extracted infrared component and the extracted visible component is to be imaged on said photoelectric conversion means by said imaging optical system;
    extracting the one of the infrared component and the visible component;
    setting at least one of the transparent original and said photoelectric conversion means at a second imaging position where an image corresponding to the other of the extracted infrared component and the extracted visible component is to be imaged on said photoelectric conversion means by said imaging optical system;
    extracting the other of the infrared component and the visible component;
    relatively moving at least one of the transparent original and said photoelectric conversion means to a second sub-scan position;
    setting at least one of the transparent original and said photoelectric conversion means at the first imaging position;
    extracting the one of the infrared component and the visible component;

setting at least one of the transparent original and said photoelectric conversion means at the second imaging position; and extracting the other of the infrared component and the visible component.

11. A method according to claim 10, further comprising, after the step of relatively moving at least one of the transparent original and said photoelectric conversion means at the second sub-scan position and before the step of setting at least one of the transparent original and said photoelectric conversion means at the first imaging position, the step of:

setting at least one of the transparent original and said photoelectric conversion means at a position opposite to the second imaging position with respect to the first imaging position.

12. A method according to claim 7, wherein the registrational error correction is attained by performing a correction calculation of one of the defect infrared component level and the defect visible component level so as to match a distribution size of the defect infrared component level with a distribution size of the defect visible component level.

13. A method according to claim 12, wherein the registrational error correction is attained by:

obtaining a frequency distribution of the defect infrared component level by computing a Fourier transform of the defect infrared component level;

obtaining a frequency distribution of the defect visible component level by computing a Fourier transform of the defect visible component level;

detecting a defect infrared frequency as a frequency of the defect infrared component level from the frequency distribution of the defect infrared component level;

detecting a defect visible frequency near the frequency of the defect infrared component level from the frequency distribution of the defect visible component level;

shifting the defect infrared frequency to approach the defect visible frequency; and computing an inverse Fourier transform of the shifted defect infrared frequency.

14. A method according to claim 1, further comprising the steps of:

specifying a position in the visible component corresponding to the defect position on the basis of the defect infrared component level and the visible component level; and multiplying the defect visible component level corresponding to the specified position by the correction factor.

15. A method according to claim 14, further comprising:

performing the step of detecting the infrared component level for a plurality of pixels;

performing the step of detecting the visible component level for a plurality of pixels;

calculating a plurality of first subtraction values by subtracting the infrared component levels of a plurality of pixels in a region including a position corresponding to the defect position from the visible component levels of a plurality of pixels in a first region;

calculating a plurality of first absolute values by calculating absolute values of the plurality of first subtraction values;

calculating a first sum by calculating a sum of the plurality of first absolute values;

calculating a plurality of second subtraction values by subtracting the infrared component levels of a plurality of pixels in a region including a position corresponding to the defect position from the visible component levels of a plurality of pixels in a second region;

calculating a plurality of second absolute values by calculating absolute values of the plurality of second subtraction values;

calculating a second sum by calculating a sum of the plurality of second absolute values;

determining a position corresponding to a minimum value among the first and second sums; and specifying a pixel position corresponding to the defect position on the basis of the determined position.

16. A method according to claim 1, further comprising, after the step of multiplying the correction factor, the step of:

modifying gradation of the corrected visible component level.

17. An image processing method comprising the steps of:

optically resolving a color of an image on a transparent original to extract an infrared component;

imaging infrared light corresponding to the extracted infrared component on photoelectric conversion means by an imaging optical system, and making said photoelectric conversion means output an infrared component signal;

detecting defect position information of the transparent original where a level of the infrared component is lower than a first infrared level;

optically resolving the color of the image on a transparent original to extract a visible component;

imaging visible light corresponding to the extracted visible component on said photoelectric conversion means by said imaging optical system, and making said photoelectric conversion means output a visible component signal;

detecting a visible component level of the visible component signal;

performing registrational error correction for correcting a registrational error between the infrared component signal and visible component signal due to different imaging positions of the infrared light and the visible light, that are caused by characteristics of said imaging optical system; and correcting the visible component level on the basis of the registrational error correction.

18. A method according to claim 17, wherein the registrational error correction is attained by setting said photoelectric conversion means at a position wherein the infrared light is to be imaged by said imaging optical system when the infrared component is to be extracted, and by setting said photoelectric conversion means at a position wherein the visible light is to be imaged by said imaging optical system when the visible component is to be extracted.

19. A method according to claim 17, wherein the registrational error correction is attained by performing a correction calculation of one of a defect infrared component level and a defect visible component level so as to match a distribution size of the defect infrared component level with a distribution size of the defect visible component level.

20. A method according to claim 19, wherein the registrational error correction is attained by:

obtaining a frequency distribution of the defect infrared component level by computing a Fourier transform of the defect infrared component level;

obtaining a frequency distribution of the defect visible component level by computing a Fourier transform of the defect visible component level;

detecting a defect infrared frequency as a frequency of the defect infrared component level from the frequency distribution of the defect infrared component level;

detecting a defect visible frequency near the frequency of the defect infrared component level from the frequency distribution of the defect visible component level;

shifting the defect infrared frequency to approach the defect visible frequency; and computing an inverse Fourier transform of the shifted defect infrared frequency.

21. An image processing method comprising the steps of:

resolving a color of an image on a transparent original to extract an infrared component;

detecting levels of the infrared component for a plurality of pixels;

detecting a defect infrared component level at a defect position on the transparent original, where the infrared component level is lower than a first infrared level;

resolving the color of the image on a transparent original to extract a visible component;

detecting visible component levels of the visible component from a plurality of pixels;

specifying a pixel corresponding to the defect position associated with the visible component on the basis of the defect infrared component level and the visible component level;

calculating a plurality of first subtraction values by subtracting the infrared component levels of a plurality of pixels in a region including a position corresponding to the defect position from the visible component levels of a plurality of pixels in a first region; calculating a plurality of first absolute values by calculating absolute values of the plurality of first subtraction values;

calculating a first sum by calculating a sum of the plurality of first absolute values;

calculating a plurality of second subtraction values by subtracting the infrared component levels of a plurality of pixels in a region including a position corresponding to the defect position from the visible component levels of a plurality of pixels in a second region;

calculating a plurality of second absolute values by calculating absolute values of the plurality of second subtraction values; calculating a second sum by calculating a sum of the plurality of second absolute values;

determining a position corresponding to a minimum value among the first and second sums; and specifying a pixel position corresponding to the defect position on the basis of the determined position.

22. An image processing apparatus comprising:

infrared component extraction means for resolving a color of an image on a transparent original to extract an infrared component;

infrared component detection means for detecting a level of the infrared component;

defect infrared component detection means for detecting a defect infrared component level at a defect position on the transparent original where the infrared component level becomes lower than a first infrared level;

correction factor calculation means for obtaining a correction factor by calculating (first infrared component level)/(defect infrared component level) on the basis of the first infrared component level and defect infrared component level;

visible component extraction means for resolving the color of the image on the transparent original to extract a visible component;

visible component detection means for detecting a visible component level of the visible component; and multiplication means for calculating a corrected visible component level by multiplying a defect visible component level at the defect position on the transparent original by the correction factor.

23. An apparatus according to claim 22, wherein said defect infrared component detection means detects a defect infrared component level at a second defect position on the transparent original where the infrared component level is not less than a second infrared component level, among defect positions where the infrared component level is lower than the first infrared component level, and said multiplication means multiplies the visible component level at the second defect position on the transparent original by the correction factor.

24. An apparatus according to claim 23, further comprising:

second defect infrared component detection means for detecting a third defect position on the transparent original where the infrared component level is less than the second infrared component level, among defect positions where the infrared component level is lower than the first infrared component level, and detecting neighboring visible component levels as visible component levels near the third defect position on the transparent original; and visible component level generation means for generating a visible component level at the third defect position on the basis of the neighboring visible component levels.

25. An apparatus according to claim 22, wherein the first infrared component level is a maximum value of the detected infrared component levels.

26. An apparatus according to claim 22, wherein said infrared component extraction means comprises infrared light illumination means for irradiating infrared light onto the transparent original, and said visible component extraction means comprises visible light illumination means for irradiating visible light onto the transparent original.

27. An apparatus according to claim 22, wherein said infrared component extraction means comprises an infrared light pass filter inserted between the transparent original and said infrared component detection means, and said visible component extraction means comprises a visible light pass filter inserted between the transparent original and said visible component detection means.

28. An apparatus according to claim 22, wherein said infrared component extraction means comprises an infrared component pass filter for optically resolving the color of the image on the transparent original to extract an infrared component, said infrared component detection means includes first photoelectric conversion means for photoelectrically converting infrared light corresponding to the infrared component and outputting an infrared component signal, said visible component extraction means comprises a visible component pass filter for optically resolving the color of the image on the transparent original to extract a visible component, said visible component detection means includes second photoelectric conversion means for photoelectrically converting visible light corresponding to the visible component and outputting a visible component signal, and said apparatus further comprises:
- an imaging optical system for imaging one of the infrared light corresponding to the extracted infrared component and the visible light corresponding to the extracted visible component on a corresponding one of said first and second photoelectric conversion means; and
- registrational error correction means for correcting a registrational error between the infrared component signal and visible component signal due to different imaging positions of the infrared light coming from the transparent original and the visible light coming from the transparent original, that are caused by characteristics of said imaging optical system.

29. An apparatus according to claim 28, wherein said registrational error correction means sets at least one of the transparent original and said first photoelectric conversion means at a position where an image of the transparent original corresponding to the extracted infrared component is to be imaged on said first photoelectric conversion means by said imaging optical system when the infrared component is to be extracted, and
said registrational error correction means sets at least one of the transparent original and said second photoelectric conversion means at a position where an image of the transparent original corresponding to the extracted visible component is to be imaged on said second photoelectric conversion means by said imaging optical system when the visible component is to be extracted.

30. An apparatus according to claim 29, wherein said first and second photoelectric conversion means are a single member, and
said registrational error correction means includes moving means for moving at least one of the transparent original and said photoelectric conversion means to an infrared imaging position where the image of the transparent original corresponding to the extracted infrared component is to be imaged on said first photoelectric conversion means by said imaging optical system when the infrared component is to be extracted, and for moving at least one of the transparent original and said photoelectric conversion means to a visible imaging position where the image of the transparent original corresponding to the extracted visible component is to be imaged on said second photoelectric conversion means by said imaging optical system when the visible component is to be extracted.

31. An apparatus according to claim 29, wherein said first and second photoelectric conversion means are separate members, and
said registrational error correction means comprises a photoelectric conversion means setting member formed with a first setting portion for setting said first photoelectric conversion means at an infrared light imaging position, and a second setting portion for setting said second photoelectric conversion means at a visible light imaging position.

32. An apparatus according to claim 28, wherein said registrational error correction means includes correction calculation means for performing a correction calculation of one of the defect infrared component level and the defect visible component level so as to match a distribution size of the defect infrared component level with a distribution size of the defect visible component level.

33. An apparatus according to claim 32, wherein said registrational error correction means performs the correction calculation by:

- obtaining a frequency distribution of the defect infrared component level by computing a Fourier transform of the defect infrared component level;
- obtaining a frequency distribution of the defect visible component level by computing a Fourier transform of the defect visible component level;
- detecting a defect infrared frequency as a frequency of the defect infrared component level from the frequency distribution of the defect infrared component level;
- detecting a defect visible frequency near the frequency of the defect infrared component level from the frequency distribution of the defect visible component level;
- shifting the defect infrared frequency to approach the defect visible frequency; and
- computing an inverse Fourier transform of the shifted defect infrared frequency.

34. An apparatus according to claim 22, further comprising:
- defect position specifying means for specifying a position in the visible component corresponding to the defect position on the basis of the defect infrared component level and the visible component level and
- wherein said multiplication means multiplies the defect visible component level corresponding to the specified position by the correction factor.

35. An apparatus according to claim 34, wherein said infrared component detection means divides the infrared component into a plurality of pixels, and detects the infrared component levels of the pixels,
said visible component detection means divides the visible component into a plurality of pixels and detects the visible component levels of the pixels, and
said defect position specifying means calculates a plurality of first subtraction values by subtracting the infrared component levels of a plurality of pixels in a region including a position corresponding to the defect position from the visible component levels of a plurality of pixels in a first region,
calculates a plurality of first absolute values by calculating absolute values of the plurality of first subtraction values,
calculates a first sum by calculating a sum of the plurality of first absolute values,
calculates a plurality of second subtraction values by subtracting the infrared component levels of a plurality of pixels in a region including a position corresponding to the defect position from the visible component levels of a plurality of pixels in a second region,
calculates a plurality of second absolute values by calculating absolute values of the plurality of second subtraction values,
calculates a second sum by calculating a sum of the plurality of second absolute values,
determines a position corresponding to a minimum value among the first and second sums, and
specifies a pixel position corresponding to the defect position on the basis of the determined position.

36. An apparatus according to claim 22, further comprising:
- gradation modification means for modifying gradation of the corrected visible component level after said multiplication means multiplies the correction factor.

37. An image processing apparatus comprising:
- an infrared light pass filter for optically resolving a color of an image on a transparent original to extract an infrared component;

first photoelectric conversion means for photoelectrically converting infrared light and outputting an infrared component signal;

defect position detection means for detecting a position of the infrared component signal where an infrared component level is lower than a first infrared level, and outputting defect position information;

a visible light pass filter for optically resolving the color of the image on a transparent original to extract a visible component;

second photoelectric conversion means for photoelectrically converting visible light and outputting a visible component signal;

an imaging optical system for imaging one of infrared light corresponding to the extracted infrared component and visible light component corresponding to the extracted visible light component on a corresponding one of said first and second photoelectric conversion means; and registrational error correction means for correcting a registrational error between the infrared component signal and visible component signal due to different imaging positions of the infrared light and the visible light, that are caused by characteristics of said imaging optical system.

38. An apparatus according to claim 37, wherein said registrational error correction means sets said first photoelectric conversion means at a position wherein the infrared light is to be imaged by said imaging optical system when the infrared component is to be extracted, and sets said second photoelectric conversion means at a position wherein the visible light is to be imaged by said imaging optical system when the visible component is to be extracted.

39. An apparatus according to claim 38, wherein said first and second photoelectric conversion means are a single member, and said registrational error correction means includes moving means for moving said photoelectric conversion means to an infrared light imaging position when the infrared component is to be extracted, and for moving said photoelectric conversion means to a visible light imaging position when the visible component is to be extracted.

40. An apparatus according to claim 38, wherein said first and second photoelectric conversion means are separate members, and said registrational error correction means comprises a photoelectric conversion means setting member formed with a first setting portion for setting said first photoelectric conversion means at an infrared light imaging position, and a second setting portion for setting said second photoelectric conversion means at a visible light imaging position.

41. An apparatus according to claim 37, wherein said registrational error correction means includes correction calculation means for performing a correction calculation of one of the defect infrared component level and the defect visible component level so as to match a distribution size of the defect infrared component level with a distribution size of the defect visible component level.

42. An apparatus according to claim 41, wherein said registrational error correction means performs the correction calculation by:

obtaining a frequency distribution of the defect infrared component level by computing a Fourier transform of the defect infrared component level;

obtaining a frequency distribution of the defect visible component level by computing a Fourier transform of the defect visible component level;

detecting a defect infrared frequency as a frequency of the defect infrared component level from the frequency distribution of the defect infrared component level;

detecting a defect visible frequency near the frequency of the defect infrared component level from the frequency distribution of the defect visible component level;

shifting the defect infrared frequency to approach the defect visible frequency; and computing an inverse Fourier transform of the shifted defect infrared frequency.

43. An image processing apparatus comprising:

an infrared light pass filter for optically resolving a color of an image on a transparent original to extract an infrared component;

infrared component detection means for dividing the infrared component into a plurality of pixels, and detecting infrared component levels of the pixels;

detect infrared component detection means for detecting a defect infrared component level of a pixel at a defect position on the transparent original, where the infrared component level is lower than a first infrared level;

a visible light pass filter for optically resolving the color of the image on a transparent original to extract a visible component;

visible component detection means for detecting visible component levels of the visible component from a plurality of pixels; and defect position specifying means for specifying a position of the visible component corresponding to the defect position on the basis of the defect infrared component level and the visible component level, wherein said defect position specifying means calculates a plurality of first subtraction values by subtracting the infrared component levels of a plurality of pixels in a region including a position corresponding to the defect position from the visible component levels of a plurality of pixels in a first region, calculates a plurality of first absolute values by calculating absolute values of the plurality of first subtraction values, calculates a first sum by calculating a sum of the plurality of first absolute values, calculates a plurality of second subtraction values by subtracting the infrared component levels of a plurality of pixels in a region including a position corresponding to the defect position from the visible component levels of a plurality of pixels in a second region, calculates a plurality of second absolute values by calculating absolute values of the plurality of second subtraction values, calculates a second sum by calculating a sum of the plurality of second absolute values, determines a position corresponding to a minimum value among the first and second sums, and specifies a pixel position corresponding to the defect position on the basis of the determined position.

44. A storage medium which computer-readably stores a control process of image generation by an image processing apparatus having infrared component extraction means for resolving a color of an image on a transparent original to extract an infrared component, defect infrared component detection means for detecting a defect infrared component level at a defect position on the transparent original where the infrared component level becomes lower than a first infrared level, visible component extraction means for resolving the color of the image on the transparent original to extract a visible component, and visible component detection means for detecting a visible component level of the extracted visible component, said control process comprising the steps of:

detecting a level of the extracted infrared component;

obtaining a correction factor by calculating (first infrared component level)/(defect infrared component level) on the basis of the first infrared component level and defect infrared component level; and calculating a corrected visible component level by multiplying a defect visible component level at the defect position on the transparent original by the correction factor.

45. A medium according to claim 44, wherein said control process further comprises the steps of:

detecting a defect infrared component level at a second defect position on the transparent original where the infrared component level is not less than a second infrared component level, among defect positions where the infrared component level is lower than the first infrared component level; and multiplying the visible component level at the second defect position on the transparent original by the correction factor.

46. A medium according to claim 45, wherein said control process further comprises the steps of:

detecting a third defect position on the transparent original where the infrared component level is less than the second infrared component level, among defect positions where the infrared component level is lower than the first infrared component level, and detecting neighboring visible component levels as visible component levels near the third defect position on the transparent original; and generating a visible component level at the third defect position on the basis of the neighboring visible component levels.

47. A medium according to claim 44, wherein said infrared component extraction means comprises an infrared component pass filter for optically resolving the color of the image on the transparent original to extract an infrared component, said infrared component detection means includes first photoelectric conversion means for photoelectrically converting infrared light corresponding to the infrared component and outputting an infrared component signal, said visible component extraction means comprises a visible component pass filter for optically resolving the color of the image on the transparent original to extract a visible component, said visible component detection means includes second photoelectric conversion means for photoelectrically converting visible light corresponding to the visible component and outputting a visible component signal, said image processing apparatus further comprises:

an imaging optical system for imaging one of the infrared light corresponding to the extracted infrared component and the visible light corresponding to the extracted visible component on a corresponding one of said first and second photoelectric conversion means and said control process further comprises:

the registrational error correction step of correcting a registrational error between the infrared component signal and visible component signal due to different imaging positions of the infrared light coming from the transparent original and the visible light coming from the transparent original, that are caused by characteristics of said imaging optical system.

48. A medium according to claim 47, wherein the registrational error correction step includes the steps of:

setting at least one of the transparent original and said first photoelectric conversion means at a position where an image of the transparent original corresponding to the extracted infrared component is to be imaged on said first photoelectric conversion means by said imaging optical system when the infrared component is to be extracted, and setting at least one of the transparent original and said second photoelectric conversion means at a position where an image of the transparent original corresponding to the extracted visible component is to be imaged on said second photoelectric conversion means by said imaging optical system when the visible component is to be extracted.

49. A medium according to claim 48, wherein said image processing apparatus comprises a single member which serves as said first and second photoelectric conversion means, and moving means for relatively moving at least one of the transparent original and said photoelectric conversion means in a sub-scan direction, and the registrational error correction step stored in said storage medium includes the step of controlling said moving means to move at least one of the transparent original and said photoelectric conversion means to an infrared imaging position where the image of the transparent original corresponding to the extracted infrared component is to be imaged on said first photoelectric conversion means by said imaging optical system when the infrared component is to be extracted, and to move at least one of the transparent original and said photoelectric conversion means to a visible imaging position where the image of the transparent original corresponding to the extracted visible component is to be imaged on said second photoelectric conversion means by said imaging optical system when the visible component is to be extracted.

50. A storage medium which computer-readably stores a control process of image generation by an image processing apparatus having infrared component extraction means for resolving a color of an image on a transparent original to extract an infrared component, visible component extraction means for resolving the color of the image on the transparent original to extract a visible component, photoelectric conversion means for scanning the transparent original in a main scan direction, and converting light transmitted through the transparent original into an electrical signal, and moving means for relatively moving at least one of the transparent original and said photoelectric conversion means in a sub-scan direction as a direction that intersects the main scan direction, said control process comprising the steps of:

controlling said moving means to relatively move at least one of the transparent original and said photoelectric conversion means to a first sub-scan position;

controlling said moving means to set at least one of the transparent original and said photoelectric conversion means at a position where an image corresponding to one of the extracted infrared component and the extracted visible component is to be imaged on said photoelectric conversion means by an imaging optical system;

controlling one of said infrared component extraction means and said visible component extraction means to perform component extraction;

controlling, after one of the infrared component and the visible component is extracted, said moving means to set at least one of the transparent original and said photoelectric conversion means at a position where an image corresponding to the other of the extracted infrared component and the extracted visible component is to be imaged on said photoelectric conversion means by said imaging optical system;

controlling the other of said infrared component extraction means and said visible component extraction means to perform component extraction;

controlling said moving means to relatively move at least one of the transparent original and said photoelectric conversion means to a second sub-scan position;

controlling, after the other of the infrared component and the visible component is extracted, said moving means to set at least one of the transparent original and said photoelectric conversion means at a position where an image corresponding to the one of the extracted infrared component and the extracted visible component is to be imaged on said photoelectric conversion means by said imaging optical system; and controlling the one of said infrared component extraction means and said visible component extraction means to perform component extraction.

51. A storage medium which computer-readably stores a control process of image generation by an image processing apparatus having infrared component extraction means for resolving a color of an image on a transparent original to extract an infrared component, visible component extraction means for resolving the color of the image on the transparent original to extract a visible component, photoelectric conversion means for scanning the transparent original in a main scan direction, and converting light transmitted through the transparent original into an electrical signal, and moving means for relatively moving at least one of the transparent original and said photoelectric conversion means in a sub-scan direction as a direction that intersects the main scan direction, said control process comprising the steps of:

controlling said moving means to relatively move at least one of the transparent original and said photoelectric conversion means to a first sub-scan position;

controlling said moving means to set at least one of the transparent original and said photoelectric conversion means at a first imaging position where an image corresponding to one of the extracted infrared component and the extracted visible component is to be imaged on said photoelectric conversion means by an imaging optical system;

controlling one of said infrared component extraction means and said visible component extraction means to perform component extraction;

controlling, after one of the infrared component and the visible component is extracted, said moving means to set at least one of the transparent original and said photoelectric conversion means at a second imaging position where an image corresponding to the other of the extracted infrared component and the extracted visible component is to be imaged on said photoelectric conversion means by said imaging optical system;

controlling the other of said infrared component extraction means and said visible component extraction means to perform component extraction;

controlling said moving means to relatively move at least one of the transparent original and said photoelectric conversion means to a second sub-scan position;

controlling said moving means to set at least one of the transparent original and said photoelectric conversion means at the first imaging position;

controlling the one of said infrared component extraction means and said visible component extraction means to perform component extraction;

controlling, after the one of the infrared component and the visible component is extracted, said moving means to set at least one of the transparent original and said photoelectric conversion means at the second imaging position; and controlling the other of said infrared component extraction means and said visible component extraction means to perform component extraction.

52. A medium according to claim 51, wherein said control process further comprises, after the step of relatively moving at least one of the transparent original and said photoelectric conversion means at the second sub-scan position and before the step of setting at least one of the transparent original and said photoelectric conversion means at the first imaging position, the step of setting at least one of the transparent original and said photoelectric conversion means at a position opposite to the second imaging position with respect to the first imaging position.

53. A medium according to claim 47, wherein the registrational error correction step includes the correction calculation step of performing a correction calculation of one of the defect infrared component level and the defect visible component level so as to match a distribution size of the defect infrared component level with a distribution size of the defect visible component level.

54. A medium according to claim 53, wherein the registrational error calculation step includes the steps of:

obtaining a frequency distribution of the defect infrared component level by computing a Fourier transform of the defect infrared component level;

obtaining a frequency distribution of the defect visible component level by computing a Fourier transform of the defect visible component level;

detecting a defect infrared frequency as a frequency of the defect infrared component level from the frequency distribution of the defect infrared component level;

detecting a defect visible frequency near the frequency of the defect infrared component level from the frequency distribution of the defect visible component level;

shifting the defect infrared frequency to approach the defect visible frequency; and computing an inverse Fourier transform of the shifted defect infrared frequency to attain the correction calculation.

55. A medium according to claim 44, wherein said control process further includes:
the defect position specifying step of specifying a position in the visible component corresponding to the defect position on the basis of the defect infrared component level and the visible component level; and
the step of multiplying the defect visible component level corresponding to the specified position by the correction factor.

56. A medium according to claim 55, wherein when, in said image processing apparatus, said infrared component detection means divides the infrared component into a plurality of pixels, and detects infrared component levels of the pixels, and said visible component detection means divides the visible component into a plurality of pixels, and detects visible component levels of the pixels,
said control process comprises, as the defect position specifying step, the steps of:
calculating a plurality of first subtraction values by subtracting the infrared component levels of a plurality of pixels in a region including a position corresponding to the defect position from the visible component levels of a plurality of pixels in a first region;
calculating a plurality of first absolute values by calculating absolute values of the plurality of first subtraction values;
calculating a first sum by calculating a sum of the plurality of first absolute values;
calculating a plurality of second subtraction values by subtracting the infrared component levels of a plurality of pixels in a region including a position corresponding to the defect position from the visible component levels of a plurality of pixels in a second region;
calculating a plurality of second absolute values by calculating absolute values of the plurality of second subtraction values;
calculating a second sum by calculating a sum of the plurality of second absolute values;
determining a position corresponding to a minimum value among the first and second sums; and
specifying a pixel position corresponding to the defect position on the basis of the determined position.

57. A medium according to claim 44, wherein the control process further includes:
the gradation modification step of modifying gradation of the corrected visible component level after the correction factor is multiplied in the multiplication step.

58. A storage medium which computer-readably stores a control process of image generation by an image processing apparatus having
an infrared light pass filter for optically resolving a color of an image on a transparent original to extract an infrared component,
first photoelectric conversion means for photoelectrically converting infrared light and outputting an infrared component signal,
defect position detection means for detecting a position of the infrared component signal where an infrared component level is lower than a first infrared level, and outputting defect position information,
a visible light pass filter for optically resolving the color of the image on a transparent original to extract a visible component,
second photoelectric conversion means for photoelectrically converting visible light and outputting a visible component signal, and
an imaging optical system for imaging one of infrared light corresponding to the extracted infrared component and visible light component corresponding to the extracted visible light component on a corresponding one of said first and second photoelectric conversion means,
said control process comprising:
the registrational error correction step of correcting a registrational error between the infrared component signal and visible component signal due to different imaging positions of the infrared light and the visible light, that are caused by characteristics of said imaging optical system.

59. A medium according to claim 58, wherein the registrational error correction step includes the step of setting said first photoelectric conversion means at a position wherein the infrared light is to be imaged by said imaging optical system when the infrared component is to be extracted, and setting said second photoelectric conversion means at a position wherein the visible light is to be imaged by said imaging optical system when the visible component is to be extracted.

60. A medium according to claim 59, wherein said image processing apparatus comprises a single member which serves as said first and second photoelectric conversion means, and moving means for relatively moving at least one of the transparent original and said photoelectric conversion means in a sub-scan direction, and
the registrational error correction step stored in said storage medium includes the step of controlling said moving means to move at least one of the transparent original and said photoelectric conversion means to an infrared imaging position where the image of the transparent original corresponding to the extracted infrared component is to be imaged on said first photoelectric conversion means by said imaging optical system when the infrared component is to be extracted, and to move at least one of the transparent original and said photoelectric conversion means to a visible imaging position where the image of the transparent original corresponding to the extracted visible component is to be imaged on said second photoelectric conversion means by said imaging optical system when the visible component is to be extracted.

61. A medium according to claim 58, wherein the registrational error correction step includes the correction calculation step of performing a correction calculation of one of the defect infrared component level and the defect visible component level so as to match a distribution size of the defect infrared component level with a distribution size of the defect visible component level.

62. A medium according to claim 61, wherein the registrational error calculation step includes the steps of:
obtaining a frequency distribution of the defect infrared component level by computing a Fourier transform of the defect infrared component level;
obtaining a frequency distribution of the defect visible component level by computing a Fourier transform of the defect visible component level;
detecting a defect infrared frequency as a frequency of the defect infrared component level from the frequency distribution of the defect infrared component level;
detecting a defect visible frequency near the frequency of the defect infrared component level from the frequency distribution of the defect visible component level;

shifting the defect infrared frequency to approach the defect visible frequency; and computing an inverse Fourier transform of the shifted defect infrared frequency to attain the correction calculation.

63. A storage medium which stores a control process of image generation by an image processing apparatus having an infrared light pass filter for optically resolving a color of an image on a transparent original to extract an infrared component, and a visible light pass filter for optically resolving the color of the image on a transparent original to extract a visible component, said control process comprising:
- the infrared component detection step of dividing the infrared component into a plurality of pixels, and detecting infrared component levels of the pixels;
- the defect infrared component detection step of detecting a defect infrared component level of a pixel at a defect position on the transparent original, where the infrared component level is lower than a first infrared level;
- the visible component detection step of detecting visible component levels of the visible component from a plurality of pixels; and
- the defect position specifying step of specifying a position of the visible component corresponding to the defect position on the basis of the defect infrared component level and the visible component level, wherein the defect position specifying step includes the steps of:
- calculating a plurality of first subtraction values by subtracting the infrared component levels of a plurality of pixels in a region including a position corresponding to the defect position from the visible component levels of a plurality of pixels in a first region;
- calculating a plurality of first absolute values by calculating absolute values of the plurality of first subtraction values;
- calculating a first sum by calculating a sum of the plurality of first absolute values;
- calculating a plurality of second subtraction values by subtracting the infrared component levels of a plurality of pixels in a region including a position corresponding to the defect position from the visible component levels of a plurality of pixels in a second region;
- calculating a plurality of second absolute values by calculating absolute values of the plurality of second subtraction values;
- calculating a second sum by calculating a sum of the plurality of second absolute values;
- determining a position corresponding to a minimum value among the first and second sums; and
- specifying a pixel position corresponding to the defect position on the basis of the determined position.

* * * * *